US011244683B2

(12) United States Patent
Cameron et al.

(10) Patent No.: US 11,244,683 B2
(45) Date of Patent: Feb. 8, 2022

(54) SYSTEM AND METHOD FOR THE CREATION AND PLAYBACK OF SOUNDTRACK-ENHANCED AUDIOBOOKS

(71) Applicant: Booktrack Holdings Limited, Takapuna (NZ)

(72) Inventors: Paul Charles Cameron, Milford (NZ); Craig Andrew Wilson, Rothesay Bay (NZ); Brock David Moore, Warkworth (NZ); Mark Anthony Buer, Adelaide (AU)

(73) Assignee: Booktrack Holdings Limited, Takapuna (NZ)

( * ) Notice: Subject to any disclaimer, the term of this patent is extended or adjusted under 35 U.S.C. 154(b) by 358 days.

(21) Appl. No.: 16/064,326

(22) PCT Filed: Dec. 23, 2016

(86) PCT No.: PCT/IB2016/057962
§ 371 (c)(1),
(2) Date: Jun. 20, 2018

(87) PCT Pub. No.: WO2017/109759
PCT Pub. Date: Jun. 29, 2017

(65) Prior Publication Data
US 2019/0005959 A1    Jan. 3, 2019

(30) Foreign Application Priority Data
Dec. 23, 2015  (NZ) .......................... 715525

(51) Int. Cl.
*G06F 3/16* (2006.01)
*G10L 15/26* (2006.01)
(Continued)

(52) U.S. Cl.
CPC .............. *G10L 15/26* (2013.01); *G06F 3/165* (2013.01); *G06F 16/685* (2019.01); *G09B 5/062* (2013.01);
(Continued)

(58) Field of Classification Search
CPC ..... G10L 15/26; G10L 21/055; G10L 13/033; G06F 16/685; G06F 3/165; G09B 5/062; H04N 21/47217
See application file for complete search history.

(56) References Cited

U.S. PATENT DOCUMENTS

2001/0027396 A1  10/2001  Tatsuhiro
2002/0013698 A1*  1/2002  Vaudrey ............... G11B 27/034
                                                                704/225
(Continued)

FOREIGN PATENT DOCUMENTS

WO  2013015694  1/2013
WO  2017109759  6/2017

OTHER PUBLICATIONS

"International Application No. PCT IB2016 057962, International Search Report and Written Opinion dated Apr. 5, 2017", 15 pgs.

*Primary Examiner* — Joseph Saunders, Jr.
(74) *Attorney, Agent, or Firm* — Schwegman Lundberg & Woessner, P.A.

(57) ABSTRACT

A synchronised soundtrack for an audiobook. The soundtrack has a soundtrack timeline having one or more audio regions that are configured for synchronised playback with corresponding narration regions in the audiobook playback timeline. Each audio region having a position along the soundtrack timeline that is dynamically adjustable to maintain synchronization of the audio regions of the soundtrack with their respective narration regions in the audiobook
(Continued)

based on a narration speed variable indicative of the playback narration speed of the audiobook.

28 Claims, 27 Drawing Sheets

(51) Int. Cl.
| | |
|---|---|
| *G09B 5/06* | (2006.01) |
| *G06F 16/683* | (2019.01) |
| *G10L 21/055* | (2013.01) |
| *H04N 21/472* | (2011.01) |
| *G10L 13/033* | (2013.01) |

(52) U.S. Cl.
CPC ..... *G10L 21/055* (2013.01); *H04N 21/47217* (2013.01); *G10L 13/033* (2013.01)

(56) References Cited

U.S. PATENT DOCUMENTS

| | | |
|---|---|---|
| 2011/0154199 A1 | 6/2011 | Maffitt et al. |
| 2015/0039991 A1 | 2/2015 | Cameron et al. |
| 2015/0082136 A1 | 3/2015 | Cameron et al. |
| 2015/0347082 A1 | 12/2015 | Cameron et al. |

\* cited by examiner

1:1 MAPPING 106

| E-book TEXT POSITION | | AUDIOBOOK PLAYBACK TIME (s) | | | |
|---|---|---|---|---|---|
| | | NS=1 | NS=1.5 | NS=2 | NS=2.5 |
| Word 1 | CFI #1 | 0 | 0 | 0 | 0 |
| Word 2 | CFI #2 | 0.5 | 0.33 | 0.25 | 0.2 |
| Word 3 | CFI #3 | 1.2 | 0.8 | 0.6 | 0.48 |
| Word 4 | CFI #4 | 1.8 | 1.2 | 0.9 | 0.72 |
| Word 5 | CFI #5 | 2.2 | 1.47 | 1.1 | 0.88 |
| Word 6 | CFI #6 | 1.6 | 1.73 | 1.3 | 1.4 |
| ⋮ | ⋮ | ⋮ | ⋮ | ⋮ | ⋮ |
| Word 6000 | CFI #6000 | 1800 | 1200 | 900 | 720 |

MARKER-DETERMINED MAPPING

| PARA-GRAPH | E-Book TEXT POSITION MARKERS | E-Book TEXT POSITION | | AUDIOBOOK PLAYBACK TIMES(s) | | | | | |
|---|---|---|---|---|---|---|---|---|---|
| | | | | NS=1 | NARRATION SPEED | NS=1.5 | NARRATION SPEED | NS=2 | NARRATION SPEED |
| PARA 1 | M1 | WORD 1 | CFI#1 | 0 | 120 | 0 | 180 | 0 | 240 |
| PARA 2 | M2 | WORD 400 | CFI#400 | 200 | 120 | 133 | 180 | 100 | 240 |
| PARA 3 | M3 | WORD 700 | CFI#700 | 350 | 144 | 233 | 214 | 175 | 286 |
| PARA 4 | M4 | WORD 1000 | CFI#1000 | 475 | 130 | 317 | 196 | 238 | 261 |
| PARA 5 | M5 | WORD 1500 | CFI#1500 | 705 | 133 | 470 | 200 | 353 | 269 |
| PARA 6 | M6 | WORD 1800 | CFI#1800 | 840 | 125 | 560 | 188 | 420 | 250 |
| | M7 | WORD 2500 | CFI#2500 | 1176 | | 784 | | 588 | |
| ⋮ | ⋮ | ⋮ | ⋮ | ⋮ | | ⋮ | | ⋮ | |

| Audiobook playback Time (s) at default narration speed | Token Index (word count) | Audio Change (s) | Token Change | WPM (token rate - tokens per minute) | x2 audiobook playback or narration speed |
|---|---|---|---|---|---|
| 0 | 0 | | | | 40 |
| 18 | 6 | 18 | 6 | 20 | 255 |
| 203 | 591 | 275 | 585 | 128 | 380 |
| 541 | 1169 | 248 | 578 | 140 | #DIV/0! |
| 541 | 1524 | 0 | 355 | #DIV/0! | 110 |
| 786 | 1749 | 245 | 225 | 55 | 270 |
| 830 | 1848 | 44 | 99 | 135 | 292 |
| 867 | 1938 | 37 | 90 | 146 | 264 |
| 897 | 2004 | 30 | 66 | 132 | 264 |
| 1087 | 2643 | 190 | 639 | 202 | 404 |
| 1250 | 2643 | 163 | 0 | 0 | 0 |
| 1322 | 3000 | 72 | 357 | 298 | 595 |
| 1449 | 3296 | 127 | 296 | 140 | 280 |
| 1514 | 3444 | 65 | 148 | 137 | 273 |
| 1518 | 3455 | 4 | 11 | 165 | 330 |
| 1567 | 3545 | 49 | 90 | 110 | 220 |
| 1615 | 3661 | 48 | 116 | 145 | 290 |
| 1637 | 3713 | 22 | 52 | 142 | 284 |
| 1729 | 3917 | 92 | 204 | 133 | 266 |

FIGURE 3J

SYSTEM AND METHOD FOR THE CREATION AND PLAYBACK OF SOUNDTRACK-ENHANCED AUDIOBOOKS

PRIORITY CLAIM TO RELATED APPLICATIONS

This application is a U.S. national stage filing under 35 U.S.C. § 371 from International Application No. PCT/IB2016/057962, filed on 23 Dec. 2016 and published as WO2017/109759 on 29 Jun. 2017, which claims the benefit under 35 U.S.C. 119 to New Zealand Application No. 715525, filed on 23 Dec. 2015, the benefit of priority of each of which is claimed herein, and which applications and publication are hereby incorporated herein by reference in their entirety.

FIELD OF THE INVENTION

The invention relates to audiobooks with soundtracks.

BACKGROUND TO THE INVENTION

Audiobooks are an audio recording of a narrator reading a book, typically a novel. Audiobooks were traditionally provided on CD or cassette, but these days are now provided in digital audio format as an audio file or package of audio files for playback or streaming on consumer electronic devices such as computers, home audio systems and players, and more commonly portable electronic devices such as portable audio players such as mp3 players and iPods, or other portable electronic devices with audio playback capabilities such as most smart phones, PDAs, tablets, laptops and the like.

Audiobooks are typically provided with audio in the form of a narration of the book. However, some audiobooks have been provided with an accompanying soundtrack that plays concurrently with the narration to enhance the audiobook experience. Such soundtrack-enhanced audiobooks require significant production time in selecting the appropriate individual music files to overlay the narration and compiling those music files with the narration audio to generate the end soundtrack-enhanced audiobook audio file. For this reason, sound-enhanced audiobooks are often provided as special features or just short sections of an audiobook like the introduction have background music. Soundtrack-enhanced audiobooks are not commonplace, due to the additional cost and complexity of their production.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY OF THE INVENTION

It is an object of at least some embodiments of the invention to provide an improved system and/or method for the creation and/or playback of soundtrack-enhanced audiobooks, or to at least provide the public with a useful choice.

In a first aspect, the invention broadly consists in a synchronised soundtrack for an audiobook, the soundtrack comprising a soundtrack timeline having one or more audio regions that are configured for synchronised playback with corresponding narration regions in the audiobook playback timeline, each audio region having a position along the soundtrack timeline that is dynamically adjustable to maintain synchronization of the audio regions of the soundtrack with their respective narration regions in the audiobook based on a narration speed variable indicative of the playback narration speed of the audiobook.

In an embodiment, each audio region of the soundtrack is defined by a start position and stop position along the audiobook playback timeline. In one form, the start position and stop position defining each audio region comprise a start and stop time values defined along the audiobook playback timeline. In another form, the start position and stop position defining each audio region comprise start and stop proportional commencement values in relation to the overall length of the audiobook or preset time markets along the audiobook playback timeline.

In an embodiment, the start and stop positions defining each audio region of the soundtrack are defined or configured based on a nominal narration speed or nominal audiobook playback duration.

In an embodiment, the start and stop positions defining each audio region of the soundtrack are dynamically adjustable during playback based on the narration speed variable and data indicative of a nominal narration speed or a nominal audiobook playback duration upon which the start and stop positions of audio regions were originally defined.

In another form, the start and stop times may be proportionate commencement values relative to another scale such as word count or other reference to the text of the audiobook that can then be related to audiobook playback time values.

In an embodiment, the start position and stop position of each audio region is defined based on a nominal narration speed or nominal audiobook playback duration. In an embodiment, the start and stop positions of the audio regions are dynamically adjustable based on the narration speed variable and data indicative of the nominal narration speed or nominal audiobook playback duration upon which the position of audio regions were originally defined. This ensures that the correct soundtrack audio regions will start and stop (including any associated playback effects such as volume envelopes, fade in/out, phase shift, panning or the like) at the correct time or duration point in the audiobook regardless of narration speed changes.

In a second aspect, the invention broadly consists in system for the creation of a synchrnonised soundtrack for an audiobook, the system comprising a processor and memory, and being configured to: receive or retrieve an audiobook into memory; receive data defining one or more audio regions of the soundtrack that are configured for synchronised playback with corresponding narration regions in the audiobook playback timeline; and configure each audio region to have a position along the soundtrack timeline that is dynamically adjustable to maintain synchronization of the audio regions of the soundtrack with their respective narration regions in the audiobook based on a narration speed variable indicative of the playback narration speed of the audiobook.

In a third aspect, the invention broadly consists in a method of creating a synchronised soundtrack for an audiobook, the method implemented by a processor having associated memory, the method comprising: receiving or retrieving an audiobook into memory; receiving data defining one or more audio regions of the soundtrack that are configured for synchronised playback with corresponding narration regions in the audiobook playback timeline; and configuring each audio region to have a position along the soundtrack timeline that is dynamically adjustable to maintain synchronization of the audio regions of the soundtrack with their respective narration regions in the audiobook based on a narration speed variable indicative of the playback narration speed of the audiobook.

The second and third aspects of the invention may have any one or more of the features mentioned in respect of the first aspect of the invention.

In a fourth aspect, the invention broadly consists in a soundtrack-enhanced audiobook playback system comprising: an audiobook player operable to process a digital audiobook for playback; and a soundtrack player configured to process a soundtrack comprising a soundtrack timeline having one or more audio regions that are configured for synchronised playback with corresponding narration regions in the audiobook playback timeline, the soundtrack player receiving audiobook playback data associated with the audiobook playback, and being configured to synchronise playback of the audio regions of the soundtrack to the audiobook playback based at least partly on the audiobook playback data such that the audio regions are triggered or scheduled to playback as the audiobook playback narrates their respective narration regions.

In an embodiment, the audiobook playback data comprises data indicative of a current audiobook playback position and a narration speed variable indicative of the narration speed at which the audiobook is being played back.

In one configuration, the soundtrack player dynamically adjusts the playback position of the audio regions along the soundtrack timeline based on a narration speed variable indicative of the narration speed at which the audiobook is being played back and data indicative of a nominal narration speed or a nominal audiobook playback duration upon which the position of audio regions were originally defined.

In an embodiment, the audiobook player and soundtrack player are integrated with each other as an audio player. In another embodiment, the audiobook player and soundtrack player are separate components or modules in data communication or which can interface with each other, whether bi-directional or uni-directional.

In an embodiment, the system further comprises an operable volume control interface that is operable to control the volume of the soundtrack playback relative to the audiobook playback, or vice versa.

In a fifth aspect, the invention broadly consists in a method of synchronizing the playback of a soundtrack to an audiobook to generate a soundtrack-enhanced audiobook, the method implemented by processor having associated memory, the method comprising: receiving and processing a soundtrack comprising a soundtrack timeline having one or more audio regions that are configured for synchronised playback with corresponding narration regions in an audiobook playback timeline; receiving or retrieving audiobook playback data associated with the current audiobook playback; and triggering or scheduling the playback of the audio regions of the soundtrack based at least partly on the audiobook playback data such that the playback of the audio regions is synchronised to the playback of their corresponding narration regions.

In an embodiment, the method comprises receiving or retrieving audiobook playback data comprising data indicative of a current audiobook playback position and a narration speed variable indicative of the narration speed at which the audiobook is being played back.

In one configuration, the method comprises dynamically adjusting the playback position of the audio regions along the soundtrack timeline based on the narration speed variable and data indicative of the nominal narration speed or nominal audiobook playback duration upon which the position of audio regions were originally defined.

The fourth and fifth aspects of the invention may have any one or more features mentioned in respect of the first-third aspects of the invention.

In a sixth aspect, the invention broadly consists in a system for synchronising the playback of a digital soundtrack, which is configured or defined relative to electronic text, to the playback of an audiobook associated with the electronic text, the soundtrack comprising multiple audio regions that are configured for playback relative to respective text regions in the electronic text, the system comprising: an audiobook player operable to process the digital audiobook for playback over an audio output system; and a soundtrack player configured to receive or retrieve audiobook playback data associated with the audiobook playback, and being further configured to process the digital soundtrack and synchronise playback of the audio regions of the soundtrack based at least partly on the audiobook playback data such that the audio regions are triggered or scheduled to playback as the audiobook playback narrates their respective text regions to thereby generate a soundtrack-enhanced audiobook.

In one configuration, the audiobook playback data comprises data indicative of any one or more of the following: the current narration position in the audiobook playback (for example the listener's current listening position in the audiobook playback timeline), the narration speed setting associated with the audiobook playback, and/or narration speed data representing the narration speed or speed of the audiobook narration.

In one form, the current narration position is the current audiobook playback time (e.g. current listening position). In another form, the current narration position is a value representing the playback percentage or portion completed relative to the total duration of the audiobook.

In one form, the narration speed setting is a multiplier factor or value relative to a standard, default or nominal narration speed for the audiobook.

In one form, the narration speed data comprises a plurality of narration speed values each corresponding to a respective segment or portion of the audiobook playback duration. In another form, the narration speed data comprises a single average narration speed for the entire audiobook.

In one form, the narration speed data comprises a plurality of narration speed values each corresponding to a respective segment or portion of the audiobook playback duration, which is manually created by a user listening to the audiobook and marking the audiobook to words that are time markers in the audiobook which can then be used to both determine narration speed data and accurately reference soundtrack layers from position in the text to the position in the audiobook.

In one configuration, the system further comprises a mapping engine that is operable or configured to generate or receive mapping data that maps the audiobook playback timing to its corresponding text position in the electronic text. In one example, the mapping data maps words in the electronic text to their corresponding audiobook playback time (narration time) in the audiobook playback timeline at which they are narrated.

In an embodiment, the digital soundtrack is a text-position based soundtrack and the soundtrack player is configured to maintain a narration position variable representing the current word being narrated in the audiobook based on audiobook playback data comprising the current narration position in the audiobook playback and the mapping data, and trigger or schedule playback of the audio regions of the soundtrack based on the narration position variable.

In an embodiment, the digital soundtrack is a text-position based soundtrack and the soundtrack player is configured to extract or generate narration speed data from the mapping data, maintain a narration position variable representing the current word being narrated in the audiobook based on the narration speed data and audiobook playback data comprising the current narration position in the audiobook playback, and trigger or schedule playback of the audio regions of the soundtrack based on the narration position variable.

In an embodiment, the mapping data further comprises additional-text exception data indicative of or identifying one or more passages of additional text that is present in the electronic text but not narrated in the audiobook, and wherein the soundtrack player is configured to adapt the triggering or scheduling of the playback of the audio regions based on the additional-text exception data to maintain synchronisation between the playback of the soundtrack and the audiobook.

In an embodiment, the mapping data further comprises additional-text exception data indicative of or identifying one or more passages of additional text that is present in the electronic text but not narrated in the audiobook, and wherein the soundtrack player is configured to skip the narration position variable forward to a value past each respective identified passage of additional text when reaching the respective narration positions corresponding to where the additional-text is missing from the narration in the audiobook based on the additional-text exception data.

In an embodiment, the mapping data further comprises additional-audio exception data indicative of or identifying one or more passages of additional audio present in the narration of the audiobook but not present in the electronic text, and wherein the soundtrack player is configured to adapt the triggering or scheduling of the playback of the audio regions based on the additional-audio exception data to maintain synchronisation between the playback of the soundtrack and the audiobook.

In an embodiment, the mapping data further comprises additional-audio exception data indicative of or identifying one or more passages of additional audio present in the narration of the audiobook but not present in the electronic text, and wherein the soundtrack player is configured to pause or stall the narration position variable during the narration position periods associated with the identified one or more passages of additional audio based on the additional-audio exception data.

In an embodiment, the one or more passages of additional audio identified by the additional-audio exception data are either additional narration passages in the audiobook not present in the electronic text or narration pauses in the audiobook.

In an embodiment, the digital soundtrack is a text-position based soundtrack and the soundtrack player is configured to convert the text-position based soundtrack into a time-based soundtrack based on the mapping data, and trigger or schedule playback of the audio regions of the soundtrack based on audiobook playback data comprising the current narration position in the audiobook playback.

In an embodiment, the digital soundtrack is a time-based soundtrack and the soundtrack player is configured to extract or generate narration speed data from the mapping data, modify the soundtrack based on the narration speed data, and trigger or schedule playback of the audio regions of the modified soundtrack based on audiobook playback data comprising the current narration position in the audiobook playback.

In an embodiment, the soundtrack player is configured to trigger or schedule playback of the audio regions of audiobook playback data comprising narration speed data.

In an embodiment, the soundtrack player is switchable between a reading mode in which the playback of the soundtrack is synchronised based on the user's reading position and/or reading speed and a listening mode in which the playback of the soundtrack is synchronised based on the audiobook playback data. In an embodiment, the switch between reading mode and listening mode generates bookmark reference data from which soundtrack playback can re-commence once the mode switch is complete. If in reading mode, the bookmark reference may be a reading text position (e.g. data indicative of a word being read) which may be mapped to its corresponding audiobook playback time of when the word is narrated in the listening mode. If in listening mode, the bookmark reference may be the current audiobook playback time which may be mapped to its corresponding reading text position (e.g. data indicative of the word) in the electronic text that is currently being narrated.

In an embodiment, the system further comprises an operable volume control interface that is operable to control the volume of the soundtrack playback relative to the audiobook playback, or vice versa.

In a seventh aspect, the invention broadly consists in a method of synchronising the playback of a digital soundtrack, which is configured or defined relative to electronic text, to the playback of an audiobook associated with the same electronic text, the soundtrack comprising multiple audio regions that are configured for playback relative to respective text regions in the electronic text, the method implemented by a processor having associated memory, and comprising: receiving and processing the soundtrack; receiving or retrieving audiobook playback data associated with the current audiobook playback; and triggering or scheduling the playback of the audio regions of the soundtrack based at least partly on the audiobook playback data such that the audio regions are triggered or scheduled to playback as the audiobook playback narrates their respective text regions to thereby generate a soundtrack-enhanced audiobook.

The seventh aspect of the invention may have any one or more of the features mentioned in respect of the sixth aspect of the invention.

In an eighth aspect, the invention broadly consists in a method of generating a soundtrack-enhanced audiobook on an electronic system comprising a processor, memory and electronic display, comprising: receiving the digital audiobook into memory; receiving or retrieving electronic text corresponding to or indicative of the narration in the audiobook into memory for display; defining a soundtrack comprising soundtrack data defining one or more audio regions that are configured for synchronised playback with corresponding selected narration regions in the audiobook, the audio regions being defined based on text regions in the electronic text that correspond to the selected narration regions in the audiobook; generating mapping data comprising data representing multiple reference markers that map audiobook playback times to their corresponding text position in the electronic text; and outputting the soundtrack-enhanced audiobook comprising the audiobook, soundtrack data, and mapping data for playback.

In a ninth aspect, the invention broadly consists in a system for generating a soundtrack-enhanced audiobook, the system comprising: a processor, memory, electronic display presenting an operable graphical user interface, an audio output system, and wherein the system is operable to: receive a digital audiobook into memory; receive or retrieve electronic text corresponding to or indicative of the narration in the audiobook into memory for display on the graphical user interface; receive soundtrack configuration data via the graphical user interface defining a soundtrack comprising soundtrack data defining one or more audio regions that are configured for synchronised playback with corresponding selected narration regions in the audiobook, the audio regions being defined based on text regions in the displayed electronic text that correspond to the selected narration regions in the audiobook; receive configured mapping data via the graphical user interface comprising data representing multiple reference markers that map audiobook playback times to their corresponding text position in the electronic text; and output the soundtrack-enhanced audiobook comprising the audiobook, soundtrack data, and mapping data for playback.

In a tenth aspect, the invention broadly consists in a system for configuring mapping data relating to a soundtrack-enhanced audiobook, the mapping data representing multiple reference markers that map audiobook playback times to their corresponding text position in electronic text that substantially represents the narration in the audiobook, the system comprising a processor, memory, and a display presenting an operable graphical user interface, and an audio output system, the graphical user interface comprising: one or more electronic text layout panes configured to display at least a portion of the electronic text; an audiobook playback timeline pane that is configured to display a graphical representation of the audiobook playback timeline; an audiobook playback control interface for controlling the playback of the audiobook over the audio output system; and wherein the graphical user interface is operable by a user to control the playback of the audiobook over the audio output system and the display of the electronic text while inserting graphical reference markers that link or map the audiobook playback time of a narrated word in the audiobook playback to its corresponding text position in the displayed electronic text, the system generating and storing or outputting mapping data based on the inserted graphical reference markers.

In an embodiment, the graphical reference markers are configurable to extend between a selected audiobook playback time in the audiobook playback timeline pane and a selected text position in one or more of the text layout panes to thereby define a reference marker that maps or links a narrated word in the audiobook playback to its corresponding word in the displayed electronic text.

In an embodiment, the graphical user interface is further operable to enable a user to insert graphical additional-text exception markers that represent data indicative of or identifying one or more passages of additional text that is present in the displayed electronic text but which is not narrated in the audiobook.

In an embodiment, the graphical additional-text exception markers are configurable to highlight or select a passage of identified additional text in one or more of the text layout panes and graphically link that to a single selected audiobook playback time in the audiobook playback timeline pane corresponding to when the additional-text is missing from the narration in the audiobook.

In an embodiment, the graphical user interface is further operable to enable a user to insert graphical additional-audio exception markers that represent data indicative of or identifying one or more passages of additional audio present in the narration of the audiobook but not present in the displayed electronic text.

In an embodiment, the graphical additional-audio exception markers are configurable to highlight or select a passage or portion of identified additional audio in the audiobook playback timeline pane and graphically link that to a single selected text position in the electronic text displayed in one of the text layout panes corresponding to where the additional audio is not present in the displayed electronic text.

In an embodiment, the one or more text layout panes comprises a linear progression text pane that is configured to display a scrollable linear progression of words of the electronic text along a linear progression axis.

In an embodiment, one or more text layout panes comprises a reading text pane that is configured to display the electronic text in a conventional reading-type layout.

In an eleventh aspect, the invention broadly consists in a non-transitory computer-readable medium having stored thereon computer readable instructions that, when executed on a processing device or devices, cause the processing device to perform any of the methods of the aspects defined above.

In a twelfth aspect, the invention broadly consists in a soundtrack-enhanced audiobook generated or created according to or with any of the methods and/or systems of the aspects defined above.

In any of the above aspects defined above, the following features may apply:

In any of the above embodiments, audio playback properties may also be optionally defined for each audio region in the soundtrack. Examples of the audio playback properties include, but are not limited to, fade-in, fade-out, looping, panning effects, and volume effects, balance, equalization, reverberation, distortion, and phase-shifting.

In some embodiments, at least some audio regions further each being defined by playback effect data that defines one or more controllable audio playback effect settings that are to be varied across the audio region or a portion of the audio region based on the audiobook playback position (e.g. narration position).

In an embodiment, the soundtrack player is configured to control the audio playback effect settings of the audio output system in real-time or otherwise signal process the audio track of the audio region based on the audiobook playback position and/or narration speed variable for any audio regions having pre-defined playback effect data such that the audio playback effect settings are varied based on the narration position (e.g. narrated word) in the audiobook playback.

In one form, the audio output system may comprise a plurality of channels such that any overlapping audio regions can playback concurrently on separate channels, and wherein the method comprises controlling independently the playback effect settings of each channel based on any pre-defined audio playback effect data associated with the overlapping audio regions.

In one form, the pre-configured playback effect data may be defined by a programmable function the output of which represents a playback effect setting that is dependent on a variable corresponding to the narration position counter or a counter that is a product or function of the narration position counter, or a timer corresponding to the audiobook playback position.

In another form, the pre-configured playback effect data associated with an audio region may be in the form of a look-up table which defines a discrete playback effect setting for a series of discrete narration positions or audiobook playback times extending across at least a portion of the audio region.

In one form, the pre-configured playback effect data associated with an audio region may be represented in the form of one or more envelopes that each define a playback effect setting that is variable across at least a portion of the audio region, and where the shape of each envelope across the audio region or portion of the audio region defines how its associated playback effect setting is varied across the audio region or portion of the audio region. In one example, the pre-configured playback effect data may comprise a volume envelope that defines a variable volume setting to be applied during playback of the audio region, and controlling audio playback effect settings of the audio output system comprises updating a volume setting of the audio output system in real-time to match the volume envelope based on the listener's narration position within the audio region. Additionally or alternatively, the pre-configured playback effect data may comprise a panning envelope that defines a variable balance setting to be applied during playback of the audio region, and controlling the audio playback effect settings of the audio output system comprises updating a balance setting of the audio output system in real-time to match the panning envelope based on the listener's narration position within the audio region.

In some embodiments, the soundtrack player is configured to dynamically adjust the playback timing of the playback effect data based on narration speed data indicative of the narration speed setting during audiobook playback to ensure the originally configured narration-position dependent playback effect data varies as originally intended regardless of the narration speed setting at playback.

Definitions

The phrases "text position" or "reading position identifier" as used in this specification and claims, unless the context suggests otherwise, is intended to refer to a position or location within the electronic text such as typically a line or word or character of the electronic text or any other arbitrary selected position with the electronic text, and the position may be referenced or identified in any suitable manner appropriate to the electronic text, whether indirectly or directly, including but not limited to: an index value, numeric or otherwise, corresponding to the index position of a word or character in the electronic text for an electronic text that has been indexed, including a word number, or character number for example; or any other positional reference scheme for identifying locations within electronic text such as text position coordinates, Conical Fragment Identifier (CFI) values in the context of ePub or other electronic documents or content, or any other text positional reference scheme.

The phrases "hardware system" or "electronic user device" as used in this specification and claims is intended to mean, unless the context suggests otherwise, any form of computing, processing or programmable electronic device, platform or system typically including a processor and memory and including, but not limited to, portable or non-portable consumer electronic devices such as smart phones, cell phones, tablets, smart watches, e-Reader or e-book devices, laptops, and notebooks, gaming machines or consoles, server, smart televisions, general purpose computers such as desktop computers, specific purpose computers, wearable computers or computing devices such as head-mounted displays or eyewear or contact lens or the like, and is intended to include one or more linked or communicating hardware or processing devices or systems which work together.

The phrase "audiobook" as used in this specification and claims is intended to mean, unless the context suggests otherwise, any digital audio file or files representing or comprising a voice narration or reading of text, whether the text is electronic text, such as an e-book, or printed text, or any other voice recording, such as podcasts.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

The invention consists in the foregoing and also envisages constructions of which the following gives examples only.

In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc., in a computer program. When a process corresponds to a function, its termination corresponds to a return of the function to the calling function or a main function.

BRIEF DESCRIPTION OF THE DRAWINGS

Preferred embodiments of the invention will be described by way of example only and with reference to the drawings, in which:

FIG. 3J is a table showing an example of speech-to-text mapping data generated by the GUI of FIGS. 3F-3I during the creation of a soundtrack-enhanced audiobook in accordance with an embodiment of the invention;

DETAILED DESCRIPTION OF PREFERRED EMBODIMENTS

Figure 1:
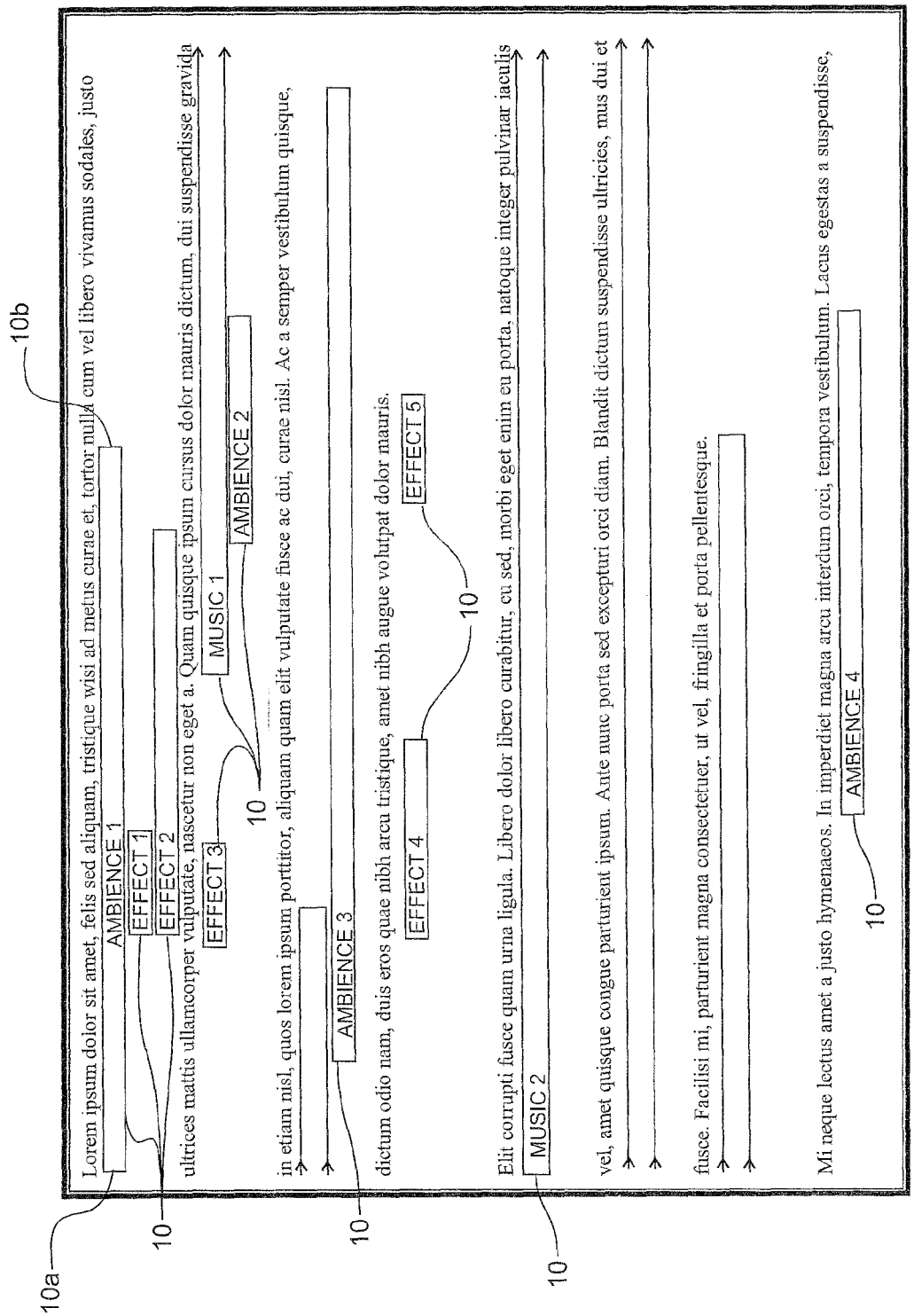
FIG. 1 is a schematic data illustration of a portion of text and the associated audio regions of a soundtrack configured for playback during the reading of electronic text in accordance with an embodiment.

1. Overview of Soundtrack-Enhanced Audiobook Creation and Playback System

Embodiments described below relate to two general approaches of the creation and playback of soundtrack-enhanced audiobooks. For the listener, both approaches provide an audiobook that plays back with a soundtrack that is synchronised to the events or words or scene being narrated in the audiobook. The soundtrack may comprise any combination of different audio features or audio regions that are triggered to playback during the duration of the soundtrack at preset start and/or stop times in the audiobook playback timeline. Typically, these preset start and/or stop times in the audiobook correspond to or relate to particular words being narrated, i.e. the audio regions are triggered to start and/or stop on particular narrated words to thereby create a soundtrack playback that is synchronised or precisely timed with the events being narrated in the audiobook. In this context, the audio regions of the soundtrack may be configured for synchronised playback with a corresponding narration region in the audiobook, each narration region being defined as the playback time or portion of the audiobook between a narrated start word and a narrated end word. The audiobook may be a narrative reading of an electronic text, such as an e-book, or a printed text, or any other text source.

The audio regions in the soundtrack may comprise any one or more of different types of audio regions including, but not limited to, music, ambience, or sound effects. One or more of the audio regions may fully or partially overlap and play concurrently with each other, or may be sequentially spread through the duration of the soundtrack. The audio regions are typically linked to a layer in the soundtrack depending on their type. The soundtrack may comprise a single layer, or a plurality or multiple layers, such as a music layer comprising music audio regions, an ambience layer comprising ambience audio regions, and a sound effects layer comprising sound effect audio regions. The various embodiments can therefore be configured to generate a multi-layered movie-style soundtrack experience for the listener of the audiobook.

In some embodiments, the audiobook has a variable narration speed setting which enables the listener to alter the pace or speed of the narration in the audiobook. For example, the listener may speed up the audiobook narration speed to listen to the narration at a faster pace or slow down the audiobook narration speed to slow the pace of the narration. Various interface options are available on digital audiobooks to alter the narration speed. Some digital audiobooks are provided with a narration speed setting provided a fixed number of predetermined narration speeds, often being multiplier speed factors relative to a nominal, ordinary or default narration speed (e.g. half speed, three-quarter speed, double speed etc). Other digital audiobooks are provided with a narration speed setting that is configurable along a continuous sliding speed narration scale such that the user can finely tune the narration speed setting.

The first approach to the creation and playback of soundtrack-enhanced audiobooks is described under sections 2-7 with reference to FIGS. 1-9. This first approach relates to embodiments in which a soundtrack is created (i.e. defined or configured) with reference to or relative to text representing the narrated words in the audiobook, and then mapping that soundtrack playback to the audiobook playback to generate the soundtrack-enhanced audiobook. In a first scenario, this first approach may relate to embodiments in which the soundtrack-enhanced audiobooks are created and/or played based on adapting or modifying (via generated text-to-speech mapping data) a pre-created or pre-existing soundtrack that is intended for synchronised playback with a corresponding electronic text (e.g. ebook) while the user reads the electronic text, i.e. adapting the playback of a pre-existing soundtrack configured for synchronised playback based on reading position and/or reading speed, to the playback timing of an audiobook narration of the ebook, at one or more variable narration speeds without altering the pitch of the soundtrack playback. In a second scenario, this first approach may relate to embodiments in which the soundtrack for text associated with the audiobook does not already exist, and comprises creating the soundtrack with reference to or relative to text representing the narrated words of the audiobook, and then adapting or modifying (via generated text-to-speech mapping data) the soundtrack for synchronised playback with the audiobook. The pre-created or generated soundtracks may be text-position or time-based soundtracks, as will be explained further.

The second approach to the creation and playback of the soundtrack-enhanced audiobooks is described under section 8 with reference to FIGS. 10-14. This second approach relates to embodiments in which synchronised soundtracks are created or generated for audiobooks in the time domain based on the audiobook playback timeline. The resulting soundtrack-enhanced audiobook comprises the audiobook and a soundtrack that has a variable duration that is dynamically adaptable to the narration speed setting or narration playback speed of the audiobook without altering the pitch of the soundtrack playback.

In general, the first approach creates soundtrack-enhanced audiobooks for a listener by either:
- adapting or modifying either pre-existing or pre-created soundtracks that are synchronised for playback while a user reads electronic text based on their reading position and/or reading speed, such that the modified soundtracks are synchronised for playback to a listener based on the audiobook playback time and/or narration speed setting, or
- first generating or defining a soundtrack relative to text representing the narrated words of the audiobook, and then adapting or modifying the soundtrack for synchronised playback with the audiobook based on the audiobook playback time and/or narration speed setting.

In general, the second approach creates soundtrack-enhanced audiobooks for listeners by generating or creating soundtracks with reference to the time domain to match the audiobook playback timeline.

It will be appreciated that aspects of the first and second approaches may be interchanged or combined.

The first approach to the creation and playback of soundtrack-enhanced audiobooks will now be described under sections 2-7 with reference to FIGS. 1-9.

2. Synchronised Soundtracks for Electronic Text

2.1 Overview

To enhance the reading experience, audio soundtracks relating to the content of electronic text, such as an e-book, may be produced and played to the user while they read the text. The playback system synchronises the playback of the soundtrack with the user's reading speed and/or expected reading position in the electronic text.

In an embodiment, a soundtrack for electronic text, such as an e-book or any other type of electronic text, is produced that comprises audio tracks of different types that are configured to play concurrently and/or sequentially while the user is reading the electronic text. Playback of the soundtrack is synchronized with the reading speed of the user such that the playback triggers based on their expected reading position within the text. The soundtrack may comprise a combination of different audio types, including ambient noise, sound effects, and background music that are configured to playback at a specific point or over specific portions or text regions of the electronic text in a synchronized manner as the user is reading those portions of the electronic text. The soundtracks comprise multiple audio regions that are designated to playback during designated text portions or text regions of the electronic text. Each audio region comprises audio data defining the audio track to playback, the start position in the electronic text or start time in the soundtrack at which the audio region is to commence playback, and a stop position in the electronic text or a stop time in the soundtrack at which the audio region is to cease playback.

Various user playback systems may be used for displaying the electronic text and controlling playback of the associated soundtrack. The user playback system may be implemented on various user hardware devices, including portable consumer electronic devices such as smart phones, tablets and dedicated e-reader devices or personal computers, whether desktop or laptop. In some configurations, the soundtrack data file or files, including all the audio tracks, may be entirely downloaded in advance and stored locally on the user device before playback can commence. In some embodiments, the soundtrack and audio track files are combined with the electronic text file as a single multimedia data file for download and playback. In other configurations, the soundtrack data file may be downloaded on the user device and the audio track files may be streamed individually or in batches from a remote database (e.g. the 'Cloud') during playback.

In some configurations, the user playback system processes the soundtrack data file and co-ordinates playback of the locally stored and downloaded audio track files or the incoming streamed audio track files in accordance with a reading position counter or variable that estimates the user's current reading text position in the electronic text (e.g. word they are currently reading) or otherwise synchronises the playback timing based on the user's reading speed. The accuracy of the user reading speed variable impacts on the accuracy of the synchronization of the soundtrack playback. In some forms, the reading speed variable is adjusted manually by the user, and in other forms the reading speed variable may be calculated and adjusted automatically from each page turn based on the number of words in the page and the time required to read the page.

The soundtracks may be generated and applied to electronic text in any format or file-type, including but not limited to those associated with the following file extensions: aeh, djvu, epub, fb2, html, xhtml, azw, lit, prc, mobi, KF8, exe, pdb, txt, pdb, pdf, ps, rgo, pdb, tr2, tr3, wol, rtf, doc, docx, asc, lit, wri, odt, text, pwi, rtx, sdw, strings, utf8, utf16, wp*, wpw, wri, wtx, asc, csv, lwp, dtp, indd, pmd, ppp, pub, fm, and any type of markup language types, including but not limited to SGML, HTML, XHTML, HTML5, XML, and LaTex. The electronic text may be in the form of any electronic media content whether comprising text only or text in combination with imagery or graphics, whether static or moving (e.g. video or other animations). By way of example, but not limited to, the electronic media content may be in the form of an e-book, a webpage, or any other electronic media content format.

The synchronised soundtracks may be provided in various formats, including a text-position based soundtrack or a time-based soundtrack, examples of which are provided below.

2.2 Example of a Text-Position Based Soundtrack for Electronic Media Content The text-position based soundtrack is customized to the electronic media content and in particular customized to the content of the electronic text to enhance the reading experience for a reader of the electronic text. The soundtrack may comprise audio tracks of different types and may be configured to play concurrently, sequentially, or both while the user is reading the electronic text. Playback of the soundtrack is synchronized with the reading speed of the user. In one example, the electronic text may be a fiction or non-fiction book, and the soundtrack may comprise a combination of different audio types, including ambient noise, sound effects, and background music that may be configured to play back at a specific point or over specific portions of the electronic text in a synchronized manner as the user is reading those portions of the electronic text.

The soundtrack comprises multiple audio regions that are designated to playback during designated text portions or text regions of the electronic text. Each audio region comprises audio data defining the audio track to playback and audio properties defining the desired nature of the playback. The audio data specifies a start text position in the electronic text at which the audio region is to commence playback and a stop text position at which the audio region is to cease playback. In one embodiment, the electronic text is designated a numerical text index based on the number or words or characters in the electronic text, and the start and stop text positions are defined by corresponding start and stop index values respectively. In one example, the indexing of the text is based on the number of words in the electronic text such that each word has a unique index value representing its position in the electronic text. The index values for each word may correspond to their word number or word count in the electronic text. In this example, the audio regions playback between start and stop index values representing the selected start word and stop word in the electronic text for that audio region.

When the user is reading the electronic text on a user playback system, a reading position counter or identifier or variable is maintained which corresponds to or is indicative of the text position (e.g. word) in the electronic text at which the user is estimated as currently reading. The reading position variable increments or changes at a rate at least partially based on a user reading speed variable indicative of the user's reading speed (e.g. a words per minute (wpm) value or equivalent). This reading position variable allows the playback of the audio regions of the text-position based soundtrack to be synchronized with the user's reading speed such that playback of an audio region is triggered when the reading position variable matches the start index value of the start word for the audio region, and likewise ceases when the reading position variable matches the stop index value of the stop word of the audio region.

In alternative embodiments, other reading position referencing schemes may be employed in contrast to word or character based indexing. In other embodiments, the start and stop positions of each audio region may be defined by any other document or text position referencing scheme or system. One such example is the ePub canonical fragment identifier (CFI). In such an example, the start and stop positions of each audio region in the soundtrack will be defined by the CFI parameter or ranges or values, and a reading position variable is maintained in the CFI format which changes or increments based on the user's reading speed to trigger the playback of the audio regions of the soundtrack when their respective CFI values match the reading position variable.

The soundtrack comprises multiple audio regions and playback of two or more regions may partially or entirely overlap such that two or more audio regions can playback concurrently if desired. The soundtrack is provided with multiple channels for playback and overlapping audio regions are designated different channels in the set of available channels to allow for concurrent playback. This enables different audio tracks, such as sound effects, ambient noise, or background music to be concurrently played and mixed together to provide an overall soundtrack that enhances the user's reading experience for that particular electronic text. Typically, the audio data for each audio region includes an audio type, such as "music", "ambience", or "effect". The selected audio type is intended to define the nature of the audio region. For example, if an audio region is for background music, then the audio type selected will be "music". If the audio region is a sound effect, then the "effect" audio type is selected. If the audio region is intended to be an ambient sound or noise, then the "ambience" audio type is selected.

By way of example, FIG. 1 shows a portion of electronic media content comprising electronic text only. FIG. 1 also overlays the text with a schematic representation of a number of audio regions 10 configured for playback during reading of the electronic text in the schematic representation, the audio regions 10 are each represented by a bar or underline that extends below the portion of text to which it relates. The start of each bar or underline of the audio region represents the start position at which the audio track of that audio region will commence playback and the end 10 represents the position in the electronic text at which the audio track of the audio region will cease playback. Each audio region may extend over a single word or group of words, a line, multiple lines or even pages. As shown the audio regions may overlap such that they playback concurrently.

Figure 2:
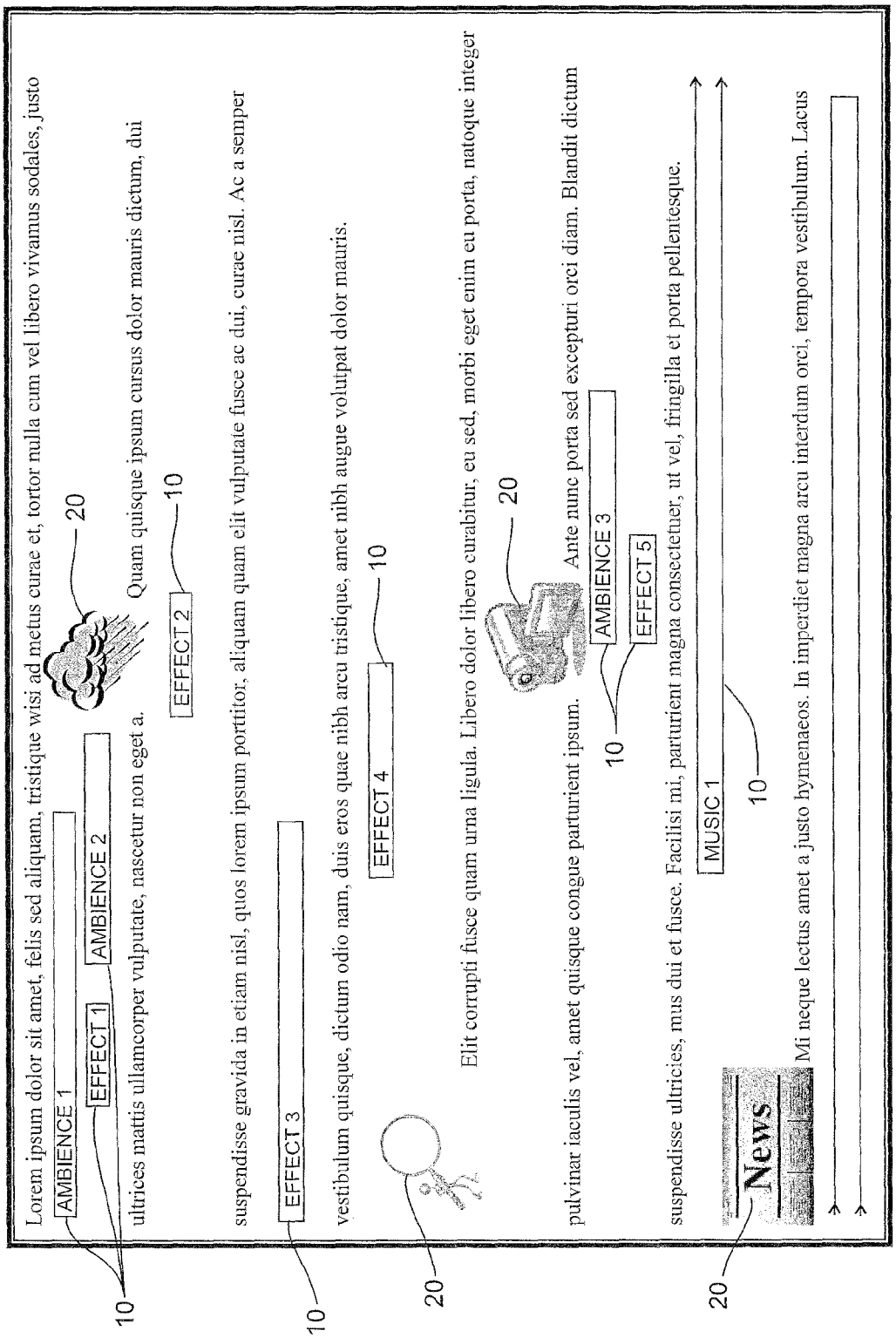
FIG. 2 is a schematic data illustration similar to FIG. 1 except showing a soundtrack configured for electronic media content comprising text and images in accordance with an embodiment.

Referring to FIG. 2, the electronic media content may comprise multimedia content comprising text and imagery, whether static or moving. FIG. 2 shows such an electronic text containing static images 20. For such electronic media content, the soundtrack audio region may have start and stop positions which either correspond to text or imagery. For example an audio region may be configured to start on a particular word, and then end when a user is expected to be looking at a particular image embedded within the text. Alternatively, an audio region may be configured to commence playback when a user is expected to be viewing a particular embedded image (whether static or video).

By way of example only, the text-position based soundtrack may be of the type described in WO2013/015694, which is herein incorporated by reference in its entirety.

2.3 Example of a Time-Based Soundtrack for Electronic Media Content

The time-based soundtracks provide a similar user experience to the text-position based soundtracks above, although are provided in a different format. The time-based soundtracks also provide multiple audio regions (e.g. music, ambience, and/or sound effects) that are designated to playback during designated text portions or text regions of the electronic text as represented by those depicted in FIGS. 1 and 2. Again, each audio region comprises audio data defining the audio track to playback in the audio region and any associated audio properties defining the desired nature of the playback, but the audio data differs from the text-based soundtracks in that the audio data for each audio region defines a start time in the soundtrack timeline at which the audio region is to commence playback, and a stop time in the soundtrack timeline at which the audio region is to cease playback. The start time and stop times designated in the audio data may be based on a nominal reading speed setting for example.

The time-based soundtracks may be played back on similar user playback systems that are used for the text-position based soundtracks. Before the user commences playback of a soundtrack when they are reading the electronic text on the user playback system, the system updates a user reading speed variable indicative of the user's reading speed either automatically, based on past stored history data, or where the reading speed setting is manually adjusted by the user. The soundtrack is then dynamically compressed in duration or expanded in duration to match the user's reading speed setting. In particular, the start and stop times of each audio region are adjusted based on the user reading speed setting. The modified soundtrack can then playback in a manner which is customised to the user's reading speed so as to synchronise the playback of the soundtrack to the individual reader to enhance their reading experience.

3. Overview of Soundtrack-Enhanced Audiobooks

The above soundtracks are configured and provided for a user to playback in a synchronised manner while they are reading an associated electronic text, such as an e-book for example. Many e-books have an associated audiobook, which may be purchased either with the e-book or independently of the e-book. Such audiobooks are typically provided as digital audiobooks in the form of a digital audio file or package of digital audio files. The audiobooks are narrative readings or voice readings of the e-book or book text and a user typically listens to an audiobook on an audio playback device, rather than reading the e-book on screen or reading the printed book. Audiobooks is also intended to cover other narrative readings or voice recordings, such as podcasts.

The text-position based soundtracks and time-position based soundtracks described previously are configured for triggered playback based on a reading position variable indicative of a user's reading position within the text and/or a user reading speed variable to trigger the timed playback of the audio regions, i.e. they are configured for playback according to the end user's reading of the electronic text. In a first scenario, the system and method described in more detail below is configured to allow such pre-existing or pre-created soundtracks to be adapted for playback in synchronisation with the audiobook playback associated with the same electronic text, which in this example is described as an e-book but could be any other form of electronic text, to thereby enhance the audiobook with a soundtrack. With such a system audiobook listeners can experience the same soundtrack experience as those that play the soundtracks while they read the electronic text.

In a second scenario, the system and method described in more detail below is configured to create soundtrack-enhanced audiobook by first generating or configuring a soundtrack based on electronic text representing the narrated words in the audiobook, and then generating mapping data between the electronic text and audiobook playback time to enable the playback of the soundtrack to be synchronised to the audiobook playback. This second scenario is utilized in cases where a pre-existing or pre-created soundtrack for text associated with the audiobook is not already available, and needs to be created to enable generation of the soundtrack-enhanced audiobook.

Various embodiments of the system and method will be described, including systems configured to synchronise the playback of the text-position based soundtracks or time-based soundtracks to the audiobook playback in real-time to provide a soundtrack-enhanced audiobook experience for the user. Additionally, or alternatively, a system and method for compiling or combining a text-position based soundtrack or time-based soundtrack with an audiobook to generate a compiled soundtrack-enhanced audiobook audio file at one or more different narration speeds will be explained.

4. Generation of Speech-to-Text Mapping Data

Some embodiments of the real-time playback and compilation systems for the soundtrack-enhanced audiobooks utilise mapping data which relates the narration position of the audiobook (e.g. playback timing or percentage played data) to the corresponding text position within the associated e-book or other electronic text representing the narrated words in the audiobook. The mapping data may be generated by a speech-to-text mapping engine or otherwise provided with the digital audiobook. The mapping data generated is used by the real-time playback system and/or compilation system to synchronise the soundtrack playback to the audiobook playback, as will be described in further detail later. In general, the mapping engine maps the audiobook playback in the time domain to the associated electronic text in the text-position domain, i.e. mapping a narration time in the audiobook playback to an text position identifier or reference (e.g. word count or CFI identifier or value) indicative of the word (also referred to herein as 'tokens') being narrated in the electronic text.

Figure 3A:
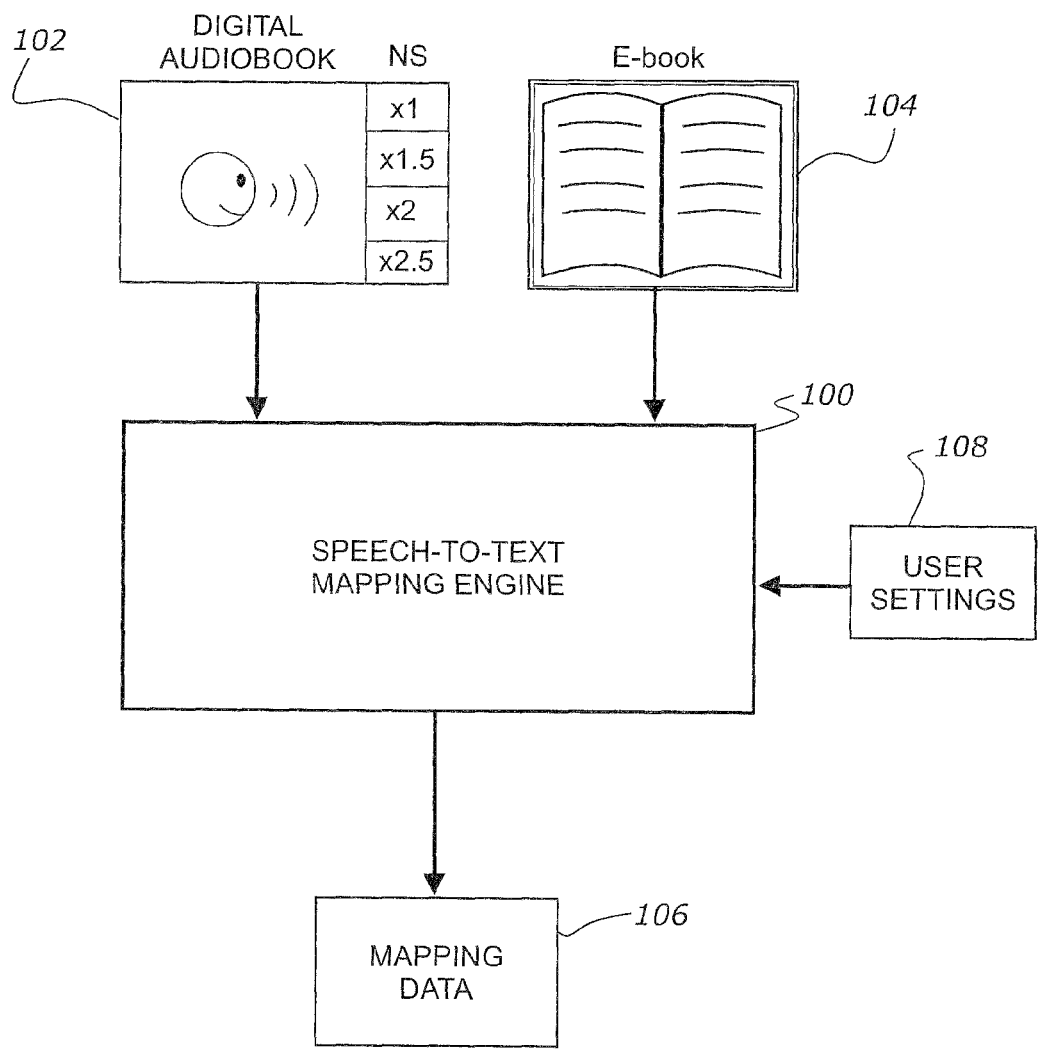
FIG. 3A is a schematic diagram of an embodiment of a speech-to-text mapping engine for generating mapping data relating the audiobook playback position or timing to its corresponding text position in the associated electronic text that is being narrated in the audiobook.

Referring to FIG. 3A, in an embodiment the system is provided with a speech-to-text mapping engine 100. The mapping engine 100 receives the digital audiobook data file or files 102, typically audio files in mp3 or other audio formats or similar, and the e-book data file 104 or other electronic text representing the narrated words in the audiobook (e.g. sourced from any digital text source or generated by a speech-to-text converter or engine). The digital audiobook 102 may comprise the digital audiobook audio file read at a fixed narration speed (e.g. narration speed (NS)=1, indicating a nominal or standard narration speed for most listeners such as approximately 150 words per minute for example), or alternatively may be provided with a package of audiobook versions at a range of different fixed narration speeds (e.g. NS=1, NS=1.5, NS=2, etc). Typically the range of narration speeds are multipliers with respect to each other, such as narration speed NS=1.5 is 1.5 times faster than NS=1.

In operation, the mapping engine 100 receives and processes the digital audiobook 102 and e-book 104 and generates output mapping data 106 representing the mapping between audiobook narration position (such as the audiobook playback time for example) to the e-book text position (such as the data indicative of the word in the e-book being narrated). For example, the mapping data may indicate that word 1 in the e-book is narrated at playback time equals 0 seconds in the audiobook, and word 400 is narrated at playback time 200 seconds in the audiobook, etc. The resolution and nature of the mapping data 106 generated by the mapping engine 100 may be configured and determined by user input settings 108, as will be further explained with reference to FIGS. 3B-3E. In some configurations or modes, the mapping engine 100 may be fully or partially-automated based on the user settings 108. In other configurations or modes, as will be explained with reference to FIGS. 3F-3K, the mapping engine may be manually operable by a user. As will be explained, in some configurations automatic pre-processing may be applied to generate some initial mapping data, which is then adjusted and/or supplemented via a manual mode, or the manual mode may be operated to generate the entire mapping data set if automatic pre-processing is not applied. In manual configurations or modes, the user may be presented simultaneously in a GUI with a navigatable audiobook playback timeline in one GUI pane or window, and one or more navigatable graphical representations of the electronic text representing the audiobook in one or more other GUI panes or windows, and the GUI may be operable by a user to playback the audiobook where desired and insert visual or graphical references markers between the audiobook playback timeline and electronic text, e.g. linking or referencing the narrated word in the audiobook playback timeline to its corresponding text position in the electronic text associated with the audiobook. The inserted reference markers representing mapping data points between words narrated in the audiobook playback timeline and the corresponding words in the electronic text.

4.1 Mapping Data Example—1:1 Mapping Resolution

Figures 3B, 3C:
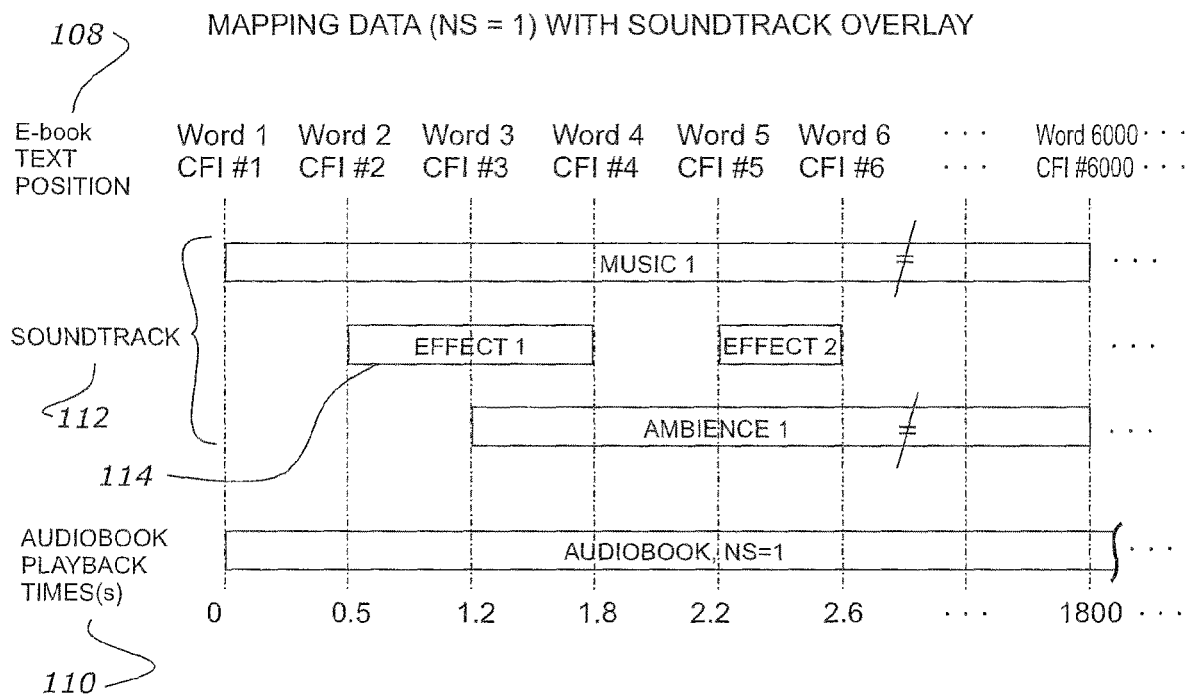
FIG. 3B is an example table of a portion of mapping data generated by the mapping engine of FIG. 3A at a 1:1 mapping resolution where each word in the electronic text is mapped to an audiobook playback position or timing of when it is being narrated.
FIG. 3C is a graphical representation of the 1:1 resolution mapping data of FIG. 3B depicted relative to a text position axis and an audiobook playback timeline, also showing an overlay of the audio regions of a soundtrack.

Referring to FIGS. 3B and 3C, an example of the form and format of the mapping data 106 generated by the mapping engine 100 at a 1:1 mapping resolution will be explained. The 1:1 mapping resolution generates mapping data in which each word in the e-book is mapped to a corresponding audiobook playback time in the audiobook as depicted in FIG. 3B. As shown, the mapping engine 100 may be configured to process each separate narration speed version of the audiobook to generate mapping data between the e-book text positions and the narration position (e.g. audiobook playback times) for each of the narration speed settings NS=1, NS=1.5, NS=2, NS=2.5, etc. However, in alternative embodiments it will be appreciated that the mapping engine 100 may be configured to generate only mapping data for a single narration speed, e.g. NS=1, and then generate an approximation of the mapping data for the remaining narration speeds by using a multiplier factor based on the narration speed setting. For example, if word 6000 occurs at 1800 seconds in the audiobook NS=1, then it is approximated that word 6000 would occur at 900 seconds in audiobook NS=2 (which is narrated 2 times faster).

Referring to FIG. 3C, the 1:1 resolution mapping data generated and depicted in FIG. 3B is shown in graphical representation with the e-book text positions (e.g. words or CFI values corresponding to words) provided on a linear progression axis and being mapped against the audiobook playback times 110 provided on a timeline axis. An example soundtrack 112 is also graphically overlaid between the e-book text position data 108 and audiobook playback time data 110. As shown, the soundtrack 112 may comprise multiple audio regions, which may overlap, comprising music, sound effects and ambience. The mapping data depicted in FIG. 3C is for an audiobook at NS=1, although it will be appreciated that the mapping data can be presented in a similar manner for the other narration speed settings, e.g. NS=1.5, NS=2, and NS=2.5 etc.

In this example, the soundtrack 112 is a text-position based soundtrack in which each audio region has a start position defined by a start text position (e.g. a word index value or CFI value for example) identifying when the audio region should commence playback and a stop text position (again e.g. a word index value or a CFI value for example) identifying when audio track is to cease playing. It will be appreciated that the word index of CFI values may alternatively be any other text position reference indicative of the word in the electronic text where the audio region is to start and stop. For example, a 'sound effect 1' audio region as shown at 114 and is designated to start when the user reads word #2 and end when the user reads word #4. The 1:1 mapping data enables the start text position and stop text position in the e-book to be related to the playback time in the audiobook at which those words are pronounced or narrated. In this example, the 'sound effect 1' will start at 0.5 seconds in the audiobook when word #2 is being narrated and end with the narration of word #4 at 1.8 seconds in the audiobook playback timeline. The mapping data therefore enables the text-position based soundtrack to be mapped into a time domain corresponding to the audiobook playback times and thereby can enable the soundtrack playback to be synchronised with the playback of the audiobook. In an alternative embodiment, the mapping data enables the playback time value of the audiobook to be converted into a corresponding e-book text position representing the text position in the electronic text which is currently being narrated in the audiobook and this text position or narration text position can then be used to trigger and coordinate playback of the soundtrack audio regions. Examples of these configurations will be explained in further detail with regard to FIG. 5 and FIG. 7.

4.2 Mapping Data Example—Marker-Determined Resolution

In this embodiment, the resolution or frequency of mapping of the e-book text position to the audiobook playback time may be configured or controlled by the user settings 108 of the mapping engine 100. By way of example, the default setting may be a 1:1 resolution mapping generating the 1:1 mapping data described with reference to FIGS. 3B and 3C. Alternatively, the mapping resolution may be controlled via markers or marker settings that delineate or segment the e-book text into a series of text portions or text segments.

The text portions or segments may be uniform in length (e.g. comprise the same number of words) or non-uniform in length in that the number of words for each text portion may vary relative to other text portions in the series. The start and end of each text portion in the electronic text or e-book is defined or bounded or identified by markers, which may be text position references such as word index values or CFI values or the like.

For uniform text portions of uniform length, the markers may be configured to have or be spaced apart by a predetermined quantity of text, such as a predetermined number of words or be spaced apart by a frequency defined by a predetermined number of words, for example a marker per 50 words or 200 words or 500 words etc. In other embodiments, the markers may be arbitrarily spaced, thereby creating non-uniform length text portions. By way of example, the markers may be configured to delineate text portions corresponding to each sentence, each paragraph, each chapter, or may delineate the text into text portions of any number of sentences, or any number of paragraphs or any number of chapters, for example the markers may be spaced apart by for example every three sentences or every two chapters or every six paragraphs etc. The larger the marker spacing, the lower the resolution of the mapping. The highest resolution mapping is a 1:1 mapping where each marker corresponds to every word in the electronic text ranging through to the lowest resolution in which there are only two markers, one corresponding to the start of the electronic text and one corresponding to the end of the electronic text, i.e. only one text portion. Segmenting the electronic text by one or more sentences, paragraphs or chapters are more medium resolution mappings.

Figures 3D, 3E:
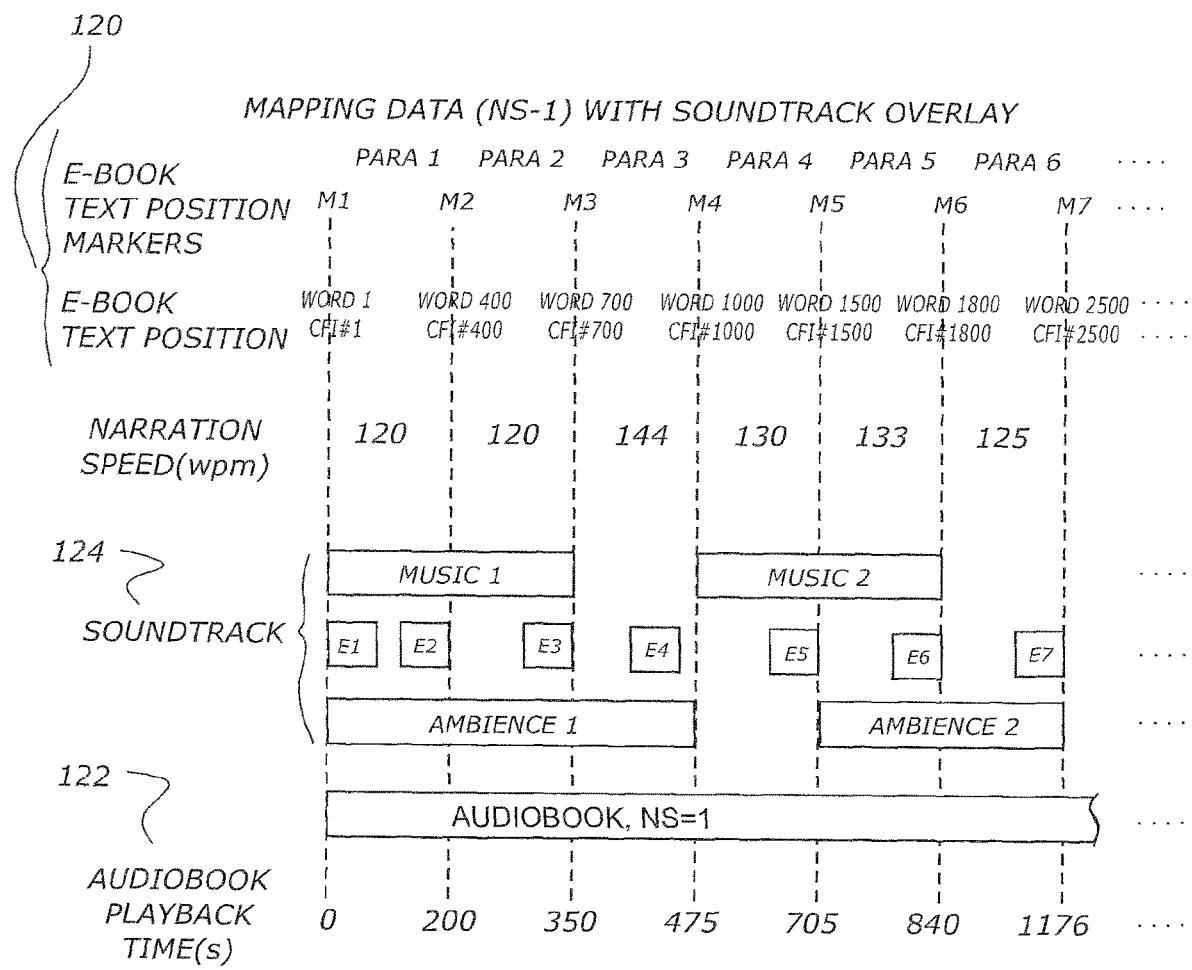
FIG. 3D is an example table of a portion of mapping data generated by the mapping engine of FIG. 3A at a lower resolution based on arbitrary or predetermined markers.
FIG. 3E is a graphical representation of the marker-determined resolution mapping data of FIG. 3D depicted relative to a text position axis and an audiobook playback timeline, also showing an overlay of the audio regions of a soundtrack.

Referring to FIG. 3D, an example of the marker-determined mapping data generated by the mapping engine 100 is shown. In this example, the user settings 108 to the mapping engine 100 are configured to designate the markers M1, M2, M3 . . . to delineate the e-book into text portions corresponding to each paragraph. For example, paragraph 1 exists between marker M1 and M2, paragraph 2 exists between marker M2 and M3, paragraph 3 exists between marker M3 and M4, and so on. In this embodiment, the markers are indicative of an e-book text position, such as a word or corresponding CFI value or any other suitable referencing identifier or index value within the electronic text. As shown, each marker M1, M2, M3 and so on is mapped to a corresponding audiobook playback time for the or each narration speed (NS) setting or version of the audiobook.

The mapping data may also comprise narration speed data that is calculated for each text region. In this example, a narration speed for each paragraph is calculated or determined. For example, paragraph 1 comprises 400 words and is narrated over a period of 200 seconds, which equates to a narration speed of 120 words per minute. In other words, the narration speed for each text portion is calculated based on the quantity of text (e.g. the number of words) in that text portion and the audiobook playback time corresponding to that text portion. The narration speed may vary over the course of the audiobook. It will be appreciated the frequency of narration speeds calculations may be increased or decreased depending on the marker-determined mapping resolution. In this example, a narration speed is calculated per paragraph, but for a lower resolution mapping where the text portions correspond to each chapter there would be a narration speed calculated per chapter, or for the lowest resolution a single average narration speed may be calculated based on the total number of words in the e-book and the total audiobook playback time. Higher resolutions of narration speed data may also be generated, such as a narration speed per sentence or any other marker-determined resolution.

As shown, the mapping data may be provided for one or a number of narration speed versions of the audiobook, e.g. NS=1, NS=1.5, NS=2 and so on, or alternatively the mapping data may be approximated for alternative narration speeds based a mapping data for a nominal narration speed, e.g. NS=1, by using a modifier or multiplier factor corresponding to the narration speed, as discussed with reference to FIG. 3B.

Referring to FIG. 3E, the marker-determined mapping data from FIG. 3D is graphically depicted in a similar manner to FIG. 3C with the e-book text position as shown in 120 and associated markers displayed in a linear progression along a reading position axis and with the corresponding mapped audiobook playback times displayed along a timeline axis at 122. By way of example, a text-position based soundtrack with its various music ('music 1', 'music 2'), sound effect ('E1'-'E7'), and ambience ('ambience 1', 'ambience 2') audio regions are depicted for a portion of the audiobook. As will be explained with reference to the systems of FIG. 6 and FIG. 8, the narration speed data extracted or calculated from the marker-determined mapping data can be used to synchronise the playback of a text-position based soundtrack by controlling the rate of change of a reading position variable or token counter or word counter, or can be used to synchronise the playback of a time-based soundtrack to the audiobook by modifying the start and stop times of the audio regions based on the narration speed data.

4.3 Mapping Data Example—1:1 Mapping Data with Marker-Determined Narration Speed Data In alternative embodiments, the mapping data of the type depicted in FIGS. 3B and 3D can be combined, or the desired narration speed data from FIG. 3D can be deduced or calculated from the 1:1 resolution mapping data. For example, in an embodiment, the mapping engine 100 may be configured to generate a 1:1 resolution mapping data in which each text position (e.g. word index value or CFI value) in the electronic text (e.g. e-book) is mapped to a corresponding narration position (e.g. an audiobook playback time) in the audiobook. Based on this, any of the e-book text positions may be designated as markers, whether spaced apart uniformly or arbitrarily or based on sentences, paragraphs or chapters as described with reference to FIG. 3D. Those marker designations then define the text regions or text segments for which respective narration speeds are deduced or calculated as they were with regard to FIG. 3D. Therefore, from a 1:1 mapping data, any resolution of marker-determined mapping data relating to narration speed data may be calculated or determined, whether it is an average narration speed for the entire e-book or a narration speed per chapter, paragraph, sentence or groups thereof.

4.4 Mapping Data Example—Graphical User Interface for Synchronising Text to Speech and Generating Mapping Data As discussed above, in some configurations the text-to-speech mapping engine 100 may be fully or partially manual. Referring to FIGS. 3F-3K, an example of a graphical user interface (GUI) for generating the mapping data between the electronic text (upon which the soundtrack audio regions are defined or referenced) and the audiobook playback timeline will be described. This mapping GUI may be a separate component or module, or part of or integrated with the soundtrack-enhanced audiobook creation system.

Figure 3F:
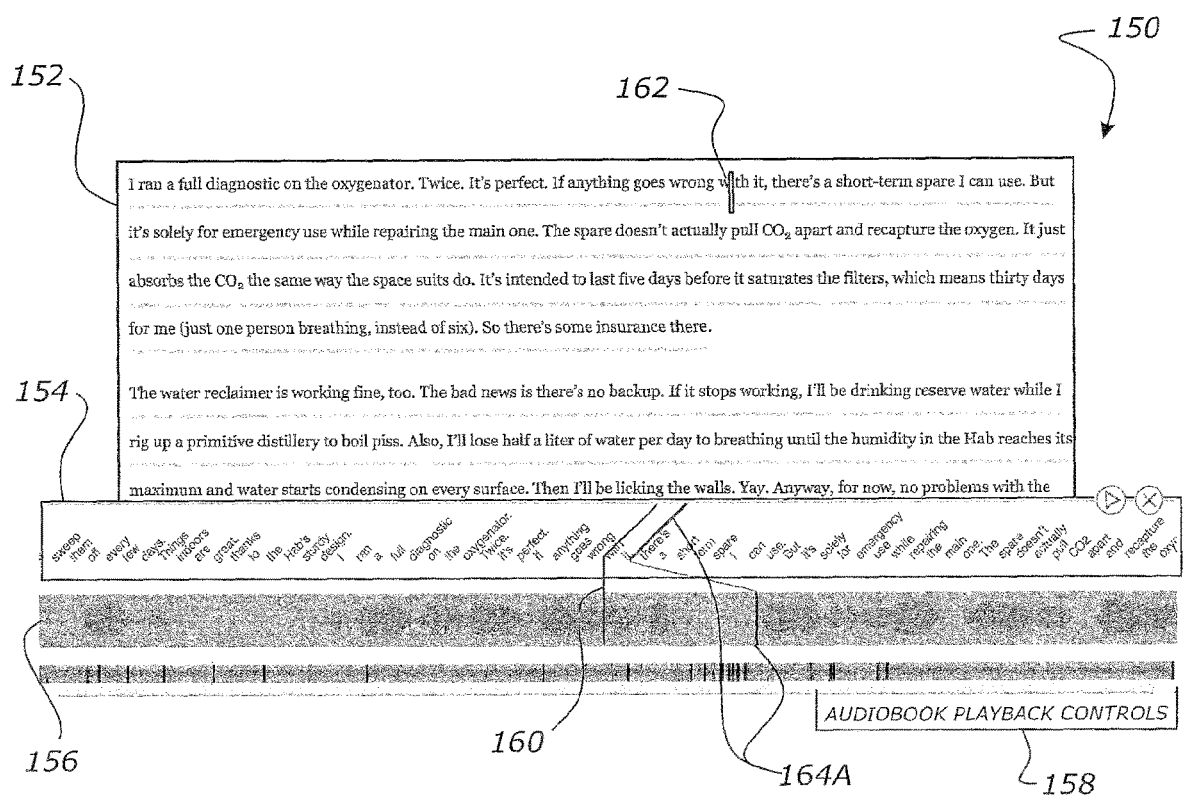
FIG. 3F is a screenshot of a graphical user interface (GUI) for generating speech-to-text mapping data relating the audiobook playback position or timing to its corresponding text position in the associated electronic text that is being narrated in the audiobook in accordance with an embodiment of the invention, and showing a user-defined singular synchronization reference marker.

Referring to FIG. 3F, an embodiment of the mapping GUI 150 is shown by way of example, and this is displayed on a screen on an electronic hardware system, such as a PC or similar. In this embodiment, the mapping GUI 150 has a reading text pane or window 152 depicting or displaying a portion of the electronic text associated with the audiobook in a conventional reading-type layout. The mapping GUI 150 also has a linear progression text pane or window 154 that is configured to display the individual words or tokens of the electronic text along a linear progression axis. Both text panes 152, 154 are user-scrollable or navigatable to scroll to display different portions of the electronic text as desired. In some modes, the text panes 152, 154 may be linked together to display the same portion of text or one may be a zoomed-out or zoomed-in portion of text relative to the other pane. In other modes, the text panes 152, 154 may be independent of each other to enable each to be navigated to different portions of the text. The mapping GUI also comprises an audiobook playback timeline pane or window 156 that graphically depicts the audiobook playback timeline or axis. In this embodiment, the audiobook playback timeline pane 156 displays a waveform representation of the audiobook along its playback timeline axis. In this embodiment, the audiobook playback timeline is configured to be linked to at least one but preferably both of the text panes 152, 154 such that the text displayed in either or both panes scrolls or updates to display text representing or comprising the narrated words in the audiobook being currently played back by the operator or user.

In this embodiment of the mapping GUI 150, both text panes 152, 154 are displayed simultaneously with audiobook playback timeline pane 156. However, it will be appreciated that the mapping GUI may alternatively operate with the audiobook playback timeline pane 156 and just one of either of the text panes 152,154.

In operation, the user of the mapping GUI 150 is able to control playback of the audiobook over audio output devices (e.g. speakers or headphones or similar) via operation of a conventional audiobook playback controls 158 presented on the GUI 150. In this embodiment, the playback controls may include for example play, pause, rewind, fast-forward, skip backward, skip forward, and stop, although the playback controls may be simpler or more complex in other embodiments. The user may operate the playback controls 158 either alone or in combination with scrolling in the audiobook playback timeline to commence playback of the audiobook at the desired position.

As the user or operator plays the audiobook via the playback controls 158, the audiobook playback timeline pane 156 scrolls to with a graphical waveform representation of the narrated words in the audiobook currently playing back, and one or both of the text panes scroll to display the corresponding text based at a rate determined on default initial mapping data that maps the start and end of the audiobook to the corresponding start and end words of the electronic text. The user then progressively inserts one or more graphical singular reference markers linking the audiobook playback time from the audiobook playback timeline pane 156 to its corresponding word represented in one or both of the text panes 152,154. Additionally, the user may insert one or more exception reference markers, which assist in synchronising the text to the audiobook in scenarios where there is missing electronic text relation to the audiobook narration, or additional narration relative to the electronic text, or large pauses in the audiobook narration that are likely to cause a loss in synchronisation of the or a noticeable loss in synchronisation between the soundtrack and audiobook. The various different types of reference markers will be explained further below. Each mapping reference marker or point generates a mapping data point, the collective mapping points represent the final mapping data output.

Typically the user generates the mapping data via the mapping GUI 150 by starting the audiobook playback at time Os and progressing forward in portions or chunks from there to progressively insert one or more marker references at multiple user-defined points along the playback timeline, to accumulate the mapping data. However, the mapping data may be generated by starting anywhere in the audiobook playback as desired. As will be appreciated, some audiobooks may require more reference markers to achieve adequate synchronisation than other audiobooks, depending on the narration style and content of the audiobook. However, as a general rule, more reference markers generally represents a higher chance of close synchronisation throughout the entire audiobook playback.

As shown in FIG. 3F, in this embodiment of the mapping GUI 150, a current playback position marker 160 is depicted representing where the current playback position of the audiobook is. In this embodiment, the playback position marker 160 is configured to extend between the audiobook playback timeline pane 156 and the linear progression text pane 154 and represents a link between the current audiobook playback time or position (e.g. in seconds in the audiobook playback timeline) and the word in the electronic text which is determined or mapped as being narrated at that time based on the currently configured mapping data. In this embodiment, the mapping GUI 150 operates a word or token counter with reference to the text and which represents the word that is calculated as being narrated at the corresponding audiobook playback time based on the configured mapping data. The objective of inserting the various reference markers using the mapping GUI 150 is to generate mapping data that causes the playback position marker 160 to closely correlate between the narrated word in the audiobook playback time and its actual corresponding word in the electronic text, along the entire audiobook playback timeline.

Optionally, as shown, a secondary text position indicator 162 may be displayed on the reading layout text pane 152 to identify the word determined to be narrated at the current audiobook playback position based on the current mapping data.

Singular Synchronisation Reference Markers

Singular synchronisation reference markers will be explained with reference to FIGS. 3F and 3G. As will be appreciated, the singular reference markers are equivalent to the marker-determined resolution mapping concepts described with reference to FIGS. 3D and 3E. As discussed, the singular reference markers are inserted to represent singular mapping data points between a narrated word in audiobook playback time and its corresponding word in the electronic text.

The mapping data typically starts with default singular synchronisation reference markers. The default reference markers are typically defined by start and end markers which link the audiobook playback start time (e.g. 0s) to the corresponding start word in the electronic text, and the audiobook end time to the corresponding end word in the electronic text. These markers may be either manually or automatically configured.

The user or operator may then insert one or more, and typically multiple, further intermediate singular reference points along the audiobook playback timeline, to define further individual distinct mapping points between the audiobook playback timeline the and electronic text. The user may insert these singular reference points at an arbitrarily desired positions along the audiobook playback timeline, and typically at any locations where a substantial loss of synchronisation is apparent.

Figure 3G:
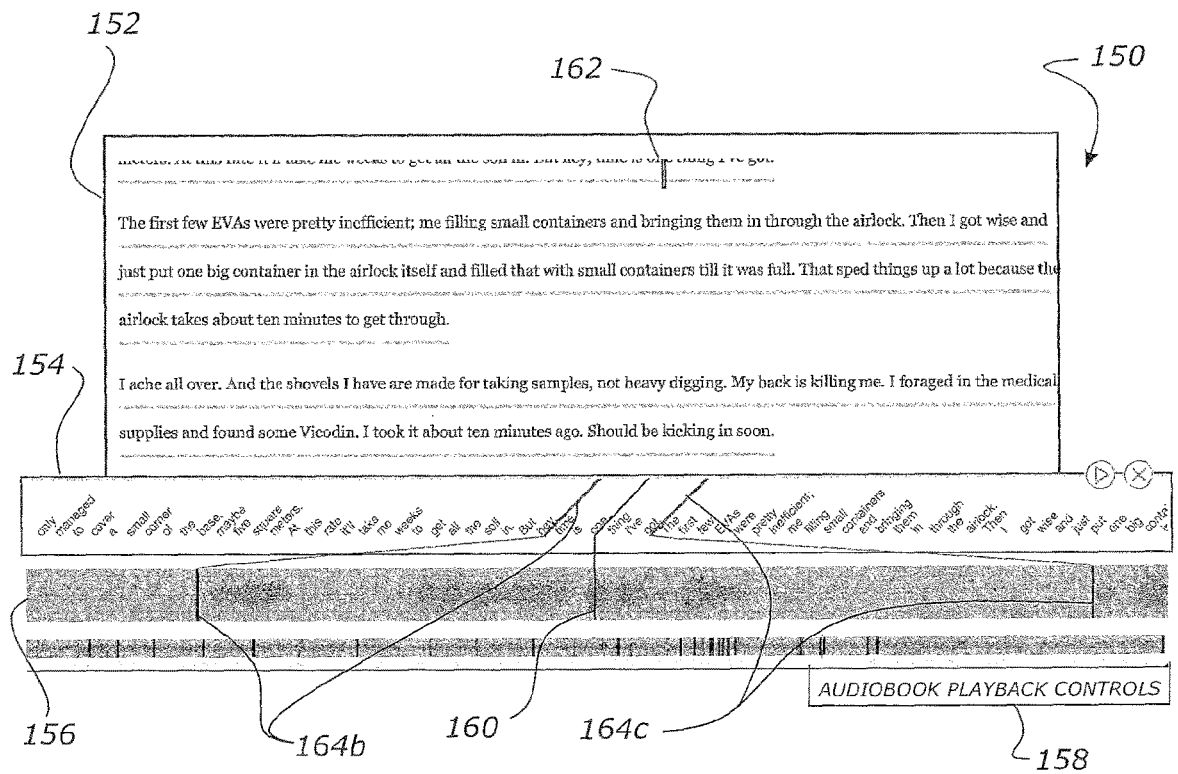
FIG. 3G is a screenshot of the GUI of FIG. 3F showing multiple user-defined singular synchronization reference markers in accordance with an embodiment of the invention.

By way of example, FIGS. 3F and 3G show user-defined singular reference markers inserted at 164*a*. 164*b*, and 164*c*. The reference markers graphically depict a link between a selected point the audiobook playback timeline and a selected word in the electronic text (the user thereby creating a user-defined mapping point between a narrated word in the playback timeline and the corresponding word appearing in the displayed electronic text).

Additional-Text Exception Marker

In some situations, the electronic text may not correspond exactly to the narrated audiobook. For example, if the electronic text is an e-book version of the audiobook, it's possible the e-book version and audiobook version may not match exactly. Such discrepancies between the electronic text and narrated text may cause significant loss in synchronisation during playback.

In one scenario, it is possible that the electronic text upon which the soundtrack is configured may contain additional text or passages that are not narrated in the audiobook. This may happen at one or more points in the electronic text. If identified by the user or operator, the user may insert a special exception marker to identify the additional text and where it occurs relative to the audiobook playback timeline.

Figure 3H:
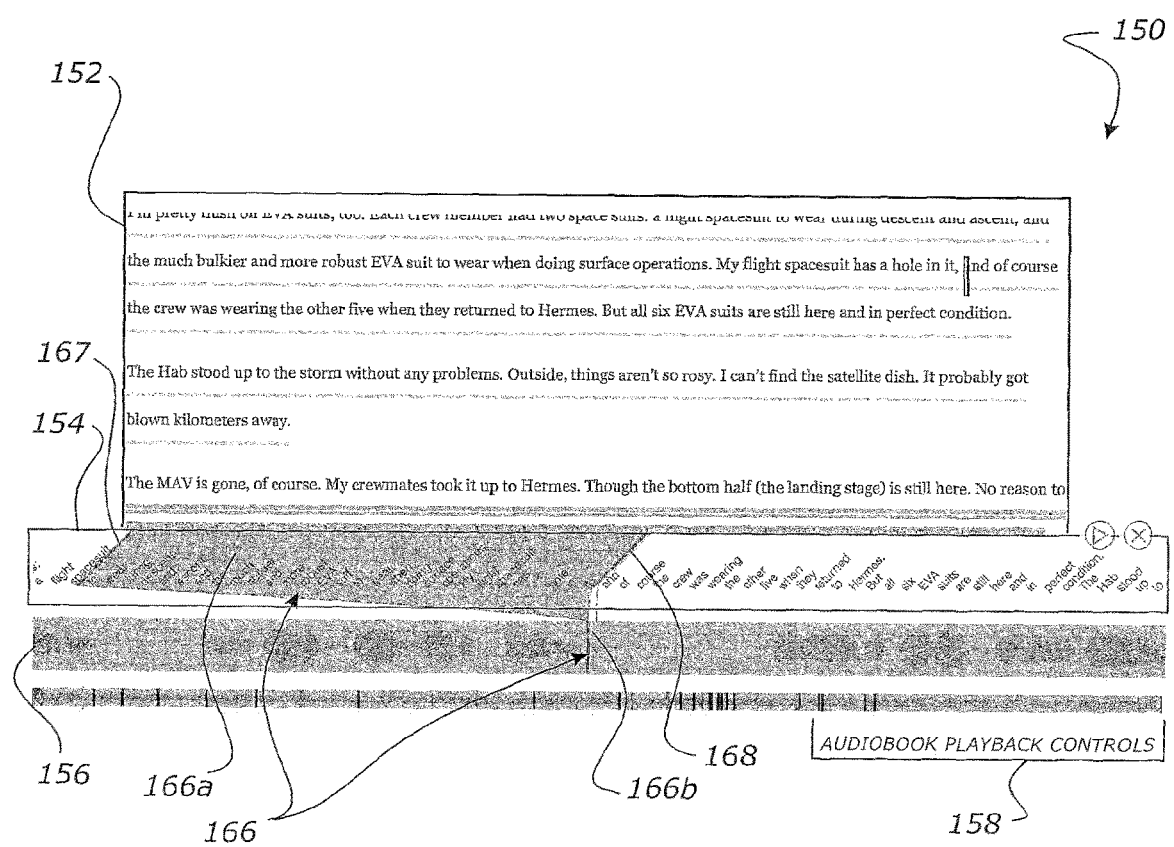
FIG. 3H is a screen shot of the GUI of FIG. 3F showing a user-defined additional-text exception marker representing additional text (upon which the soundtrack audio regions are defined or configured) that not narrated in the audiobook in accordance with an embodiment of the invention.

Referring to FIG. 3H, an example of an additional-text exception marker 166 is shown. The user may highlight or select the additional text 166*a* in the linear progression text pane 154 as shown (or alternatively via the reading-layout text pane) and link that to the corresponding audiobook playback position or time point 166*b* in the audiobook playback timeline pane 156 where the corresponding narration appears to be missing. The additional-text exception marker 166 creates mapping data that effectively links or references the start word 167 and end word 168 of the identified additional passage of the electronic text to the same singular audiobook playback position 166*b* in the timeline. It will be appreciated that multiple exception markers may be inserted or created by the operator, one for each identified additional text passage.

During playback of the soundtrack-enhanced audiobook, this additional-text mapping data effectively causes the soundtrack playback triggering word or token or text position counter (or narration position variable) to jump or skip forward to the next word after the additional passage when reaching the corresponding audiobook playback position 166*b* representing the identified additional passage of text, to ensure synchronisation is maintained.

The additional-text exception marker can also be considered as a special case of two singular reference markers which both have the same audiobook playback time value 166*b*, and different text position values (e.g. word count or token index values), one corresponding to the start word 167 and one corresponding to the end word 168.

Additional-Audio Exception Marker

As noted above, in some situations the electronic text may not correspond exactly to the narrated audiobook. In one scenario it is possible that the audiobook may contain one or more additional narration passages that are not present in the corresponding electronic text upon which the soundtrack is configured. This may happen at one or more points in audiobook playback timeline. Again, such discrepancies between the electronic text and narrated text may cause significant loss in synchronisation during playback.

If additional audio narration passages are identified by the user or operator, the user may insert a special exception marker to identify the additional audio narration passages in the audiobook playback timeline and where it occurs relative to the electronic text.

In another scenario, it is possible that large or significant pauses or delay within the narration (i.e. between narrated words) in the audiobook playback may cause a loss in synchronisation of the soundtrack and audiobook playback.

The pauses or delay in narration are equivalent in effect to the additional narration passages discussed above, and if identified the user may insert a special marker to identify the audio narration pauses.

In either of the above scenarios, an additional-audio exception marker may be inserted or created to identify the additional audio passages that may cause a loss in synchronisation, whether they are additional narration passages or audio narration pauses.

Figure 3I:
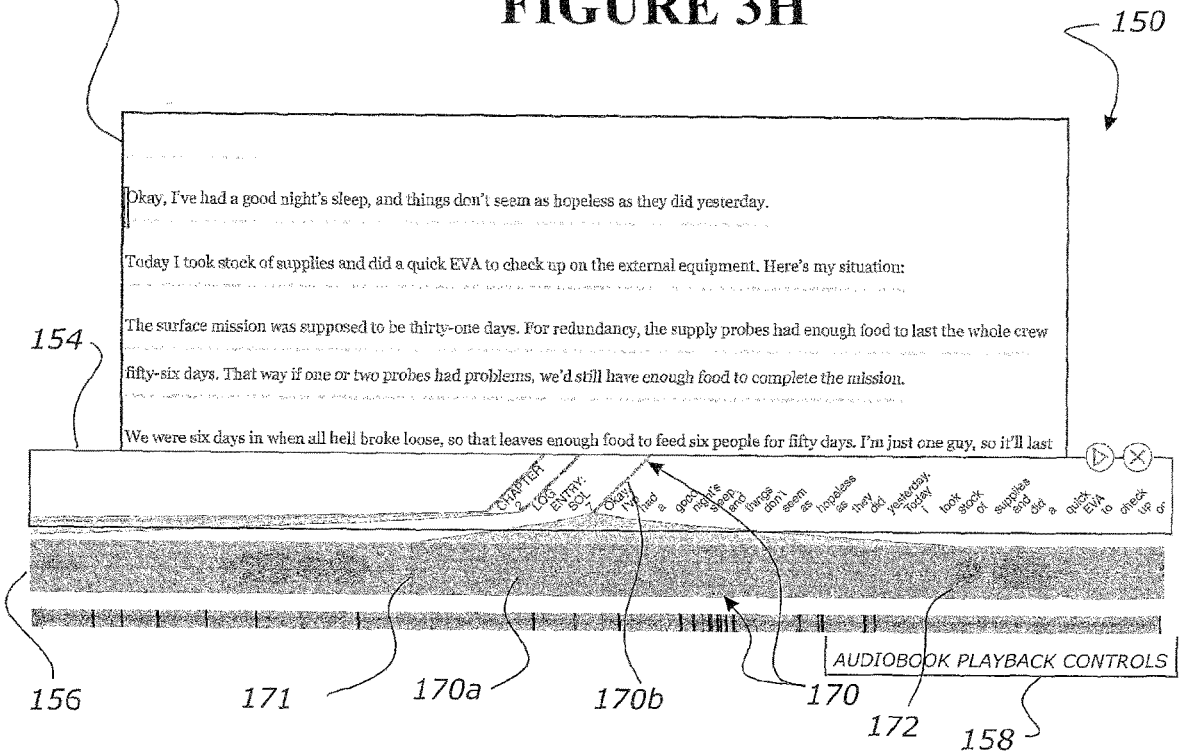
FIG. 3I is a screen shot of the GUI of FIG. 3F showing a user-defined additional audio exception marker representing additional audio narration in the audiobook not present in the text (upon which the soundtrack audio regions are defined or configured) or identified narration pauses in the audiobook that are likely to cause loss in synchronization between the soundtrack playback and audiobook playback in accordance with an embodiment of the invention.

Referring to FIG. 3I, an example of the insertion of an additional-audio exception marker 170 is shown and will be described. In this example, the exception marker is used to identify an audio narration pause in the audiobook playback, but it will be appreciated that the same type of exception marker could be applied similarly to an additional narration passage. The user may highlight or select the additional audio 170*a* (in this case a narration pause which is represented or shown as a muted or zero waveform) in the audiobook playback timeline pane 156 and link that to the corresponding text position or word 170*b* (e.g. token) in the linear progression text pane 154 (or alternatively via the reading-layout text pane) where the additional audio (narration pause in this example) occurs. The additional-audio exception marker 170 creates mapping data that effectively links the start time 171 and end time 172 of the identified additional audio in the audiobook playback to the same singular text position or word 170*b* in the electronic text. It will be appreciated that multiple exception markers may be inserted or created by the operator, one for each identified additional audio passage (whether additional narration audio or a narration pause).

During playback of the soundtrack-enhanced audiobook, this additional-audio mapping data effectively causes the soundtrack playback triggering word or token or text position counter (or narration position variable) to stall or pause incrementing during the playback of the identified additional audio, to ensure synchronisation is maintained. In other words, the word or token or text position counter driving and/or triggering the playback of the audio regions of the soundtrack does not change within the time period of the audiobook playback defined between the start 171 and end 172 times of the identified additional audio.

The additional-audio exception marker can also be considered as a special case of two singular reference markers which both have the same text position value (e.g. word count or token index value) 170*b*, and different audiobook playback time values, one corresponding to the start time 171 of the identified additional audio and one corresponding to the end time 172 of the identified additional audio.

Mapping Data—Example Table and Graph

Figure 3K:
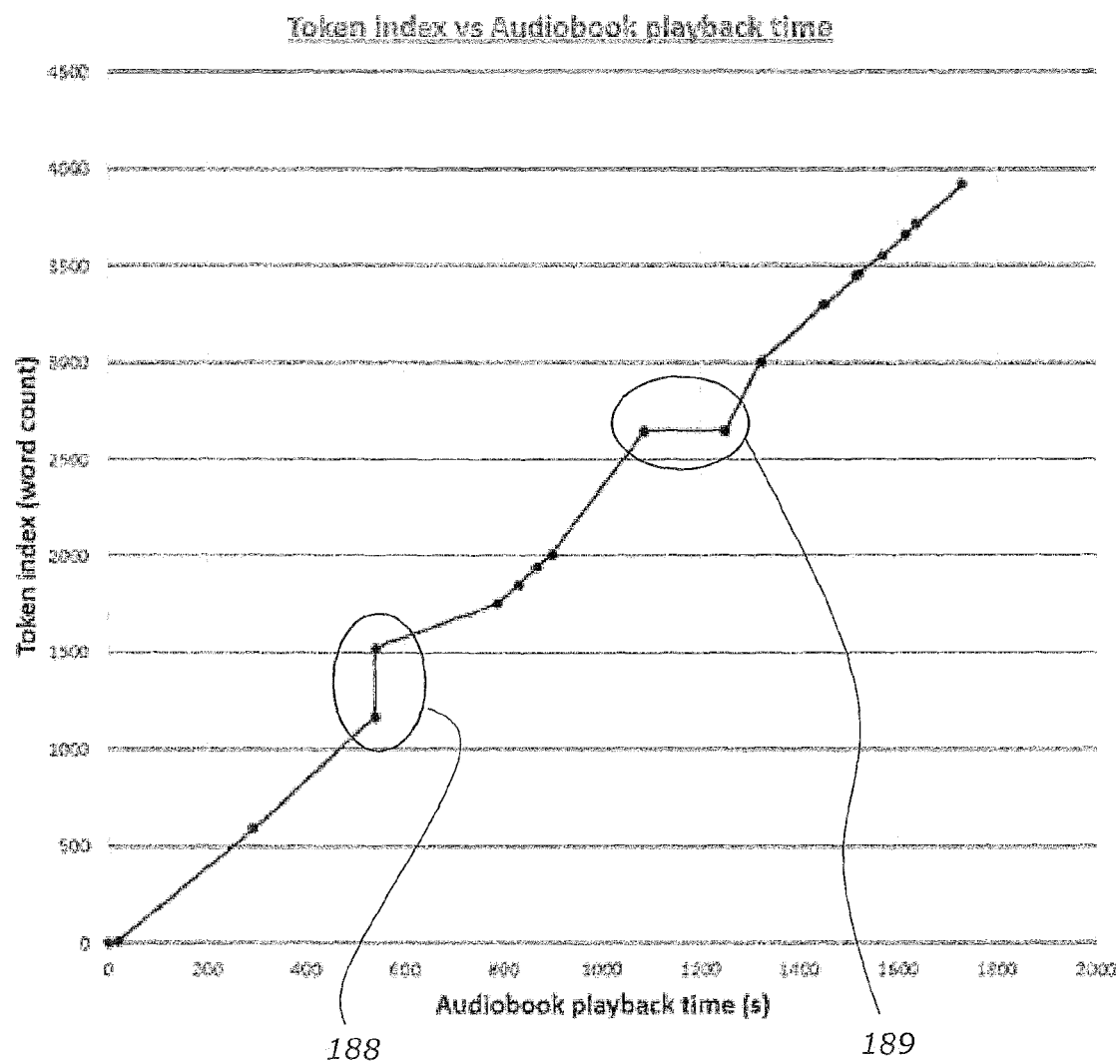
FIG. 3K is a graph of the token index versus the audiobook playback time from the mapping data of FIG. 3J in accordance with an embodiment of the invention.

Referring to FIGS. 3J and 3K, an example of the mapping data generated by the mapping GUI described with reference to FIGS. 3F-3I will be described. The mapping data represented in the table 180 is indicative of the type of mapping data generated by the mapping GUI once the user has inserted all the desired reference markers, whether singular synchronisation markers (e.g. 164*a*-164*c* seen in FIGS. 3F and 3G) or exception markers (e.g. 166 and 170 seen in FIGS. 3H and 3I).

Each row in the table 180 represents an inserted user-defined reference marker. Column 181 represents the audiobook playback time, which may be in a time unit such as seconds or similar. Column 182 represents the text position (e.g. word count or token index value or similar identifier) within the electronic text.

The rows identified by 187 in the table of mapping data 180 represent the mapping data created by user-defined singular synchronisation reference markers. For example, each of the rows 187 represents a singular synchronisation reference marker and shows the audiobook playback time in column 181 and its corresponding token index value (e.g. word count) in column 182.

The two rows identified by 188 represent the mapping data created by a user-defined additional-text exception marker, such as the marker 166 described with reference to FIG. 3H. As shown, the exception marker generates a single audiobook playback time value that maps to two different text positions (e.g. word count or token index value) in the electronic text that define the start and end of the identified additional text passage. As shown, this can also be represented in the mapping data 180 as a special case of two singular synchronisation reference markers, each having the same audiobook playback time but referencing to different text positions in the electronic text (e.g. the start and end of the identified additional text passage).

The two rows identified by 189 represent the mapping data created by a user-defined additional-audio exception marker, such as marker 170 described with reference to FIG. 3I. As shown, the exception marker generates a single text position value (e.g. word count or token index value) in the electronic text that maps to two different audiobook playback times that define the start and end of the identified additional audio passage (e.g. additional narration audio or narration pause). As shown, this can also be represented in the mapping data 180 as a special case of two singular synchronisation reference markers, each having the same text position value but referencing to different audiobook playback times in the audiobook (e.g. the start and end of the identified additional audio passage).

The primary mapping data columns 181,182 containing the reference marker pairings of audiobook playback time to text position (e.g. word count or token index value) represents base data from which further mapping data or supplementary data may be generated. As shown in column 183, the time differential between adjacent reference markers is calculated, along with a value representing the text position change or differential (e.g. word count or token index value change) between adjacent reference markers as shown in column 184. As shown in column 185, average narration speed data (e.g. words per minute (WPM) or token rate in tokens per minute) may be calculated from the time and text position differential data in columns 183,184 for each of the text or audio segments defined by reference markers. In particular, the reference markers defining the mapping data delineate or segment the electronic text and/or audiobook playback timeline into a series of text or audio segments or portions, with each pair of adjacent reference markers defining a respective segment. As shown, the mapping data in column 185 may generate an average or indicative narration speed value for each text or audio segment.

It will be appreciated from this description, that this calculated narration speed data 185 of the mapping data 180 may be used by itself or in combination with audiobook playback position data (e.g. playback time or position in the timeline) to co-ordinate synchronised playback of the soundtrack with the audiobook playback in real-time or alternatively to compile and output a compiled soundtrack-enhanced audiobook in which the soundtrack playback timing is pre-rendered to synchronise with the audiobook playback timing. As will be appreciated from this description, the mapping data may also be expanded or extrapolated to generate variable narration speed data sets according to a narration speed variable, if the audiobook has a controllable or variable narration speed setting. For example, column 186 represents a narration speed data set calculated at twice the speed of the default or nominal narration speed represented in column 185 upon which the base mapping data was created. It will be appreciated that any number of different narration speed data sets may be generated according to any desired narration speed multiplier values available to the audiobook playback, such as, but not limited to pre-defined speed multipliers such as 0.5× speed, 1.5× speed, 2× speed, 2.5× speed or any other speed multiplier for example. These alternative narration speed data sets may be used to generate synchronised playback of the soundtrack at any desired narration speed setting for the audiobook playback. As such the mapping data enables synchronisation of the soundtrack playback to the audiobook playback to be achieved regardless of the narration speed setting.

Referring to FIG. 3K, a graph of the audiobook playback time and text position value columns 181,182 of mapping data table 180 is shown by way of example. The graph demonstrates the reference markers with each row of data pairings represented by a plot point in the graph. The graph also depicts the additional-text exception marker 188 and additional-audio exception marker.

The additional-text exception marker 188 is represented by a vertical segment of the line graph between the two data points defined by the same audiobook playback time position but different text positions as previously explained, and demonstrates how the mapping data will cause the word or token counter triggering the soundtrack playback to jump or skip forward in the word value at the audiobook playback time representing or corresponding to the location of the identified additional text that is not present in the audiobook narration, to maintain synchronisation.

The additional-audio exception marker 189 is represented by a horizontal segment of the line graph between the two data points defined by the same text position value (e.g. word count or token index) but different audiobook playback times as previously explained, and demonstrates how the mapping data will cause the word or token counte triggering the soundtrack playback to pause or stall during the identified additional audio passage (e.g. additional narration passage or narration pause), to maintain synchronisation.

Automatic Mapping Engine

The description of the mapping GUI 150 above with reference to FIGS. 3F-3K has been described in terms of a manual mode of operation with the user or operator progressively inserting or generating 'user-defined' reference markers between the electronic text displayed and the audiobook playback timeline to generate the mapping data. However, as previously discussed, the mapping engine may also be automatic or partially-automatic such that 'automatically-defined' or 'computer-defined' reference markers may be generated also either alone or in combination with manually created 'user-defined' reference markers.

In automatic modes, the mapping engine is configured to process the audiobook file and electronic text (upon which the soundtrack is defined with relative to) representing the audiobook and look for matches to generate the reference markers automatically. For example, the mapping engine may be configured to use speech-to-text processing or a speech-to-text engine to signal process the audiobook audio file and generate a text and time data set representing the narrated text and corresponding audiobook playback times of the extracted text. The mapping engine also receives data representing the displayed electronic text associated with the audiobook upon which the soundtrack is defined, whether an e-book version of the audiobook or other electronic text source associated with the audiobook. The mapping engine is configured to compare the text and time data set from generated from the signal processing of the audiobook audio file to the electronic text for matches in text at a user-configurable or preset resolution, to thereby generate a set of reference markers representing the mapping data.

The text data extracted from signal processing the audiobook file and the electronic text upon which the soundtrack is configured may not match exactly for various reasons, some of which are discussed above. However, this mapping data set may be sufficient to generate the required synchronisation during playback, or alternatively the automatically generated reference markers may represent a preliminary mapping data set that is presented to a user or operator in the mapping GUI 150, from which the user is then able to refine or adjust any of the automatically generated reference markers as required. In other words, the automatic mode of the mapping engine may pre-populate a number of reference markers for the user in the mapping GUI 150, to which they can either adjust or refine as required or supplement with further reference markers to refine and/or expand the mapping data set.

4.5 Soundtrack-Enhanced Audiobook Creation Process Overview

As previously discussed, this first approach to creating or generating soundtrack-enhanced audiobooks may proceed by either process:

(a) adapting or modifying either pre-existing or pre-created text-position soundtracks that are synchronised for playback while a user reads electronic text based on their reading position and/or reading speed, such that the modified soundtracks are synchronised for playback to a listener based on the audiobook playback time and/or narration speed setting, or (b) first generating or defining a soundtrack relative to text representing the narrated words of the audiobook, and then adapting or modifying the soundtrack for synchronised playback with the audiobook based on the audiobook playback time and/or narration speed setting.

Figure 3L:
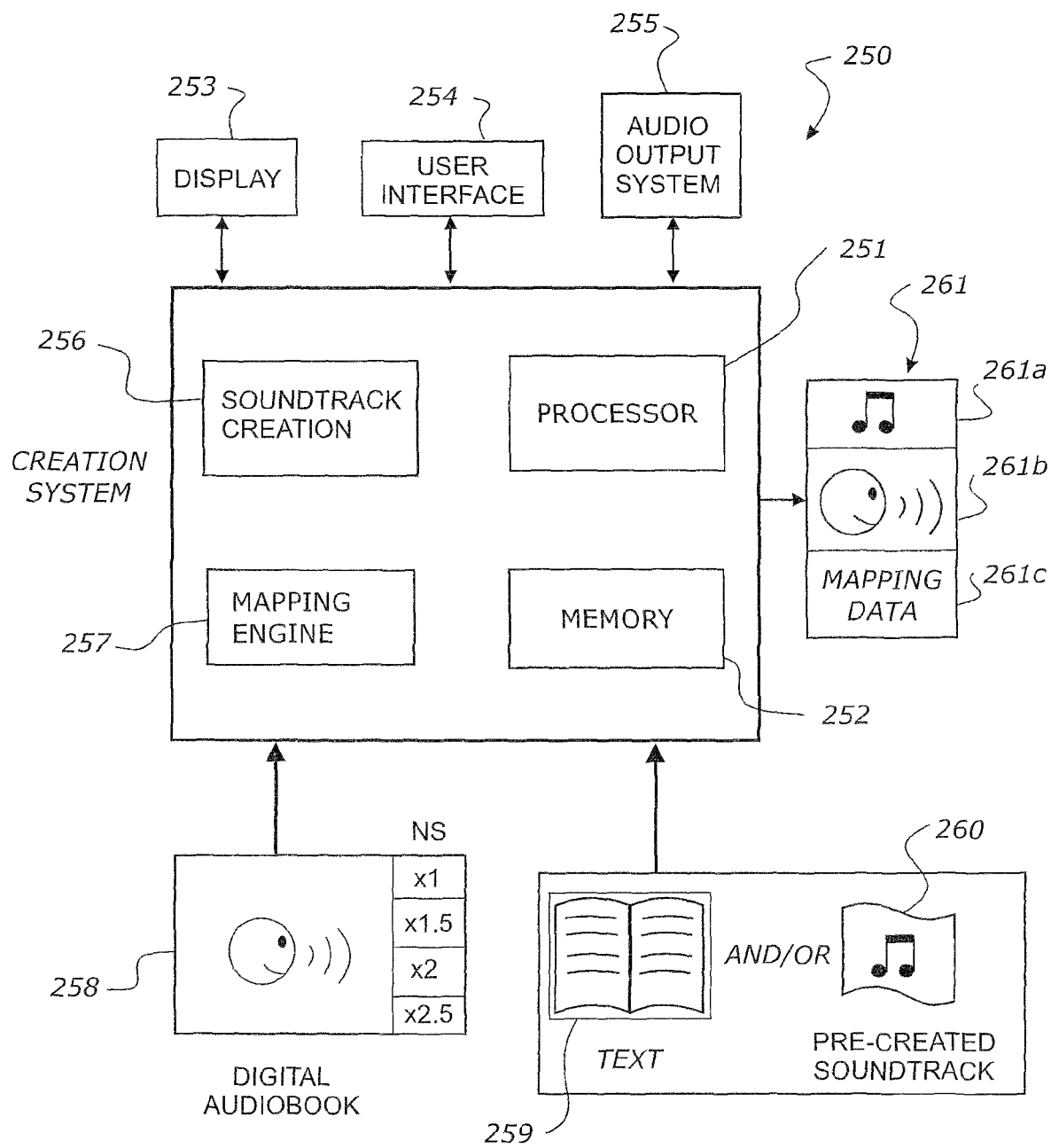
FIG. 3L is a schematic diagram of a creation system for soundtrack-enhanced audiobooks in accordance with an embodiment of the invention.

Referring to FIG. 3L, a schematic example of a creation system 250 is shown. The creation system is implemented on any suitable electronic hardware system or platform, and may be in the form of software or computer-readable instructions. Typically the hardware system comprises or is associated with a processor 251, memory 252, electronic display 253, user interface 254, and audio output devices or system 255. By way of example only, the creation system 250 may be a general or personal computer, or a customised or specific computing or processing machine. In this embodiment, the creation system comprises a soundtrack creation module 256 and mapping engine 257, and these components or functionalities may be integrated or separate.

Figure 3M:
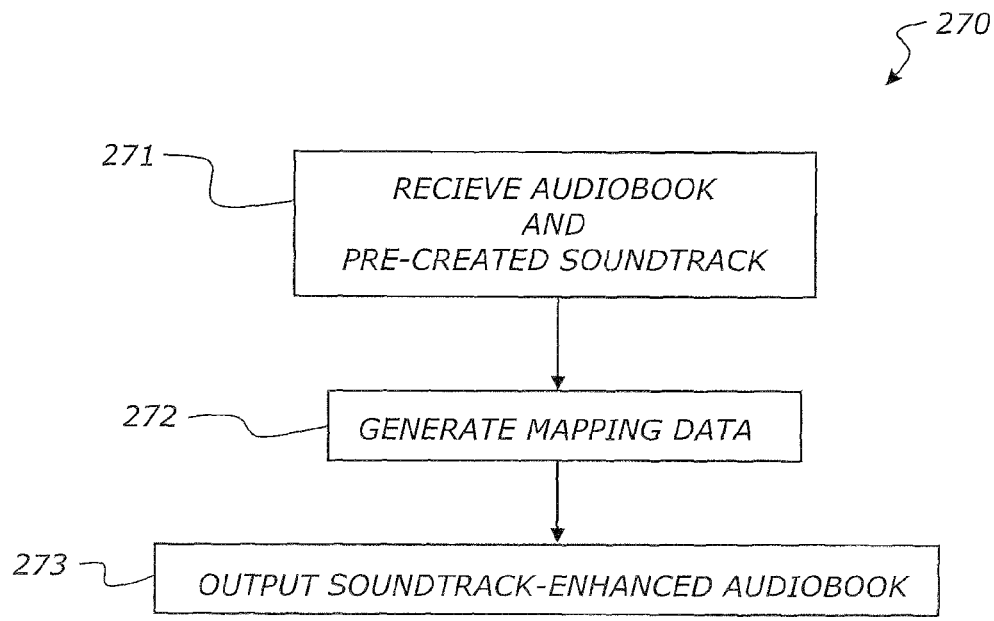
FIG. 3M is a flow diagram showing the creation process flow for generating a soundtrack-enhanced audiobook with the creation system of FIG. 3L in a first scenario in which a pre-existing or pre-created text-position based soundtrack for the audiobook is available in accordance with an embodiment.

Referring to FIGS. 3L and 3M, creation process (a) (referred to generally as 270 in FIG. 3M) above involves receiving the digital audiobook file or files 258 and a pre-created or pre-existing text-position based soundtrack 260 generated with reference to electronic text (e.g. an ebook version of the audiobook) associated with the audiobook narration into memory 252 as shown at step 271. The mapping engine 257 as described with reference to any of the configurations or embodiments of FIGS. 3A-3K is then operated (automatically, partially-automatic, and/or manually) to generate the mapping data for mapping the audiobook playback times of the narrated words to their corresponding text position in the electronic text upon which the text-position based soundtrack is defined. The creation process then terminates with outputting a data file or files 261 representing the soundtrack-enhanced audiobook. As described and will be appreciated, the soundtrack-enhanced audiobook 261 may be output in various formats depending on the intended playback system or engine, some of which are defined further later. In some formats the soundtrack-enhanced audiobook 261 may be provided as a package of files comprising the audiobook files or files 261*a*, the text-position based soundtrack data file or files 261*b*, and the generated mapping data 261*c*, to enable a playback engine to trigger or schedule the soundtrack playback in a synchrnoised manner to the audiobook playback using real-time processing. In other formats, a compiled or combined, ready-to-play, soundtrack-enhanced audiobook may be output as an audio file or set of audio files with the soundtrack channel or sound layer pre-rendered or compiled into the audiobook playback timeline according to the mapping data.

Figure 3N:
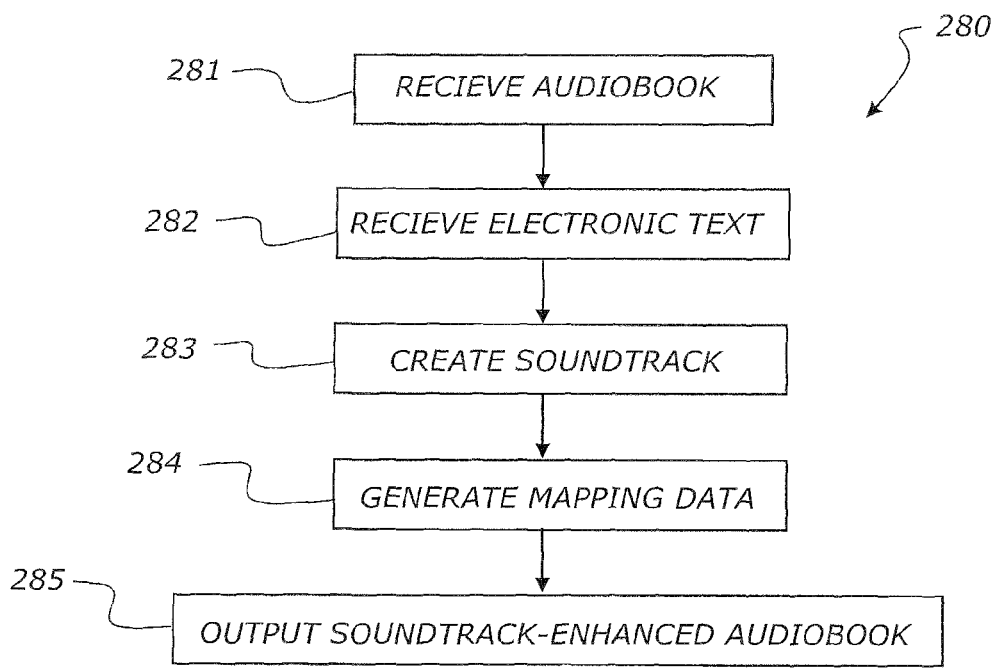
FIG. 3N is a flow diagram showing the creation process flow for generating a soundtrack-enhanced audiobook with the creation system of FIG. 3L in a second scenario in which a text-position based soundtrack is required to be generated for the audiobook in accordance with an embodiment.

Referring to FIGS. 3L and 3N, creation process (b) (referred to generally as 280 in FIG. 3N) above is similar to creation process (a), except requires the additional step of generating the text-position based soundtrack, in situations where one does not already exist in relation to text associated with the audiobook. In this process 280, the digital audiobook data file or files 258 and electronic text 259 associated with or corresponding to the audiobook are received into memory as shown at steps 281 and 282. This can be done serially in either order or in parallel. The electronic text 259 corresponding to the audiobook may be sourced from any suitable electronic text source, and may be for example an e-book version of the audiobook or another electronic text version of the content of the narrated audiobook, including versions generated by speech-to-text processing of the audiobook file. As previously discussed, it is possible that the electronic text 259 may not exactly match the audiobook narration in some circumstances. The user or operator then generates a text-position based soundtrack with reference to the electronic text as shown at step 283, e.g. by defining and configuring the desired audio regions with reference to the text, including defining the audio track for the audio region, start text position at which the audio region should commence playback, and stop text position at which the audio region should cease playback. In particular, the user may traverse the displayed electronic text, and create or insert desired audio regions by highlighting or selecting the text passages or text regions to which each audio region is to playback alongside when being narrated in the audiobook, and configuring or selecting the audio tracks to play during each respective audio region. The highlighted or selected text regions define the start and stop text positions of their associated audio regions. By way of example only, the text-position based soundtrack creation may be undertaken with a soundtrack creation system or engine of the type described in WO2013/015694, which is herein incorporated by reference in its entirety. The soundtrack generation may also be partially or fully automated using semantic analysis of the text to identify mood or other characteristics of the narration and automatically configure suitable audio regions with suitable audio tracks. At the completion of the creation and configuration of the text-position based soundtrack 283, the creation process 280 then continues in the same manner as described with creation process 270. In particular, the mapping data 284 is generated and the soundtrack-enhanced audiobook is output 285. Steps 284 and 285 in process 280 are equivalent to steps 272 and 273 in process 270.

5. Real-Time Playback System for Soundtrack-Enhanced Audiobooks 5.1 General System Overview At a general level, referring to FIG. 4A, an embodiment of the real-time playback system for soundtrack-enhanced audiobooks is configured to synchronise the playback of soundtracks (whether text-position based or time-based) to the audiobook playback in real-time to provide a soundtrack-enhanced audiobook experience. In particular, electronic text such as e-books can be provided with a digital audiobook representing a voice or narrative reading of the e-book and separately a text-position soundtrack and/or time-based soundtrack that is configured for playback while a user reads an e-book, but traditionally the digital audiobook and soundtrack associated with the e-book have no relationship to each other. In this embodiment, the real-time playback system enables a soundtrack configured for playback in synchronisation with the user's reading position in an e-book to also be played back in a synchronised manner with the playback of a digital audiobook associated with the e-book. Alternatively, it will be appreciated that the system may operate on any text-position or time-based soundtrack, whether it was originally configured for the intention of synchronised playback with the reading of the e-book (e.g. like process 270 in FIG. 3M), or whether it was created for the purpose of generating a soundtrack-enhanced audiobook (e.g. like in process 280 of FIG. 3N). In summary, the playback system may operate with respect to any form of text-position or time-based soundtrack that is configured or defined relative to or with reference to electronic text associated with or corresponding to the narrated text in the audiobook.

Figure 4A:
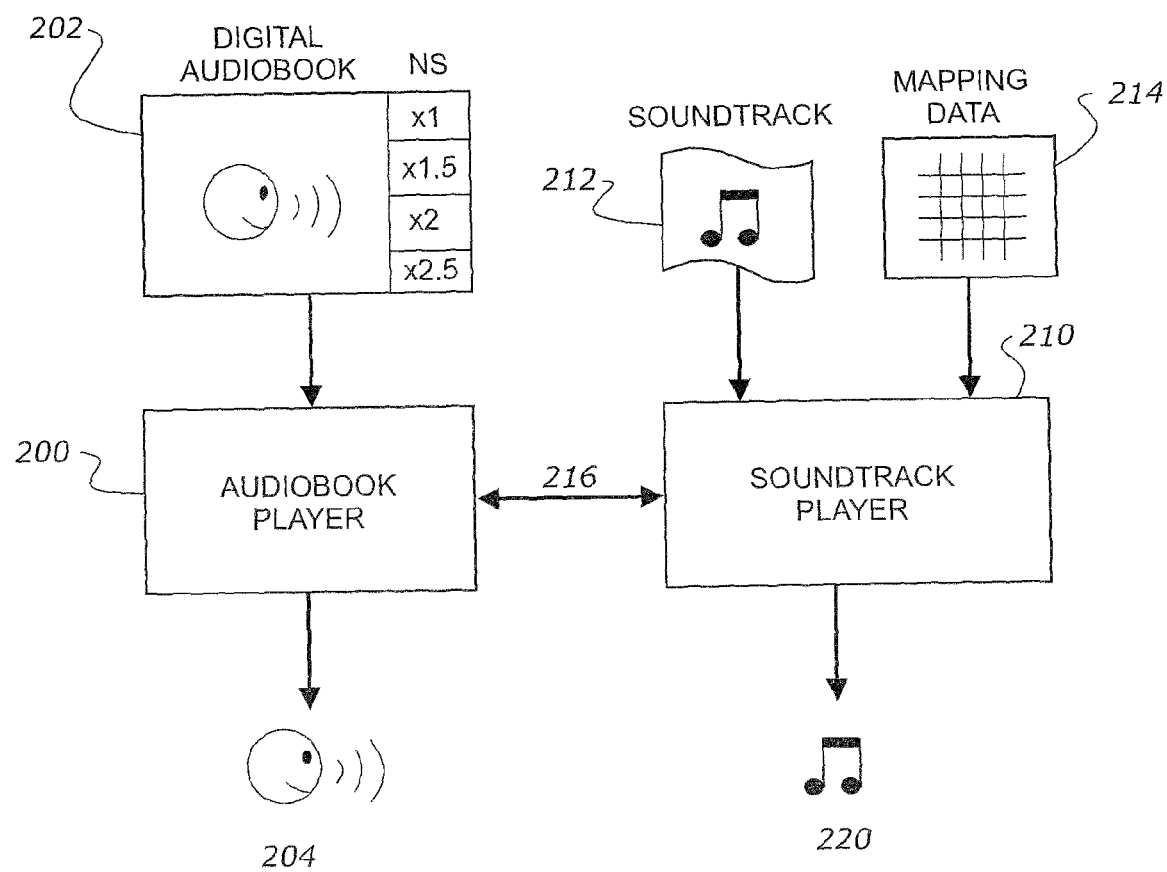
FIG. 4A is a schematic diagram overview of a real-time playback system for synchronising the playback of a soundtrack for electronic text with the playback of an audiobook narration of the electronic text in accordance with an embodiment of the invention.

Referring to FIG. 4A, in this embodiment the system at a general level comprises an audio player 200 that is configured to receive the digital audiobook file or files, whether for a single narration speed or multiple different selectable narration speeds and is configured to play the audiobook for a user to hear. The audiobook player typically has a user interface, whether a touchscreen interface or operable buttons from which the user may start, stop or pause the audiobook, or select where to begin playing within the audiobook, fast forward, rewind and any other typical audio playback control interface options or buttons. The user interface also typically enables the user to select the narration speed for the audiobook playback, which may be selectable from a number of fixed narration speeds such as NS=1, NS=1.5, NS=2, NS=2.5 (for example see FIGS. 17C and 17D described later). In alternative embodiments, some digital audiobooks 202 are provided with a configurable narration speed setting that may be operated between slow and fast settings along a sliding or gradual speed scale, rather than a preselect defined number of narration speed settings or versions. The audio output of the narrated audiobook playback over speakers or headphones or similar is represented at 204. It will be appreciated that the audio player may be any electronic device that is capable of audio playback, for example signal processing a digital audio file for playback over an audio output system connected or associated with an audio player, including standalone audio players or mp3 players, smartphone or tablet devices comprising software audio players or audio player applications on a programmable device.

In this embodiment, the system also comprises a soundtrack player 210 that is configured to receive and process a soundtrack data file or files and audio tracks associated with the e-book or electronic text representing the narrated text, and is also configured to receive, retrieve or generate mapping data 214 representing the mapping of text positions (e.g. word count or token index value) within the e-book or electronic text to their corresponding narration positions (e.g. playback times) in the digital audiobook. The mapping data 214 may be of the form described with reference to FIGS. 3A-3K, for example.

In general, the soundtrack player may be configured to receive or retrieve from the audiobook player audiobook data signals representing the real-time audiobook playback as shown at 216. By way of example, the audiobook data signals 216 may comprise the current narration position in the audiobook timeline, such as the current audiobook playback time or percentage complete data representing the current playback position or point in the audiobook playback timeline or duration. In some configurations, the audiobook playback data may also comprise data indicative of the narration speed setting, such as playback is occurring at NS=1, NS=1.5, NS=2 or any other data indicative of the narration speed setting for the current audiobook playback.

Based on the audiobook playback data 216 and mapping data 214, the soundtrack player 210 is configured to coordinate synchronised playback of the soundtrack 212 (whether text-position based or time based) to match the audiobook playback such that the soundtrack output, as generally indicated at 220, is synchronised to that of the narrated audiobook 204 to thereby provide a soundtrack-enhanced audiobook experience for the listener.

The soundtrack player 210 may be typically implemented on the same device as the audio player, and may for example be a software application. The interface for interaction between the audiobook player 200 and soundtrack player 210 may be direct or via an application programme interface (API) or similar. In alternative embodiments, the audiobook player and soundtrack player may be combined or integrated within a single module or software application, but for the purpose of clarity of explanation the audiobook player and soundtrack player will be described as separate components or modules.

By way of example only, an embodiment of the electronic user device or hardware system and software module and functionality of an example real-time playback system for soundtrack-enhanced audiobooks will be described with reference to FIGS. 4B and 4C, and which can implement the general functionality described with reference to FIG. 4A generally. It will be appreciated that the device system and software functionality and modules may be altered or reconfigured to deliver the same functionality in alternative embodiments.

Hardware System

Figure 4B:
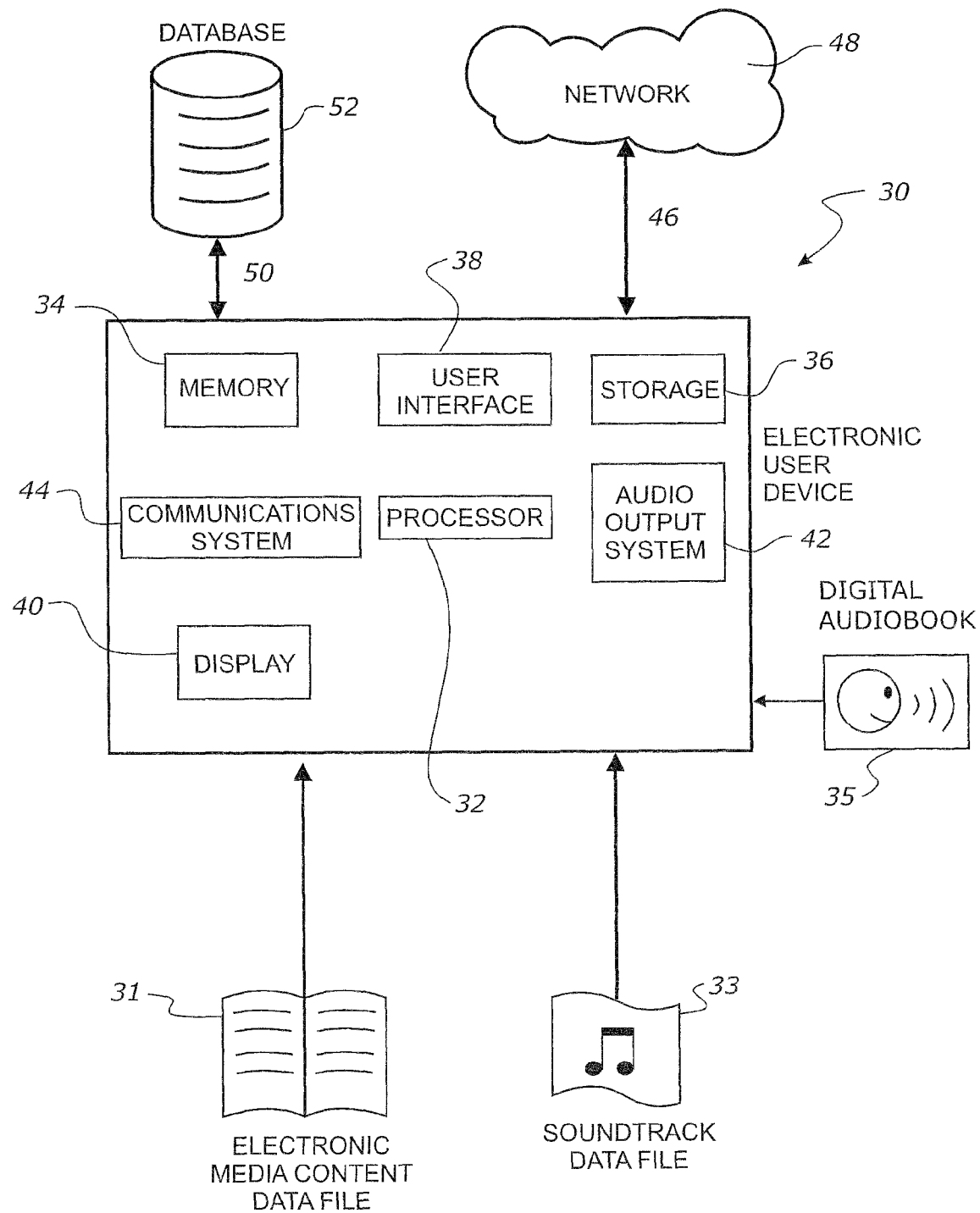
FIG. 4B is a schematic diagram of an electronic user device or hardware system operable to display electronic media content, playback an audiobook, and co-ordinate the synchronised playback of a soundtrack of the type described with reference to FIGS. 1 and 2 based on the user's reading position with the displayed text or alternatively based on the audiobook playback position.

Referring to FIG. 4B, an embodiment of a typical electronic user device or user playback system will now be described. The playback system in this embodiment is operable in various modes. In one mode, the playback system is configured for displaying electronic text (e.g. an e-book 31) and controlling a synchronised playback of an associated soundtrack 33 based on the user's expected reading position. In another mode, the user playback system is operable to play an audiobook 35 of or associated with the electronic text (e.g. e-book) and controlling the synchronised playback of a soundtrack 33 (whether text-position based or time based) associated with the e-book to the listener. In yet another mode, the user playback system may be configured to playback the audiobook and synchronise playback of the soundtrack, while also displaying the electronic text and optionally a visual graphical indicator within or along the displayed text indicating which text position (e.g. word) in the electronic text that is currently being narrated in the audiobook, such as an inline arrow traversing underneath or above the lines of text or a line-by-line indicator traversing the margin of the text on the display.

In alternative embodiments, the playback system may have a single audio-only mode which enables a user to playback the audiobook and which co-ordinates synchronised playback of the soundtrack. In such playback systems, the display is optional as the associated electronic-text is not essential to display in such embodiments. In such modes or configurations, the playback system may operate with the audiobook files and soundtrack files only, and does not need to receive or process the associated electronic text (e.g. ebook).

In this embodiment, the user playback system may be provided or implemented as an application program, website, plug-in, or any other form of software, whether standalone or integrated or embedded with other software, running on any suitable electronic programmable hardware system or platform or device. Typically the playback system is implemented on any suitable portable or non-portable hardware device or system having suitable processor and memory capabilities, a display for displaying the electronic text, and an audio output system for playback of the soundtrack over speakers or headphones. By way of example only, the hardware device or system may be portable consumer electronic devices such as smart phones, cell phones, tablets, smart watches, dedicated e-Reader or e-book devices, laptops, notebooks, wearable computers or computing devices such as optical head-mounted or head-worn displays (e.g. Google Glass eyewear) or contact lens or any other suitable electronic devices. Alternatively, the playback system may be implemented on a desktop personal computer or any other non-portable hardware system if desired. Typically, the playback system is provided as an application program or software that may be loaded and run on the hardware devices or systems mentioned above, but it will be appreciated that a dedicated electronic device may be configured and built as a standalone user playback system if desired. It will be appreciated that the user playback system may be implemented in the form of a website interface. For example, a user may access the website over the internet that is configured to provide a playback system for viewing the electronic text and providing playback of the corresponding soundtrack via the user's internet browser.

Referring to FIG. 4B, an example of the hardware device or electronic user device 30 upon which the playback system software may run is shown. The hardware device 30 includes a processor 32 for executing software or computer-readable instructions, memory 34 for data processing and execution of instructions, data storage 36 such as a hard disk drive for data storage, a user interface 38 (e.g. buttons, touch screen, keyboard, mouse input, voice commands, or the like, whether alone or in combination) to enable the user to interact with the hardware device and software, a display 40 for displaying graphical user interfaces (GUIs) of the playback system software, and an audio output system 42 for producing audio output over speakers or headphones. The hardware device 30 may also comprise external device interfaces and/or communication modules 44 for establishing communication links 46 to external networks 48, such as the internet or an extranet or intranet or communication links 50 to external databases or servers 52, such music libraries.

Software Functionality

Figure 4C:
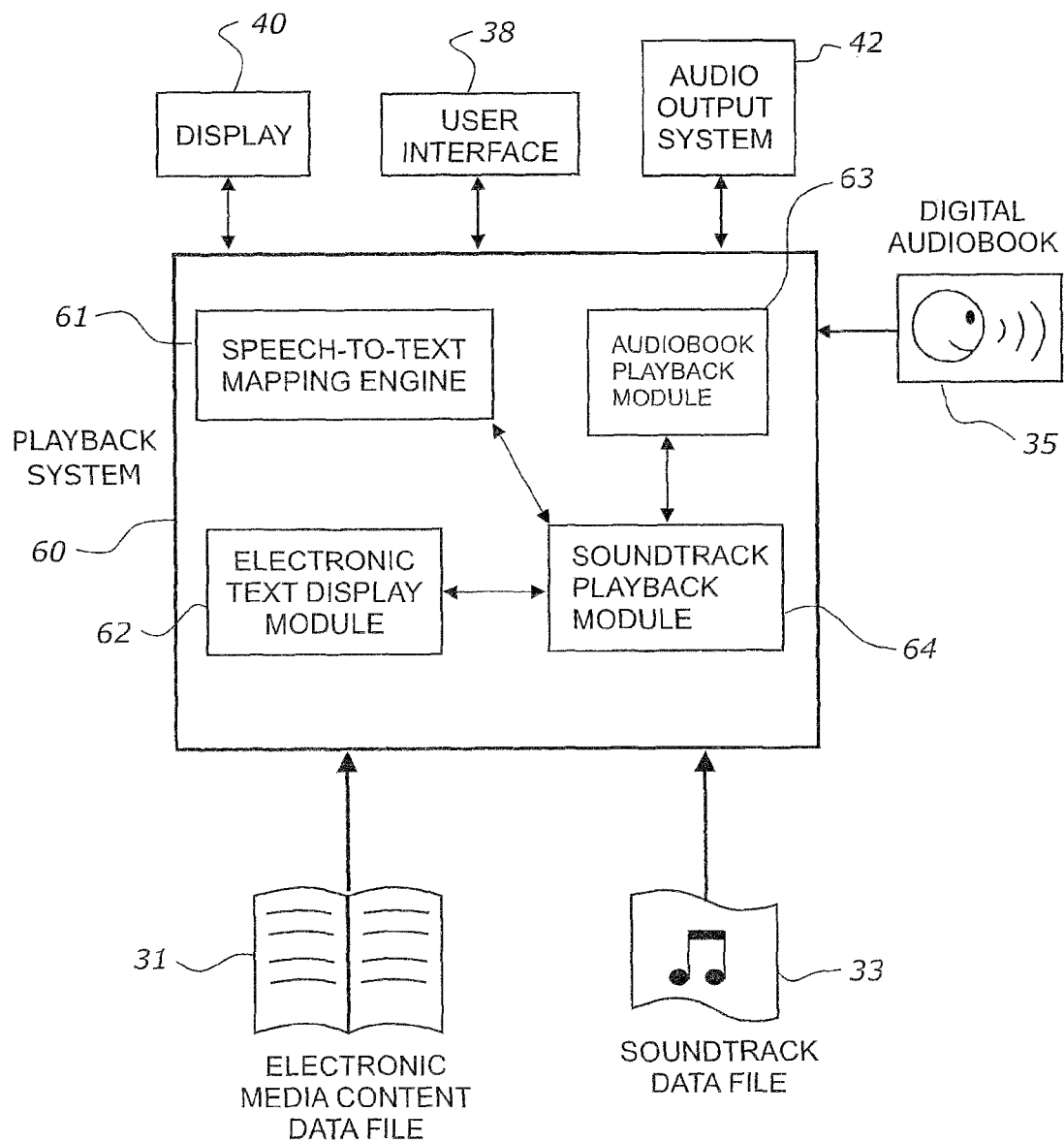
FIG. 4C is a schematic diagram showing the main modules of the playback system implemented on the electronic user device of FIG. 4B in accordance with an embodiment.

Referring to FIG. 4C, the primary functions and data processing of an embodiment of the playback system 60 will now be described. The various functions and data processing of the playback system 60 will be described with reference to dedicated modules configured to carry out the functions and data processing for clarity of description of the user playback system. It will be appreciated that the modules may be configured or implemented in software in various ways and that the processes and functions performed by the modules may be integrated into a reduced number of consolidated modules or further expanded and separated into a larger number of modules depending on design requirements.

The main modules of the playback system 60 are shown and their interaction with various components of the hardware platform on which the user playback system is running, such as a display 40, user interface 38, and audio output system 42. The other aspects of the hardware system, such as processor 32, memory 34, data storage 36 and any other communication links or components are not shown for clarity.

As mentioned above, in this embodiment the playback system 60 may be operable in a plurality of modes. The playback system is configured to receive the electronic text data file 31 (e.g. e-book) and its associated synchronised soundtrack data file 33 (in some embodiments the e-book and its associated soundtrack may be provided in a single multimedia data file or in other embodiments may be stored as separate data files as depicted). The playback system 60 is also configured to receive the digital audiobook audio file or files 35, which comprise an audio or narrative reading of the e-book 31. In one mode, the playback system 60 can be configured to display the e-book and coordinate synchronised playback of the soundtrack 33 based on the user's reading position within the electronic text. In another mode, the playback system may be configured to playback the digital audiobook 35 over the audio output system 42 and coordinate synchronised playback of the soundtrack data file 33 based on the digital audiobook narration speed and/or narration position. In a further mode, the playback system may be configured to playback the audiobook and synchronise the playback of the soundtrack 33 based on the audiobook narration speed and/or playback position, while also displaying the associated electronic text or a portion of the electronic text that corresponds to the narration position in the digital audiobook, and optionally may provide a visual graphical reading narration text position within the electronic text as an indicator inline or in the margin so as to indicate where in the text the current audiobook is narrating. The soundtrack data file or files, including all the audio tracks, are in some embodiments entirely downloaded in advance and stored locally on the user device before playback can commence, or in alternative embodiments the soundtrack may be compiled in a remote server, e.g. in the cloud or similar, and streamed to the user device for playback, or the audio track files may be streamed individually or in batches to the user device from the cloud or a remote server as they are needed.

Electronic Text Display

The playback system 60 comprises an electronic text display module 62 that is configured to process electronic text data 31 representing the electronic text and controls display of the electronic text on the display 40 in response to user input from the user interface 38. The display 38 may be a conventional electronic display (e.g. LCD or LED display screen) with the user interface 38 comprising any one or more typical input devices such as, but not limited to, buttons, dials, switches, mouse, touch-pad, keyboard, voice commands or any other tactile, auditory or visual user input system or device. In a preferred embodiment, the hardware device is provided with an integrated display 40 and user interface 38 in the form of a touch screen display, which are commonly available on many portable electronic devices, such as tablets, smartphones, notebooks and the like. As discussed previously, in some modes the playback system is operable without displaying the electronic text, and in particular may playback the soundtrack-enhanced audiobook without the electronic text data file.

Soundtrack Playback Module—Electronic Text Mode (Synchronised to Reading Position)

In one mode, a soundtrack playback module 64 is provided for coordinating the playback of the audio regions of the soundtrack 33 over the audio output system 42 based on the user's expected reading position in the displayed electronic text. The soundtrack playback module may be configured to process and coordinate playback of either text-position based soundtracks or time-based soundtracks, or both. Each will be explained further below.

For text-position based soundtracks in which the trigger points for the audio regions are determined by start and stop text positions with reference to the electronic text, the soundtrack playback module 64 is configured to trigger the playback of those audio regions based on a reading position variable or counter indicative of the user's expected or estimated reading position in the electronic text (e.g. indicative of the current word they are reading) to synchronise playback of the soundtrack with the user's reading of the electronic text. The soundtrack playback module 64 maintains a user reading position variable (such as a counter) that increments or changes at a rate based on a configurable user reading speed setting or variable, e.g. words per minute (wpm) or similar, that is indicative of the user's reading speed. The reading position counter or variable may represent the word the user is currently reading, e.g. may be a word counter if the electronic text is indexed based on words or a CFI value for example. The reading position counter may be updated periodically or arbitrarily based on user interaction/input (e.g. page turns, scrolling, arbitrary reading position update inputs etc). In one embodiment, a reading position module maintains the reading position counter and is also configured to receive control input indicative of the user commencing reading or pausing reading, and controls the reading position counter accordingly (e.g. starts or pauses the counter). The user reading speed variable may be manually adjusted by the user, automatically adjusted, or retrieved from historically stored reading speeds specific to the end user.

For text-position based soundtracks, the soundtrack playback module 64 is configured to process the soundtrack data file and trigger or cue playback of the audio track files associated with the defined audio regions of the soundtrack based on the user reading position counter. In particular, the playback module 64 commences playback of the audio track file associated with an audio region when the reading position variable matches the start position defined for that audio region, and stops playback of the audio track file when the reading position variable matches the stop position defined for that audio region. It will be appreciated that two or more audio track files may be played concurrently when there are two or more overlapping audio regions and that each audio region can have other associated properties for playback that may or may not be dependent on reading speed such as volume and panning envelope control and other audio effects and properties.

For time-based soundtracks in which the audio regions are defined to have start times and stop times in the soundtrack timeline based on a nominal reading speed, the soundtrack playback module is configured to compress or expand the soundtrack timeline and the start and stop times of the audio regions based on the user reading speed variable indicative of the user's average or current reading speed and their expected reading position in the electronic text which may be updated periodically or arbitrarily. For example, if the time-based soundtrack is configured for a normal reading speed of 150 wpm, and the user is reading at 300 wpm, then the soundtrack timeline or duration is effectively halved such that the start and stop times are scaled or modified accordingly. The modified soundtrack is then delivered in a synchronized timeframe to the user's reading speed and/or expected reading position in the electronic text.

Soundtrack Playback Module—Audiobook Mode (Synchronised to Audiobook)

In another mode, the soundtrack playback module 64 is provided for coordinating the playback of the audio regions of the soundtrack 33 of the audio output system 42 based on the playback position of the digital audiobook 35 such that the soundtrack playback is synchronised to the narration position within the digital audiobook. As will be further explained with reference to the examples in FIGS. 5-8, the soundtrack playback module 64 in this mode receives mapping data from the speech-to-text mapping engine 61 or from another source along with audiobook playback data or signals from the audiobook playback module 63 and uses the mapping data and audiobook playback signals or data to coordinate the synchronised playback of the soundtrack 33 with the digital audiobook playback. As will be explained, the soundtrack playback module can synchronise either text-position based soundtracks or time-based soundtracks to the digital audiobook or both. In this mode, the soundtrack playback module is configured to trigger the playback of the audio regions of the soundtrack (which are configured or defined to playback with reference to corresponding text regions in electronic text corresponding to or associated with the audiobook) based on the playback of the narration regions in the audiobook that correspond to those respective text regions. In other words, the audio regions are adapted for synchronised playback when their associated text region as it is being narrated in the audiobook playback. If a text region is defined between a start text position (e.g. start word) in the text and a stop text position (e.g. stop word), then its corresponding narration region in the audiobook playback timeline is the time period between when that start word and stop word is narrated.

Audiobook Playback Module

The playback system 60 comprises an audiobook playback module 63 that is configured to receive and process a digital audiobook file or files 35 and is operable to control playback of a digital audiobook based on user interaction with the user interface, including stop, start, pause, rewind, fast forward and any other typical audio playback controls. The audiobook playback module may present its own graphical user interface to the user to enable the user to control playback of the digital audiobook and control playback settings, such as the narration speed setting for example. Some audiobooks may be provided with a preselect number of narration speeds for selecting while others may comprise a narration speed setting that is variable on a scale. The audiobook playback module 63 may be any conventional audio playback software or dedicated audiobook playback software for example. In alternative embodiments, it will be appreciated that the audiobook playback functionality may be integrated with the soundtrack playback module 64.

Speech-to-Text Mapping Engine

The playback system 60 in this embodiment comprises a speech-to-text mapping engine 61 which is configured to receive and process the electronic media content data file 31 (e.g. an e-book) and the digital audiobook 35 and generate mapping data representing a mapping or relationship of the audiobook playback narration positions (e.g. playback time) to their corresponding electronic text position (e.g. indicative of a word) in the e-book. Alternatively, the speech-to-text mapping data may be pre-generated during creation of the soundtrack-enhanced audiobook and the mapping data may be provided to the playback system with the audiobook and/or soundtrack data files. The speech-to-text mapping engine and/or the mapping data generally may be as described with reference to FIGS. 3A-3K and the mapping data may be provided or generated at various resolutions depending on the configuration settings or desired synchronisation. The mapping data received or generated by the mapping engine 61 is provided to the soundtrack playback module 64 to enable it to coordinate synchronised playback of the soundtrack to the audiobook playback.

Interaction and Data Sharing Between Modules

Each of the modules of the playback system may be configured to share or send data to each other or may be configured to pull data from other modules as required. FIG. 4C provides depictions of some of the key data flows between the modules, but this is not an exclusive list of the network data exchange between the modules. By way of example, the soundtrack playback module may pull or receive data from the electronic text display module 62 such as reading speed update, current reading position or similar. The soundtrack playback module 64 may receive the mapping data from the speech-to-text mapping engine 61. The soundtrack playback module may receive audiobook playback data, such as the playback time and narration speed data from the audiobook playback modules 63. As previously mentioned, one or more of the modules may also be integrated with each other and share data directly. For modules that run separate software applications, data may be shared by application programming interfaces (APIs) or other data sharing protocols.

Dynamic Switching Between Soundtrack Playback Synchronization Source

In some embodiments of the playback system, the system can dynamically switch the source of the playback synchronization of the soundtrack between the audiobook and the electronic text such as, but not limited to, an e-book. For example, if the user operates the playback system in a reading mode and is reading the e-book, the soundtrack player may be configured to synchronise the soundtrack playback based on the user's reading position and/or reading speed (i.e. the soundtrack player operates in its electronic text mode). If a user then switches to a listening mode, a 'bookmark' reference is generated and/or stored indicative of the current reading position (e.g. word) in the e-book is mapped (for example via the mapping data from the mapping engine) to its corresponding audiobook playback time in the audiobook. The audiobook player can then commence audiobook playback at the bookmark position and the soundtrack player can re-commence the soundtrack playback and synchronise based on the audiobook playback data (i.e. the soundtrack player operates in its audiobook mode). The system may also operate in the reverse, whereby a listener may be operating the system in listening mode and listening to the audiobook with the soundtrack player operating in audiobook mode, and then switch to a reading mode. Upon switching, again a bookmark reference in the audiobook playback timeline is generated and mapped into its corresponding reading text position in the e-book. The soundtrack player may then operate re-commence the soundtrack at that bookmarked reading position and operate in its electronic text mode to synchronise the soundtrack playback with the user's reading position and/or reading speed. Therefore, the system is dynamically and seamlessly switchable between listening and reading modes.

Figure 5:
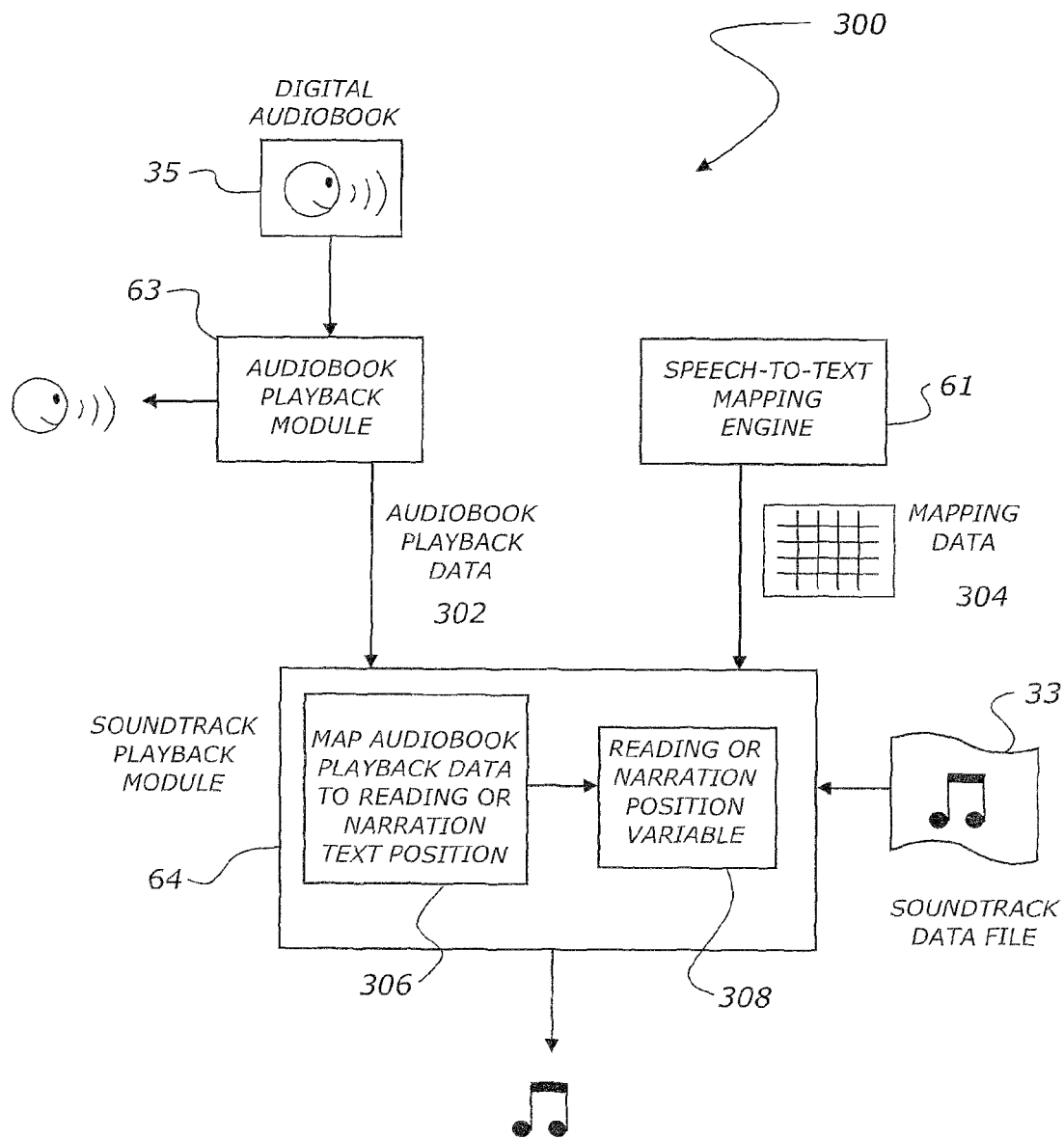
FIG. 5 is a schematic diagram of a playback system configured for the real-time playback and/or compilation of a soundtrack-enhanced audiobook in accordance with a first form configuration of the system of FIGS. 4A-4C in which the playback of a text-position based soundtrack is synchronised with the audiobook playback at least partly based on a reading text position variable or counter that is generated or updated based on the audiobook playback timing or narration position.

5.2 Real-Time Playback System—Synchronised Playback of Text-Position Based Soundtrack Based on Audiobook Playback Timing Referring to FIG. 5, in this example configuration 300 the playback system is configured to synchronise the playback of the text-position based soundtrack 33 based on audiobook playback data 302 received from audiobook playback module 63 and mapping data 304 received from the mapping engine 61 or stored elsewhere or received from another source. In this configuration, the audiobook playback module is operated to playback a digital audiobook 35 over the audio output system and in real-time provides audiobook playback data 302 to the soundtrack playback module 64. In this embodiment, the audiobook playback data comprises data indicative of the current narration position such as the audiobook playback time, i.e. timing data indicative of the current playback position within the digital audiobook in real-time, and optionally any narration speed setting associated with the audiobook playback. For example, the narration speed setting data may indicate the narration speed setting that the user is playing the audiobook, such as NS=1, NS=1.5, NS=2 etc, or some other narration speed setting or variable. The soundtrack playback module may comprise a map module or converter 306 that receives the audiobook playback data 302 and the mapping data 304 and generates or calculates a variable corresponding to the text reading or narration position within the electronic text which corresponds to the current narrator's position in the audiobook playback. The mapping data 304 provided to the map module 306 may for example be a 1:1 resolution mapping data as described with reference to FIG. 3B and the reading or narration position variable generated may be indicative of the current word being narrated in the e-book or electronic text. The map module then updates the reading position variable or otherwise outputs the reading position variable 308 representing the current word being narrated. The reading position variable is then used to trigger and coordinate or schedule the playback of the audio regions of the soundtrack 33 based on their respective start text positions and stop text positions which indicate when they should commence and cease playback. The reading position variable can be considered equivalent to a narration position variable representing the current word being narrated in the audiobook.

The reading position variable need not necessarily represent that the user is reading the corresponding electronic text. The 'reading position variable' may be considered equivalent to a 'narration position variable' or identifier that identifies or is indicative of the text position (e.g. word or token or CFI identifier) in the associated electronic text (upon which the soundtrack was defined or configured) that is currently being narrated in the playback of the audiobook, based on the mapping data. As discussed above, the narration position variable In general, this example configuration 300 utilises the playback timing of the audiobook to directly trigger the playback of the audio regions of the soundtrack once the playback timing has been converted into a reading or narration position variable (e.g. in the reading or electronic text domain) based on the mapping data.

As previously explained, the mapping data may comprise multiple mapping data sets for the various different narration speed settings, or alternatively altered or modified mapping data may be generated based on a nominal narration speed NS=1 to derive approximate mapping data for alternative narration speeds.

Figure 6:
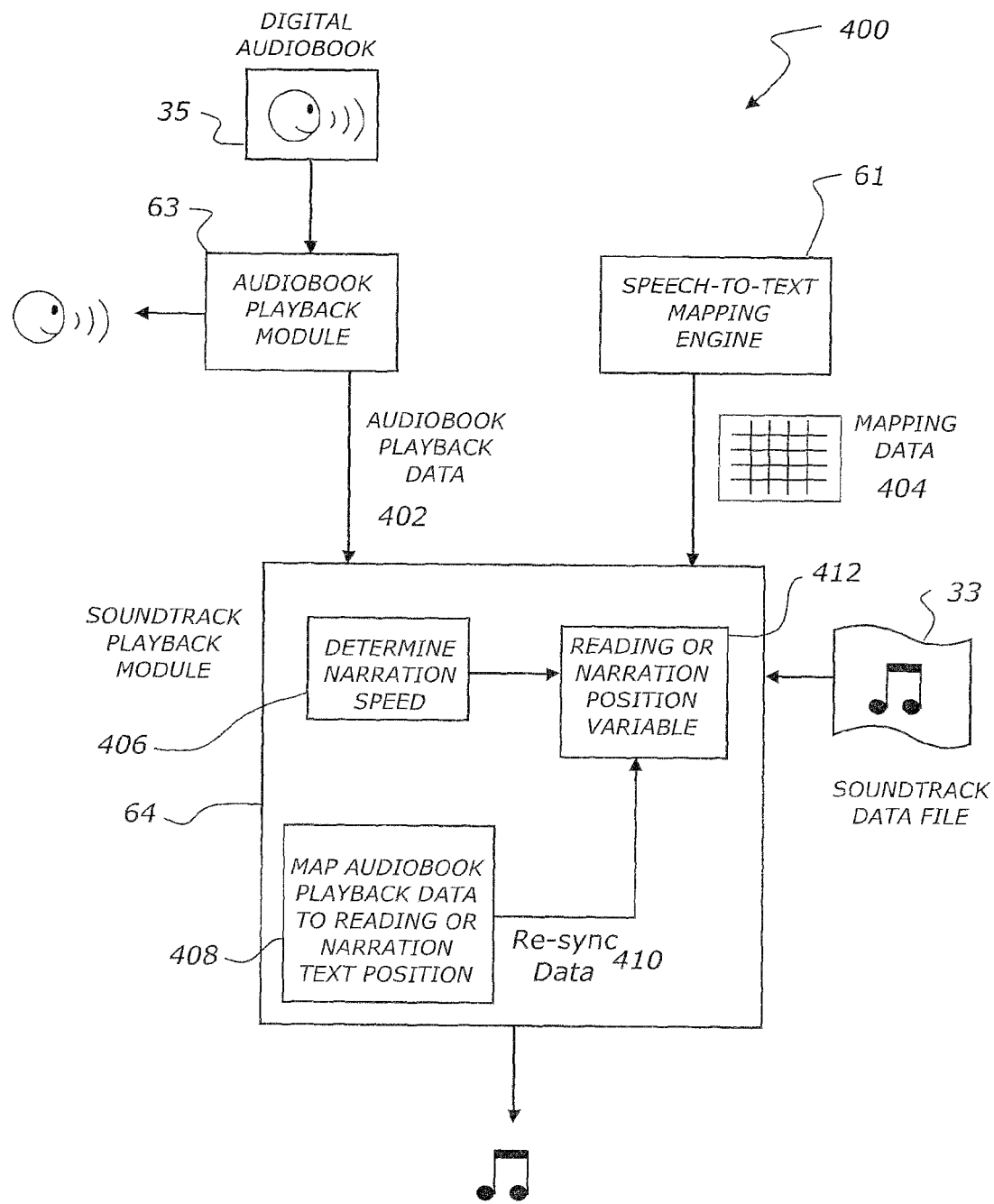
FIG. 6 is a schematic diagram of a playback system configured for the real-time playback and/or compilation of a soundtrack-enhanced audiobook in accordance with a second form configuration of the system of FIGS. 4A-4C in which the playback of a text-position based soundtrack is synchronised with the audiobook playback based on a reading text position variable or counter that is updated or generated at least partly based on narration speed data associated with the audiobook playback.

5.3 Real-Time Playback System—Synchronised Playback of Text-Position Based Soundtrack Based on Narration Speed Variable Referring to FIG. 6, an example configuration 400 of the user playback system is depicted in which the playback of the text-position based soundtrack 33 is synchronised with the audiobook playback based on an updated narration speed variable extracted from or calculated based on audiobook playback data received from audiobook playback module and/or mapping data received from the mapping engine or elsewhere.

In this configuration 400, the soundtrack playback module 64 is configured to receive audiobook playback data from the audiobook playback module as it plays back a digital audiobook 35. As with the configuration 300 in FIG. 5, the audiobook playback data 402 from the audiobook playback module as it plays back a digital audiobook 35. As with the configuration 300 in FIG. 5, the audiobook playback data 402 may comprise data indicative of the current narration position (e.g. current playback time or percentage playback complete value or similar). The audiobook playback data may also comprise a narration speed setting value or data indicative of the current narration speed setting playback.

The soundtrack playback module 54 is also configured to receive mapping data 404 from the mapping engine 61 or from another source. In one configuration, the mapping data may be the marker-determined mapping data described with reference to FIG. 3D or 3J. Based on the received audiobook playback time and narration speed setting, the soundtrack playback module may calculate the narration speed (e.g. words per minute variable or similar) relating to the current portion of the audiobook playback in narration speed module 406. Alternatively, the narration speed data (as shown in FIG. 3D and columns 185, 186 of FIG. 3J) defining the calculated narration speed between reference markers may have been pre-calculated and provided in the mapping data 404, and the narration speed module may output the updated narration speed variable from the mapping data based on the current audiobook playback position. In one configuration, the narration speed module 406 may update a narration speed variable representing the current narration speed at each reference marker point such that the narration speed variable is updated for each text portion delineated by the reference markers associated with the electronic text in the mapping data. As described with reference to FIGS. 3D and 3J, the reference markers may be uniformly or non-uniformly spaced and their distance apart may be varied such as a marker per sentence, per paragraph, per chapter or other delineations to thereby alter the narration speed update frequency. For example, the narration speed variable may be updated every sentence, or every paragraph, or every chapter in some configurations, or may be updated at each new reference marker in the mapping data. In alternative embodiments, the narration speed may be calculated only once such that it represents an average narration speed for the entire audiobook (e.g. total number of words of e-book divided by the total time duration of the audiobook).

In this configuration, the soundtrack playback module maintains a reading or narration position variable (e.g. word count or token index value or CFI reference) that represents that the current text or narration position in the electronic text (upon which the soundtrack is defined or configured) being narrated by the audiobook playback module. In this configuration, the reading or narration position variable increments or changes at a rate based on the narration speed variable generated or output by the narration speed module 406. The soundtrack playback module is then configured to trigger the playback of the audio regions of the text-position based soundtrack data file based on the reading or narration position variable in a similar manner as described with reference to FIG. 5, i.e. triggering or scheduling the audio regions for playback as their respective start and stop text positions match the reading or narration position variable. As previously noted, the reading position variable can be considered equivalent to a narration position variable representing the current word being narrated in the audiobook.

The soundtrack playback module in this configuration also comprises a map module 408 that converts the audiobook playback position data 402 into a reading or narration text position based on the mapping data 404, i.e. representing the current word being narrated. The generated reading or narration text position data may be sent to the reading position variable module 412 as re-sync data 410 to update the reading or narration position variable on a periodic or arbitrary basis should the audiobook playback be paused, fast forwarded, rewound, skipped forward for example, or to generally ensure re-syncing of the reading position variable.

In this configuration 400, it will be appreciated that the higher the frequency of narration speed variable updates, the more accurate the reading or narration position variable will be at representing the current text position (in the electronic text associated with the configured text-position based soundtrack) being narrated in the audiobook. As with the configuration in FIG. 5, the reading or narration position variable is configured to represent or be indicative of the current word being narrated in the audiobook.

Exception Markers for Additional-Text or Additional Audio

As previously described with reference to FIGS. 3H and 3I, for some soundtrack-enhanced audiobooks, the mapping data may comprise reference markers representing additional-text or additional-audio exception markers (i.e. special case markers). The playback systems described with respect to either of FIG. 5 or 6 above are configured to update or control the reading or narration position variable in accordance with mapping data associated with any such exception markers, as previously described. For example, in the context of an additional-text exception marker, the playback system is configured to skip or jump the narration position variable forward to the next text position following the identified additional passage, as defined by the exception marker. In the context of an additional-audio exception marker, the playback system is configured to stall or pause the narration position variable during the playback period of the identified additional audio passage.

Figure 7:
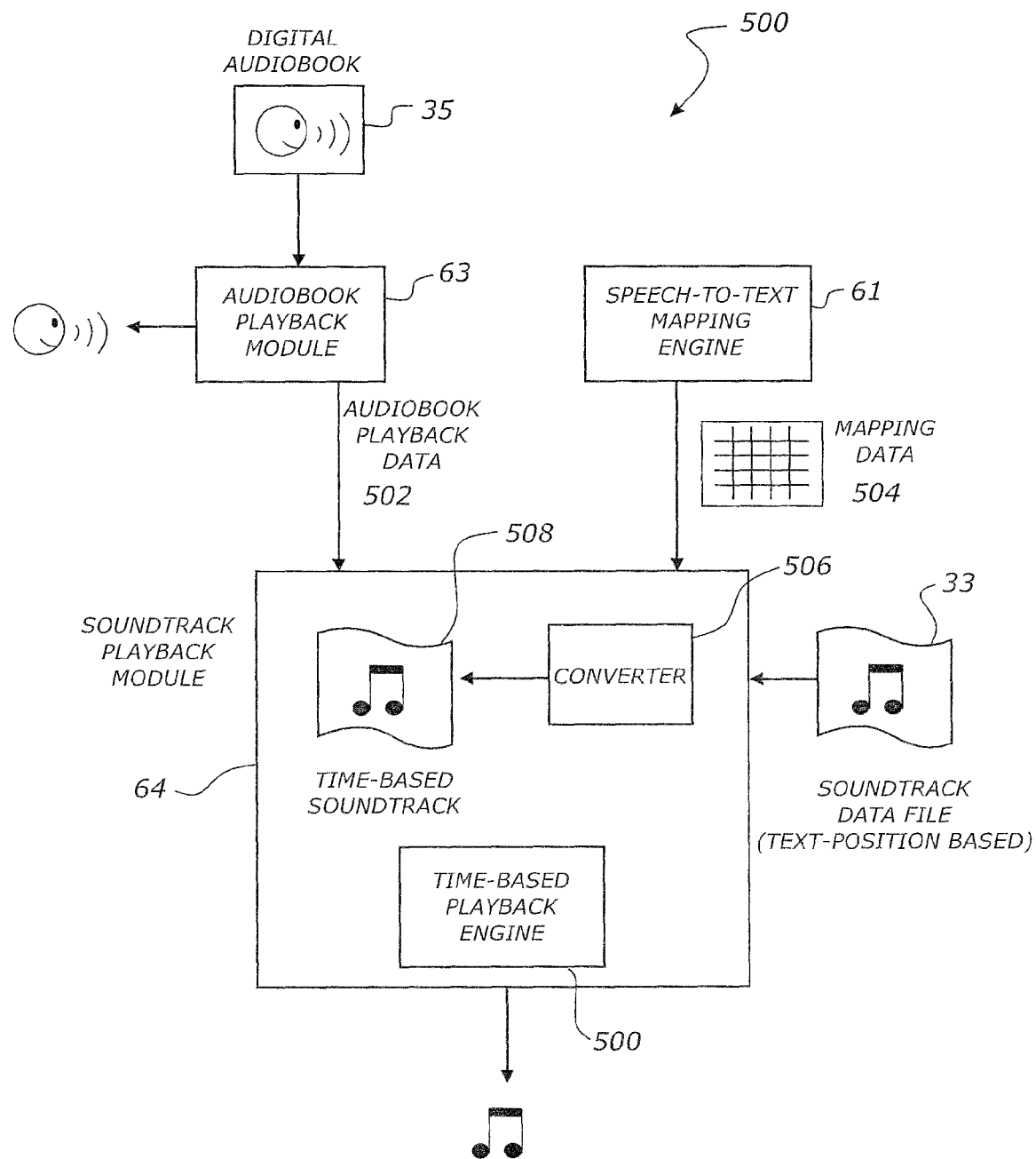
FIG. 7 is a schematic diagram of a playback system configured for the real-time playback and/or compilation of a soundtrack-enhanced audiobook in accordance with a third form configuration of the system of FIGS. 4A-4C in which the playback of a text-position based soundtrack is synchronised with the audiobook playback at least partly based on a conversion of the text-position based soundtrack to a time-based soundtrack.

5.4 Real-Time Playback System—Synchronised Playback of Text-Position Based Soundtrack Based on Time Domain Conversion Referring to FIG. 7, in this example configuration 500 of the playback a text-position based soundtrack 33 is synchronised for playback with an audiobook via conversion of the text-position based soundtrack into the time domain to generate the time-based soundtrack.

In this configuration 500, a soundtrack playback module comprises a converter 506 that is configured to receive the text-position based soundtrack 33 along with mapping data 504 from the mapping engine 61 or another mapping data source. The mapping data 504 is typically in the 1:1 mapping resolution described with reference to FIG. 3B, i.e. in which each text position in the e-book (e.g. word index value or CFI value) is mapped to a corresponding audiobook playback time in the audiobook at the or each narration speed setting. The converter 506 utilises the 1:1 resolution mapping data to convert the text-position based audio regions of the soundtrack into time-based audio regions. In particular, the start and stop text positions defining the playback of each audio region are converted into start and stop times equivalent to the audiobook playback timeline. For example, if an audio region corresponding to a sound effect starts on word number 400 and ends on word number 410, then mapping data is used to convert those positions into a time domain with reference to an audiobook timeline, i.e. the specific times in the audiobook timeline when those start and stop words are being narrated. The output is a time-based soundtrack indicated at 508, which is generated by the converter 506.

In one configuration, the converter may be configured to generate multiple time-based soundtracks for each different narration speed setting, or alternatively a single time-based soundtrack for a nominal narration speed of NS=1, which then can be modified or approximated as required if the digital audiobook playback is operated at a different narration speed settings.

In this configuration 500, the soundtrack playback module 64 comprises a time-based playback engine 510 that is configured to trigger the time-based audio regions of the modified soundtrack 508 based on audiobook playback data 502 received from the audiobook playback module. As with the previous configurations, the audiobook playback data 502 may comprise data indicative of the current audiobook playback time in the audiobook timeline, and optionally narration speed setting indicative of the narration speed the audiobook is being played at. The time-based playback engine 510 is then configured to trigger or schedule playback of the audio regions when their start and stop times match the audiobook playback timing data. The time-based playback engine is also configured to make appropriate modifications to the audio region start and stop times if the narration speed setting is altered, or alternatively the time-based playback engine may select the time-based soundtrack that corresponds to the narration speed setting being used by the audiobook playback module if multiple soundtrack versions for different narration speed settings are generated by the converter 506.

Figure 8:
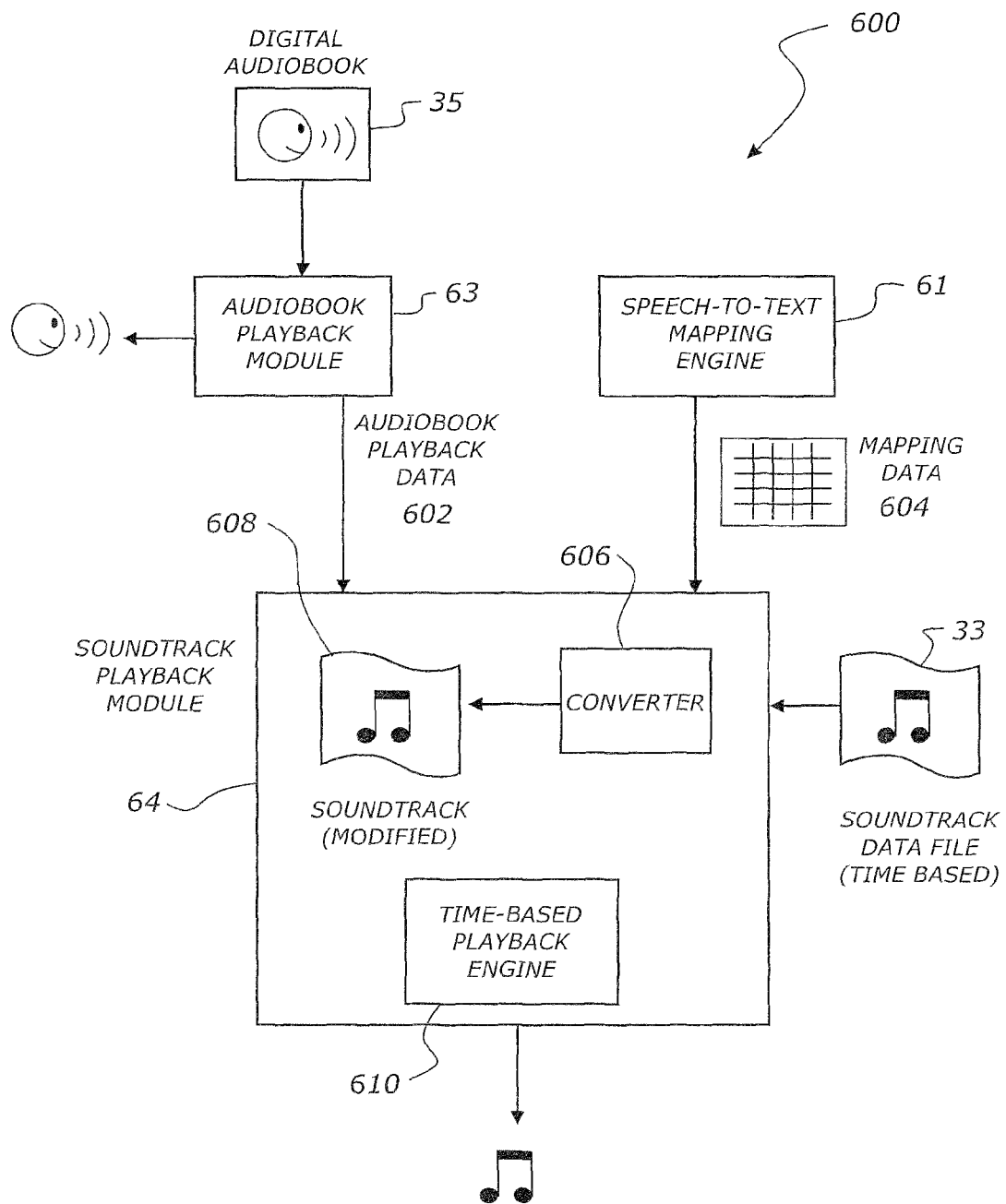
FIG. 8 is a schematic diagram of a playback system configured for the real-time playback and/or compilation of a soundtrack-enhanced audiobook in accordance with a fourth form configuration of the system of FIGS. 4A-4C in which the playback of a time-based soundtrack is synchronised with the audiobook playback at least partly based on a narration speed data associated with the audiobook playback.
Figure 9:
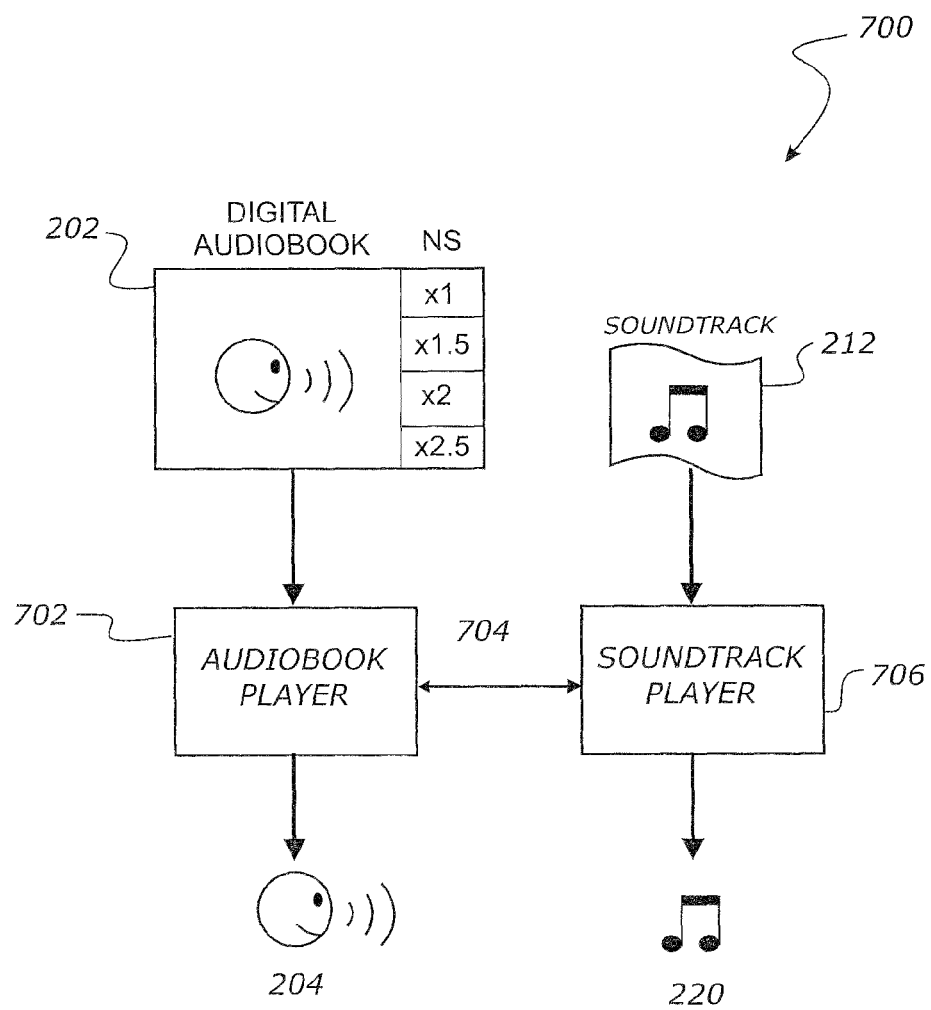
FIG. 9 is a schematic diagram overview of a real-time playback system for synchronising the playback of a soundtrack for electronic text with the playback of an audiobook narration of the electronic text in accordance with another embodiment.

5.5 Real-Time Playback System—Synchronisation of Time-Based Soundtrack to Audiobook Playback Based on Narration Speed Data Referring to FIG. 8, in this example configuration 600 the playback system is configured to synchronise the playback of a time-based soundtrack 33 for playback of a digital audiobook 35 based at least partly on narration speed data associated with the audiobook playback.

Similar to the previous configurations, the soundtrack playback module 64 receives audiobook playback data 602 from the audiobook playback module 63 as it plays the digital audiobook. The audiobook playback data 602 comprises data indicative of the current audiobook playback time or narration position in the audiobook timeline and optionally a narration speed setting indicative of the narration speed at which the audiobook is being played for such audiobooks allowing variable narration speed playback. The soundtrack playback module also receives mapping data 604 from the mapping engine 61. The mapping data 604 may be in the form of the data provided and described in FIGS. 3D and 3J. For example, the mapping data may comprise narration speed data indicative of the narration speed of the audiobook which is updated at a marker-determined frequency, which may be uniform or non-uniform. In one configuration, the mapping data comprises narration speed data for each text portion delineated by the reference markers, such as a narration speed per sentence, per paragraph, per chapter or some other text segment resolution or arbitrary reference marker resolution, whether user-defined and/or automatically generated.

In this configuration, the soundtrack playback module comprises a converter 606 that is configured to modify the time-based soundtrack 33 based on the narration speed data relating to the digital audiobook. For example, the time-based soundtrack data file comprises audio regions in which the start time and stop time positions of the commencement and ceasing of the playback of the audio regions are set and preconfigured based on a nominal reading speed, such as 200 wpm or some other nominal reading speed. The converter 606 is configured to modify the start and stop times associated with the audio regions to match the narration speed of the audiobook. For example, the start and stop times may be multiplied by a modifier factor corresponding to the ratio of the nominal reading speed at which the soundtrack was created and the narration speed of the audiobook. This may be done on a text segment by text segment basis such that the audio regions are modified based on the narration speed of the audiobook corresponding to their text segment.

For example, if narration speed data is provided at a resolution speed of a narration speed per chapter or per page, then the audio regions associated with a chapter or page are modified based on the narration speed for their respective chapter or page. By way of example, if a 'sound effect' audio region is configured with a start time of 60 seconds and an end time of 70 seconds based on a reading speed of 200 wpm, and the narration speed corresponding to the 'sound effect' audio region is calculated or determined based on the mapping data to be 100 wpm, then the start and stop times of the audio region are multiplied by the ratio of the reading speed divided by the narration speed, in this=200/100=2, generating a modified start time of 120 seconds and an end time of 140 seconds for the slower narration time relative to the faster reading speed time that the soundtrack was originally configured or defined on. This modification is applied to each of the audio regions based on their corresponding narration speed. The modified soundtrack 608 is output from a converter 606.

The soundtrack playback module 64 also comprises a time-based playback engine 610 that is configured to process the modified soundtrack 608 and trigger or schedule playback of the audio regions based on the modified start and stop times and based on the audiobook playback data 602, in particular the current audiobook playback time or narration position data.

As the narration speed setting of the audiobook playback module may be changed by a user, the converter 606 may be configured to create multiple modified time-based soundtracks 608 at different narration speeds which the time-based playback engine may pick up according to the narration speed setting in the audiobook playback data 602, as noted above. Alternatively, the time-based playback engine may receive a single modified soundtrack based on a nominal narration speed setting, e.g. NS=1, and then generate modifications to the soundtrack based on the narration speed setting in the audiobook playback data. For example, if the narration speed setting is NS=2, i.e. two times faster, then the time-based playback engine may halve the start and stop times of the audio regions generated in this modified soundtrack 608 and trigger playback based on those modified start and stop times.

6. Real-Time Playback System—Synchronized Playback of Soundtrack Based on Narration Speed Data Referring to FIG. 9, a variant of the playback system to that of FIG. 4A is shown in which mapping data is not employed. In this alternative playback system 700, the audiobook player 702 is configured to play the digital audiobook 202 to generate the narration output 204 of the e-book or other electronic text as in FIG. 4A. A soundtrack player 706 is also provided to synchronise the playback of the soundtrack 212 (which may be text-position based or time-based). In this configuration, the soundtrack player 706 is configured to receive audiobook playback data 704 from the audiobook player 702 indicative of the audiobook narration position (e.g. current audiobook playback time) and any narration speed setting. The soundtrack player is also configured to receive narration speed data associated with the audiobook. In one configuration the narration speed data may be provided in the audiobook playback data. In other configurations, the narration speed data may be extracted or calculated independently. In one form, the narration speed data may comprise an average narration speed for the entire audiobook, which may be calculated based on the total number of words in the electronic text being narrated and the total time duration of the audiobook playback. In other embodiments, the narration speed data may comprise multiple narration speed values calculated or provided for respective portions or segments of the audiobook playback timeline.

In one configuration, the soundtrack player is configured to trigger or schedule playback of the audio regions of the text-position based soundtracks based on the audiobook narration position and the narration speed data. For example, an incrementing reading or narration position variable (e.g. word counter or token index value) representing the text position in the electronic text corresponding to the current audiobook narration position (word being narrated) in the audiobook may be maintained based on the average narration speed and re-synced periodically or arbitrarily based on the audiobook narration position data from the audiobook player. The audiobook narration position (e.g. playback time) can be converted to its corresponding narration position or text position (e.g. word count or token index value) in the electronic text based on the average narration speed for example. For example, an audiobook playback time of 120 s at an average narration speed of 150 wpm corresponds to word #300 in the electronic text.

In another configuration, the soundtrack player module is configured to trigger or schedule playback of the audio regions of time-based soundtracks based on the audiobook narration position and the narration speed data. For example, the average narration speed may be used to compress or expand the time-based soundtrack by modifying the start and stop times based on the narration speed data to thereby synchronize the playback of the audio regions of the soundtrack to the audiobook playback.

7. Compilation of Soundtrack-Enhanced Audiobooks

The above playback systems described with reference to FIGS. 4A-9 have been discussed in respect of their configuration as real-time playback systems, i.e. systems which co-ordinate synchronised playback of a soundtrack to the audiobook playback. These systems can also be employed to generate compile soundtrack-enhanced audiobook audio files that can be stored digitally or recorded onto a computer-readable medium for distribution and/or playback at a later time. In particular, the playback systems can be configured as compilation or production systems that receive an digital audiobook and a soundtrack data file, both being associated with the same electronic text (e.g. e-book), and which combines or compiles those into a single soundtrack-enhanced audiobook audio file or files that comprises the soundtrack in synchronised playback with the audiobook narration. Theses compiled soundtrack-enhanced audiobook files can be generated at a range of narration speed settings, one audio file for each narration speed by altering the narration speed setting of the audiobook playback during compilation. In one configuration, the compiled soundtrack-enhanced audiobooks are generated by recording the narration output 204 and synchronised soundtrack output 220 channels of the playback systems.

The second approach to the creation and playback of soundtrack-enhanced audiobooks will now be described under section 8 with reference to FIGS. 10-14.

8. Creation and Playback of Soundtrack-Enhanced Audiobooks in Time Domain

8.1 Overview

The second approach to the creation and playback of the soundtrack-enhanced audiobooks relates to embodiments in which synchronised soundtracks are created or generated for audiobooks in the time domain based on the audiobook playback timeline. The resulting soundtrack-enhanced audiobook comprises the audiobook and a soundtrack that has a variable duration that is dynamically adaptable to the narration speed setting or narration playback speed of the audiobook without altering the pitch of the soundtrack playback. Additionally, the soundtrack dynamically adjusts to maintain any audio effect data set (as explained in section 9) such as fade in/out, volume changes (envelopes), phase changes, panning, and other audio effects, at any narration speed setting at playback.

8.2 Soundtrack-Enhanced Audiobook Creation and Playback System

Figure 10:
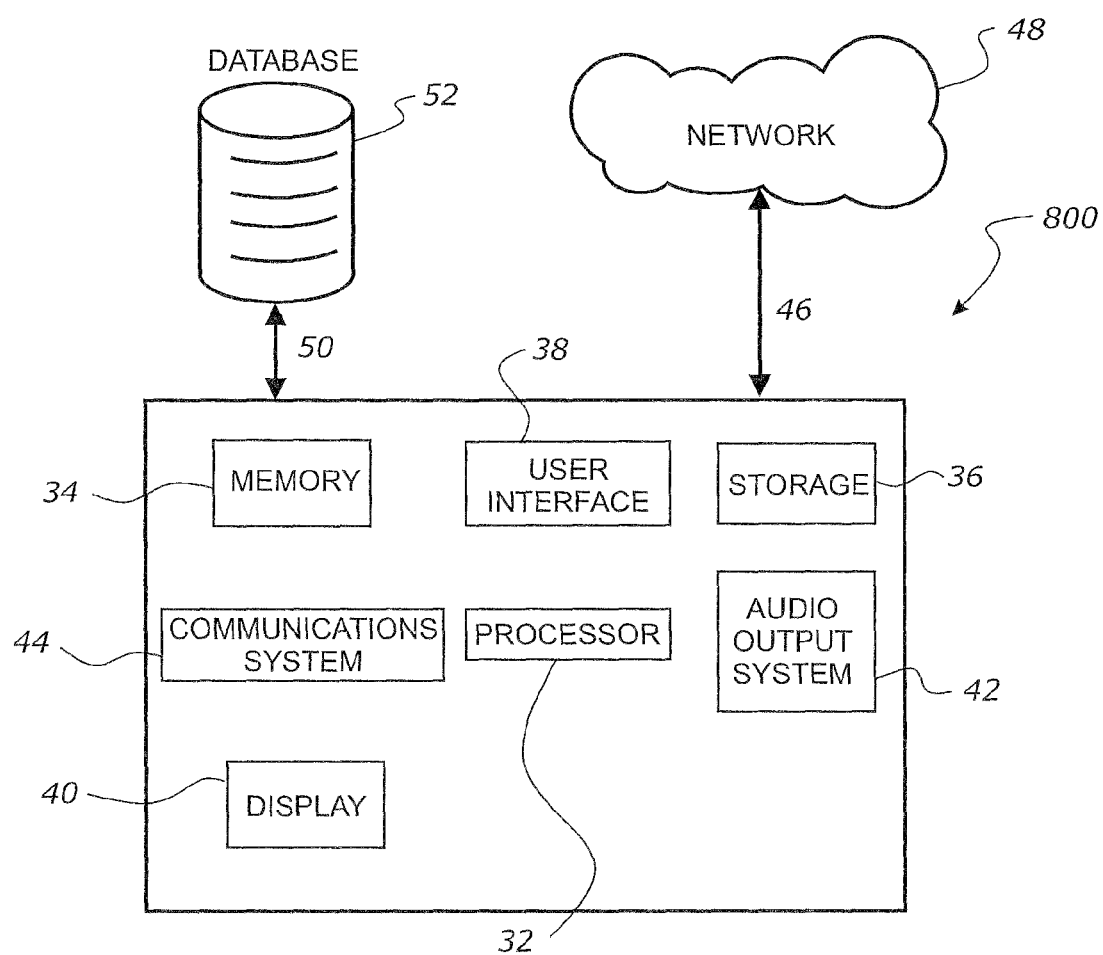
FIG. 10 is a schematic diagram of the hardware components of a soundtrack-enhanced audiobook creation and/or playback system in accordance with another embodiment.

Referring to FIG. 10, an embodiment of the programmable hardware system or platform or electronic user device that may be employed to create and/or playback the soundtrack-enhanced audiobooks will be described. The system 800 is this embodiment comprises similar components to the system described with reference to FIG. 4B and like numerals represent like components. The description and relationship of those hardware components is the same. The primary functions and modules of the creation and playback system will be described separately below. The functionality and/or modules of these systems may be implemented in software executed by the processor or processors of the hardware system 800. While the primary functions will be described as separate modules for convenience, it will be appreciated that the functionality may be integrated or separated as desired.

8.3 Soundtrack-Enhanced Audiobook Creation System

Figure 11:
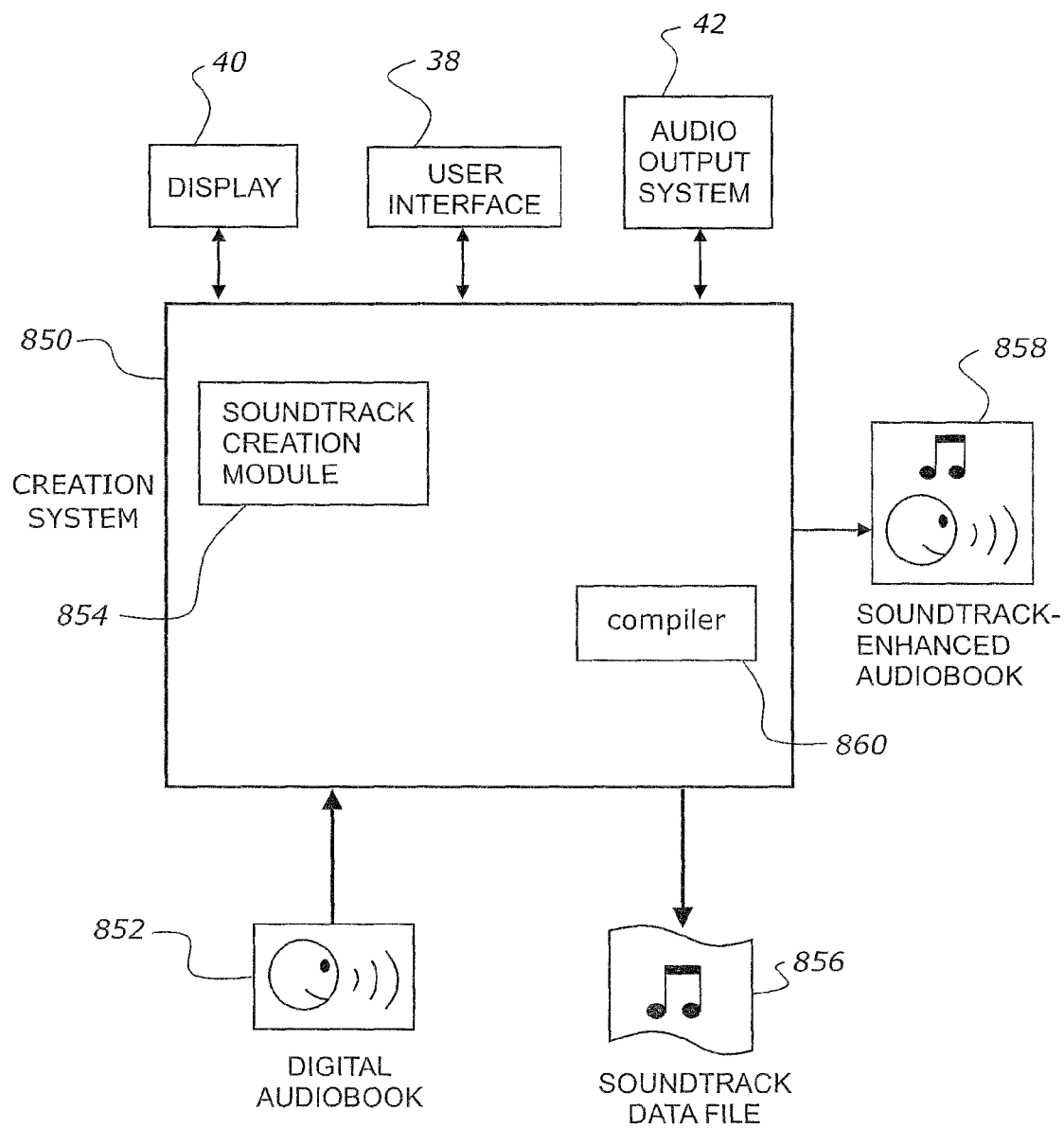
FIG. 11 is a schematic diagram of the modules of a creation system implemented on the system of FIG. 10 for the creation of a variable duration digital soundtrack in which the duration of the soundtrack is dynamically adjustable at least partly based on a narration speed variable associated with the audiobook playback in accordance with an embodiment.

Referring to FIG. 11, in this embodiment the creation system 850 is configured to receive or retrieve a digital audiobook file or files 852 and provides soundtrack creation module 854 with a graphical user interface on the display 40 that is operable by a user to configure and create a soundtrack for the audiobook of the type previously described. In one form, the configured soundtrack may be output as a digital soundtrack data file or files 856 for playback with the audiobook by a soundtrack-enhanced audiobook player. In another form, the soundtrack and audiobook may be compiled by an audio compiler 860 into a compiled digital soundtrack-enhanced audiobook 858 may be output comprising the audiobook and soundtrack together in a digital file or files for playback. Either form of soundtrack is adaptable by the soundtrack-enhanced audiobook player for synchronized playback with the audiobook at a variable or configurable narration speed setting.

Figure 12:
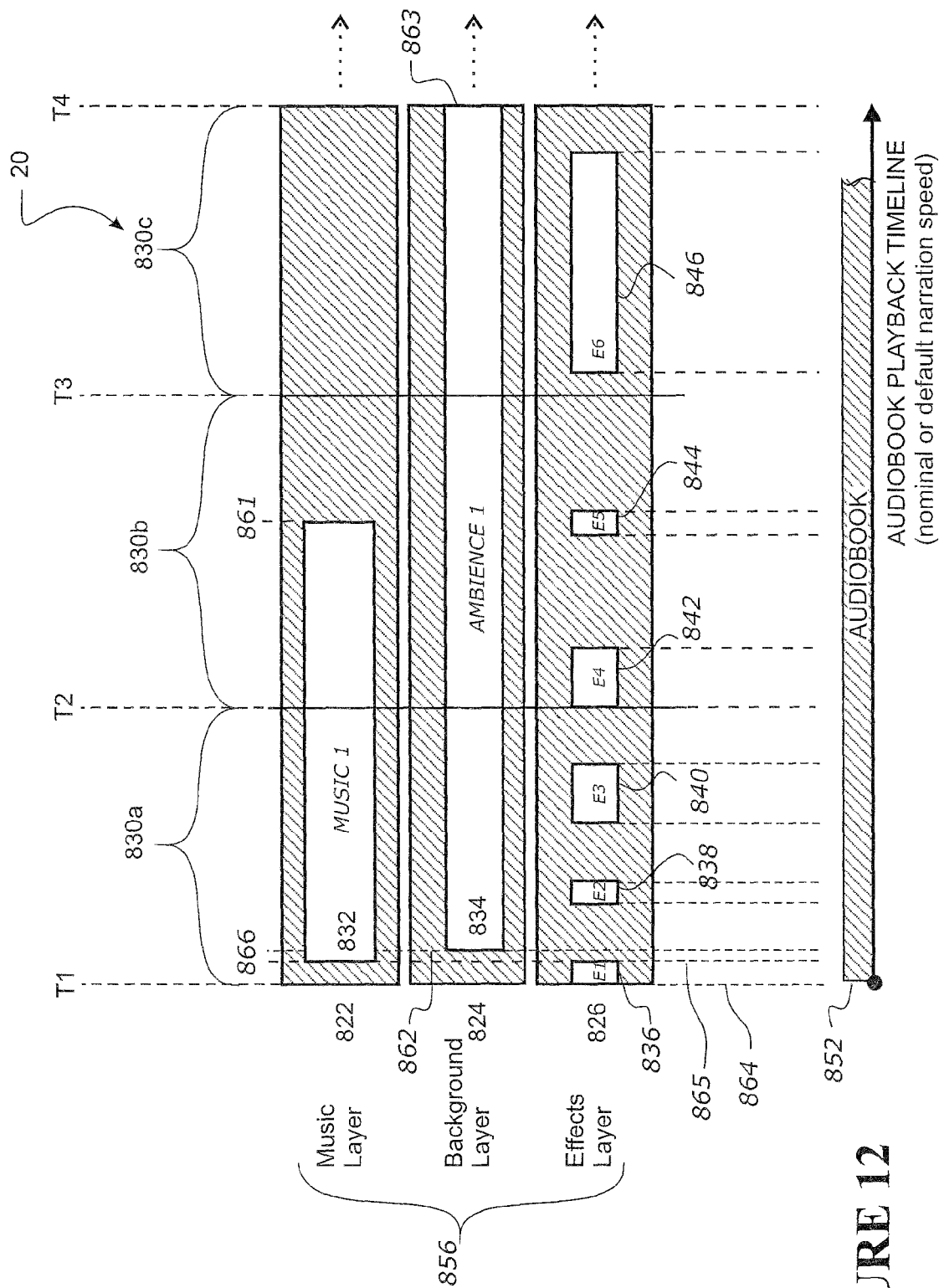
FIG. 12 is a graphical representation of the creation process of an example soundtrack with reference to the audiobook playback timeline in accordance with an embodiment.

By way of example only, FIG. 12 shows a graphical depiction of the type of graphical representation of the soundtrack 856 being created for an audiobook 852. It will be appreciated that the graphical user interface (GUI) used for creating the soundtrack may be varied as desired, but typically comprises a graphical representation of the audiobook 852 along an audiobook playback timeline. The GUI is operable with audio playback controls to enable the user to play the audiobook as desired over the audio output system 42 during the creation process. The audiobook playback controls may comprise any typical audio playback interface, including play, pause, stop, fast forward, rewind, skip forward, skip back or the like. The audiobook playback is provided typically at a default, standard or nominal narration speed (such as 125 wpm), although the user may be able to adjust the narration speed setting for the creation process if desired. Any adjustment of the narration speed setting will proportionately alter the duration or length of the audiobook playback timeline. The user may play the audiobook and identify narration regions where they would like to insert a corresponding audio region for synchronised playback.

In one configuration, a text overlay or text data relating to narrated words may be presented along the audiobook playback timeline, to assist in the soundtrack creation process. In particular, the user may identify key narration regions or passages based on the text data and insert the desired audio regions (whether music, ambience and/or sound effects) for those identified narration regions to enhance the listening experience. The user can insert the desired audio regions into the soundtrack 856 via the GUI at the desired position in the audiobook playback timeline to correspond with respective narration regions they have identified as candidates for audio-enhancement. Each audio region is defined by audio data comprising: a start time indicative of when the audio region should commence in the audiobook playback timeline, a stop time indicative of when the audio region should cease in the audiobook playback timeline, and audio track data indicative of an audio track that should play for the audio region and optionally any playback effects configured for the audio region (explained under section 9). In alternative embodiments, the audio regions may not have a defined stop time and may just stop based on the duration of the associated audio track.

The start and stop times for each audio region may be any form of data value directly or indirectly indicative of the intended start and stop time for the audio region in the audiobook playback timeline. In one form, the start and stop times may be time values in seconds or minutes or any other suitable time unit. In another form, the start and stop times may be proportional values relation to the overall duration or length of the audiobook, such as percentage values (e.g. start 10% into the timeline duration and stop at 15% into timeline duration) or the like.

The data defining the audio track to play during the audio region may be data indicative of a file or file path to the audio track in an audio track file database, which may be local or remote. In some configurations, the audio track data may be in the form of a link to the audio track stored in a remote database or provided by an audio streaming service or the like. In other configurations, the audio track data may import or embed the audio track file into the soundtrack such that the soundtrack itself comprises the audio track files for playback. In other configurations, there may be a mixture of audio regions, some linking to audio track files and others having embedded or imported audio files.

Optionally, each audio region may be designated a particular audio region type, such as 'music', or 'ambience', or 'sound effect'. As shown in FIG. 12, the soundtrack may be configured with one or a plurality of layers. The audio regions may be linked to a layer corresponding to audio regions of the same general type. In the example in FIG. 12, the soundtrack 856 comprises three audio layers, a music layer 822 comprising one or more music audio regions 832, a background layer 824 comprising one or more ambience audio regions 834, and a sound effects layer 826 comprising one or more sound effect audio regions 836, 838, 840, 842, 844, 846.

By way of example, 'music 1' audio region 832 is configured with a start time 860 and a stop time 861 in the audiobook playback timeline. The 'ambience 1' audio region 834 has a start time 862 and stop time 863 in the audiobook playback timeline. The sound effect 'E1' audio region has a start time shown at 864 and a stop time at 865 in the audiobook playback timeline, and so on. As shown, the audio regions may overlap entirely or partially with audio regions from other layers. The sound layers are configured to concurrent playback during the soundtrack. The audio regions are configured to be independently triggered for playback based on their configured or defined start and stop times.

The creation and editing of the soundtrack may be provided on the GUI in various ways. In one form, there may be an interface or buttons for configuring a new audio region in the soundtrack which then prompts the user to enter the required audio data to define the audio region via one or more pop-up panes or via displayed data fields, at which point a graphical representation of the audio region is presented in the soundtrack representation on screen. In another form, the user may simply click within the soundtrack at the appropriate start position in the audiobook timeline at which the audio region is to start to generate an audio region at that position. The start and/or stop times of the audio regions may be automatically configured or defined based on where the audio region is placed or inserted or located. Audio regions may be dragged and dropped into the soundtrack. The audio regions may be graphically manipulated on screen, e.g. stretched or compressed at either end to alter the start and/or stop times, and/or translated and re-located along the audiobook playback timeline as required.

The audio track data for each audio region may be selected from a file browser or database listing of the available audio tracks, whether stored locally, remotely or provided by a streaming music or audio service.

The digital audiobooks may be provided in various forms. In some forms, the audiobooks are a single audio file comprising the entire duration of the audiobook. In other forms, the digital audiobook is provided in the form of a series of audio track files that collectively represent the audiobook playback timeline when played in succession. For example, each audio track file may correspond to a respective chapter in the audiobook or the audiobook may be segmented or divided up into separate audio track files based on some other segmenting or marker scheme. By way of example, FIG. 12 shows the audiobook being segmented into sections 830a-830c delineated by spaced-apart time markers T1, T2, T3, T4 and so on. In some forms, each of these sections may have a corresponding audiobook audio track representing the narration of that section. In other forms, a single audiobook file may be provided with the time markers as section indicators purely as reference points to assist the creator of the soundtrack. In some embodiments, the start and/or stop times defined for each audio region may be relative to the overall audiobook playback duration, and in other embodiments the start or stop times may be relative to preset time markers such as section markers or other markers defined along the audiobook playback duration.

As will be further explained with regard to the soundtrack-enhanced audiobook playback system, the start and stop times associated with the audio regions are variable at playback based on a narration speed input indicative of the narration speed setting at which the audiobook is played back. The start and stop times of the audio regions are modified based on the playback narration speed input relative to the nominal narration speed at which the soundtrack was originally configured so as to ensure the audio regions are triggered for synchronised playback with their corresponding narration regions in the audiobook playback timeline, the duration of which varies depending on the narration speed setting.

Once the soundtrack is completed, the soundtrack may be output as a soundtrack data file 856 comprising the audio data for the audio regions, and also typically the nominal narration speed associated with the audiobook playback timeline during creation of the soundtrack. The soundtrack data file or files may in some configurations additionally comprise the audio track files associated with one, some, or all of the audio regions. The soundtrack may then be provided alongside the conventional audiobook for subsequent playback. The soundtrack may also be compiled with the audiobook into a soundtrack-enhanced audiobook file 858 that comprises both the audiobook and soundtrack in a single file or file package for subsequent playback.

8.4 Soundtrack-Enhanced Audiobook Playback System

Figure 13:
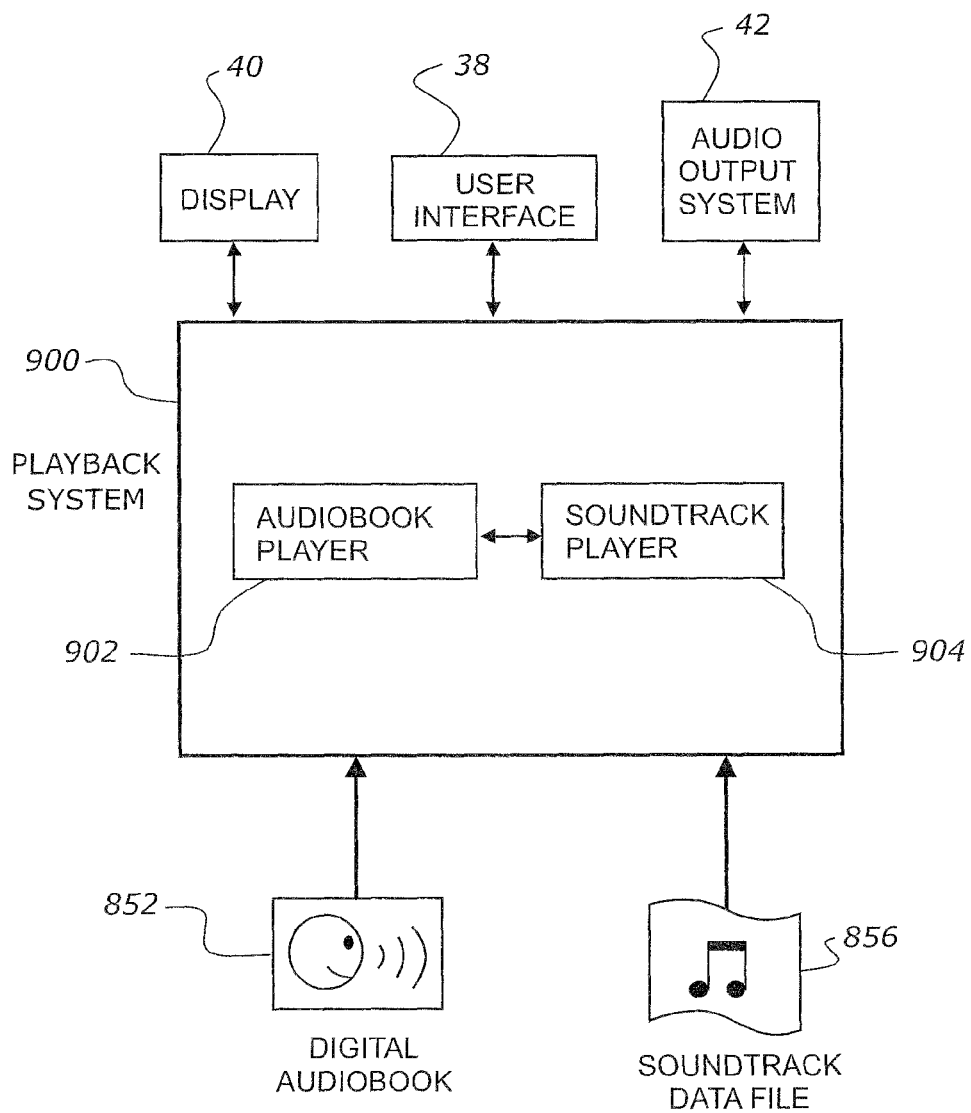
FIG. 13 is a schematic diagram of the modules of a playback system implemented on the system of FIG. 10 for the playback of a variable duration digital soundtrack based on the audiobook playback data associated with the audiobook playback.

Referring to FIG. 13, an embodiment of a soundtrack-enhanced audiobook playback system 900 will be described by way of example. In this embodiment, the playback system comprises an audiobook player module 902 and a soundtrack player 904 module, although in alternative embodiments it will be appreciated that the functionality of these modules may be provided in a single audio player module or component.

The audiobook player 902 is configured to retrieve or receive the audiobook file or files 852 and playback the audiobook over the audio output system 42 in response to user audio playback controls. In addition to the usual audiobook playback controls, the user is able to vary the narration speed of the audiobook playback, as will be appreciated to a skilled person or user of audiobooks. Some audiobooks are provided with digital signal processing techniques that reduce or minimize pitch-shifting in the narration that can occur when changing the narration speed setting.

Typically, the narration speed is selected from a predefined number of narration speed (NS) settings which are multipliers or speed factors relative to a nominal or default or standard narration speed, or the narration speed may be selected from a continuous scale defined between a slow narration speed end such as ×0.5 (e.g. 50 wpm) to a fast narration speed such as ×5 (e.g. 500 wpm), as previously explained with respect to earlier embodiments. The narration speed selected for the audiobook playback may be represented by a narration speed variable that is stored in memory. The narration speed variable may be in the form of an absolute narration speed value such as words per minute (wpm) value or alternatively a relative narration speed value, for example a multiplier value relative to the nominal narration speed, or any other data such as a selected playback time duration relative to the nominal playback duration at the soundtrack creation.

In this embodiment, the audiobook player 902 and soundtrack player 904 communicate. For example, the soundtrack player 904 receives or retrieves audiobook playback data from the audiobook player 902 relating to the audiobook playback via a direct interface of API or similar. The audiobook playback data may comprise data indicative of the current or real-time audiobook playback position or time counter as the audiobook is being played and data indicative of the narration speed variable.

The soundtrack player 904 is configured to receive and process the audiobook playback data from the audiobook player 902 and trigger synchronise playback of the audio regions of the soundtrack with their respective narration regions as they are being narrated in the audiobook playback. As previously noted, the soundtrack 856 is a variable duration soundtrack in which the duration of the soundtrack dynamically adjusts based on the narration speed of the audiobook playback to ensure synchronisation holds at any selected narration speed. In particular, the narration speed variable associated with the audiobook playback defines the total playback duration of the audiobook, and the soundtrack player is configured to dynamically alter the duration of the soundtrack to match the audiobook duration based on the narration speed variable as will be further explained with reference to FIG. 14.

Figure 14:
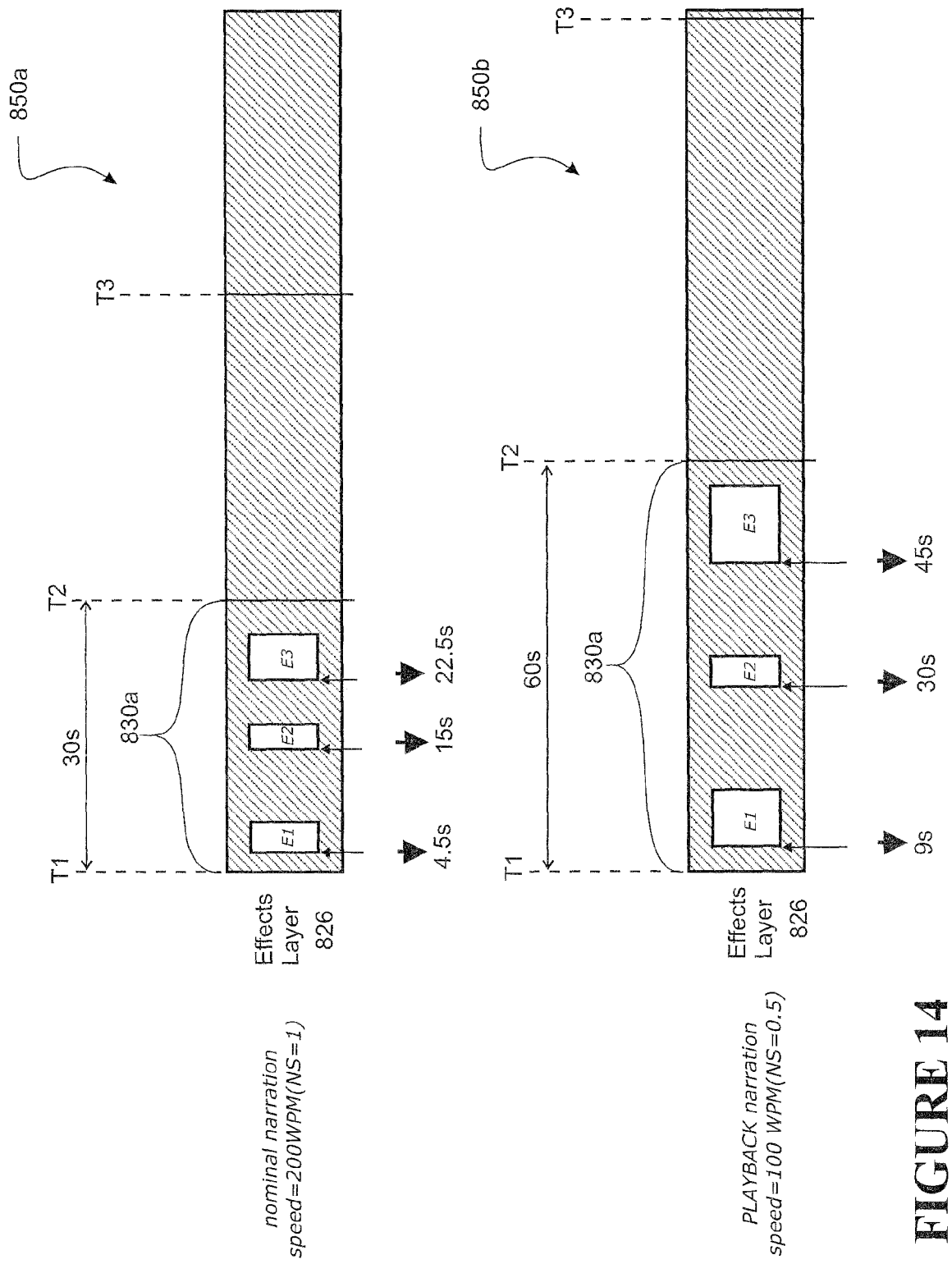
FIG. 14 is a graphical representation showing the positional adjustment of the audio regions in the soundtrack based on a narration speed change in the audiobook playback in accordance with an embodiment of the invention.

Referring to FIG. 14, a portion 850*a* of the sound effects layer 826 from the soundtrack 856 of FIG. 12 is shown. In this example, the sound effect audio regions E1, E2, E3 have audio data defining their respective start times as 4.5 s, 15 s and 22.5 s for a nominal narration speed of 200 wpm or NS=1, which corresponds to the nominal audiobook playback duration when the soundtrack was configured. If the listener slows the narration speed to half (e.g. 100 wpm, NS=0.5), which doubles the audiobook playback time and changes the position and duration of the narration regions in the audiobook, then the soundtrack player is configured to alter or modify the trigger start and stop times of each of the audio regions based on the updated narration speed variable relative to the nominal narration speed variable associated with the soundtrack creation. In particular, the start times of each of the audio regions E1, E2, and E3 are doubled to 9 s, 30 s, and 45 s respectively. The respective stop times of the audio regions are modified in a similar manner, if the audio regions have stop times. The result of the modification is that the position and duration of the audio regions along the soundtrack timeline matches their respective narration regions in the audiobook playback timeline. The soundtrack player 904 then triggers the playback of the audio regions based on the modified start and stop times of the audio regions based on the audiobook playback data as described below.

The soundtrack player 904 triggers or schedules the audio regions to commence and cease playback based on when their start and stop times match the current audiobook playback time. When an audio region is triggered to play, the soundtrack player retrieves the audio track associated with the audio region (whether stored locally, remotely, or whether linking to a streamed version of the audio track file) and cues it for playback. The playback of the audio file of the audio region is halted once the audiobook playback time matches the stop time defined for the audio region.

The overall soundtrack is configured to have a variable duration that can be expanded or compressed based on the narration speed variable relative to the nominal narration speed at soundtrack creation. This enables the soundtrack to be dynamically synchronized to the audiobook playback at different user-selected narration speeds but without altering the pitch of the soundtrack. In particular, the soundtrack player is configured to modify the position and duration of the audio regions of the soundtrack based on the narration speed variable. The spectral properties of audio track files played in the audio regions of the soundtrack are not altered or modified, just their trigger position and duration of playback.

9. Dynamically Adjusting Audio Playback Effects of Audio Regions of the Soundtrack-Enhanced Audiobooks 9.1 Overview In any of the above embodiments, any one or more of the audio regions of the soundtrack may optionally further be defined by audio data comprising playback effect data that defines one or more controllable audio playback effect settings that are to be varied across the audio region of a portion of the audio region based on the listener's real-time narration position in the audiobook playback timeline. By way of example only, the pre-configured playback effect data may define any one or more of the following controllable audio playback effect settings: volume, balance, equalization, reverberation, distortion, phase-shifting, or any other such playback effect.

As outlined in the embodiments above, the soundtrack-enhanced audiobooks may be created from pre-existing soundtracks originally configured for synchronised playback based on the reading of text, or alternatively the soundtracks may be created originally for the audiobook. In either case, the above controllable playback effect data may be configured for one or more of the audio regions. For the text-based soundtracks, the playback effect data may be defined on a word-by-word basis across the audio region or a portion of the audio region, and playback of the audio effect data is then adapted based on the audiobook playback data (e.g. narration position or playback time) such that the playback effect data is applied during soundtrack playback based on a corresponding narrated-word by narrated-word basis. For the time-based or time-domain created soundtracks, the playback effect data may be defined in the time domain, and the playback effect data is applied during playback based on the audiobook playback data (e.g. narration position or playback time). In either case, the soundtrack player is configured to dynamically adjust the playback effect data based on any narration speed setting changes in the audiobook playback so as to maintain the originally configured playback effects, i.e. ensuring the audio effects trigger or vary at the desired narrated words, regardless of the narration speed setting.

9.2 Examples of Audio Region Playback Effect Data

Optionally, some or all of the audio regions of the soundtrack may further be defined by real-time playback effect data that defines one or more controllable audio playback effect settings that are to be varied across the audio region or a portion of the audio region based on the audiobook playback time (e.g. narration position or the listeners playback position). During playback of the soundtrack with the audiobook, the playback system controls/varies the playback effects settings of the audio output system based on the audiobook playback data (e.g. narration position and/or narration speed variable) for each audio region having pre-configured playback effect data. In situations where portions of the soundtrack have two or more overlapping audio regions, each having pre-configured playback effect data, the playback effect settings are varied independently for each audio region on its respective separate audio channel.

In an embodiment, the playback effect data is in the form of one or more automation envelopes that are configured for at least some audio regions. An automation envelope defines one or more playback effects or features or sound manipulations that are applied to the audio track of an audio region in real-time during playback across the audio region or a portion of the audio region. For example, the automation envelope may define a controllable audio playback setting that varies in real-time throughout the duration of the audio region playback, and which may be dependent on the real-time audiobook narration position relative to the playback duration of the audio region.

In an embodiment, the automation envelope is a programmable function configured to apply real-time sound manipulation to the audio playback of the audio track based on the end listener's playback position in the audiobook. For example, the programmable function is dependent on a variable representing the audiobook real-time playback position (which may correspond or represent the current word being narrated in the audiobook) within the audio region playback duration such that the real-time sound manipulation applied to the audio track playback may be configured to vary as desired across the audio region duration (which is dependent on the narration speed setting). In one configuration, the audiobook playback position may be represented by the narration position counter corresponding to an index value of the word being narrated or a higher or lower frequency counter being a product or function of the narration position counter if desired. In another configuration, the audiobook playback position may be represented by the playback time value and the current narration speed setting relative to the nominal narration speed setting at which the playback effect data was configured.

In one example, the programmable function may be configured such that the sound manipulation or playback effect setting that is varied during playback of the audio track across an audio region (or a portion of the audio region) between the start position or time and the stop position or time of the audio region is a function of the audiobook playback position or an offset playback position within or from the start of the audio region. The programmable function may be configured to provide a smoothed manipulation of the desired playback effect setting across the audio region to correspond to a smooth envelope shape. In other embodiments, the automation envelope may be defined by or stored in a look-up table that comprises a column listing the playback positions in the audio region at the desired sampling rate (e.g. narrated word or alternatively index value or alternatively a higher sampling rate than each index value or other discrete positions within the audio region) and a column listing the desired playback effect setting for each audiobook playback position. The look-up table may additionally define transition properties between discrete positions, e.g. smooth transitions between changing degrees or levels of application of a playback effect between discrete positions or any other transition effect may be utilised.

The automation envelope may apply across the entire audio region or a portion of the audio region as discussed such that the playback effect settings are manipulated or controlled in real-time during playback according to the listener's real-time playback position in the audiobook (which has a corresponding position within the associated audio region or regions). The automation envelope may have any desired shape across the audio region, whether ramped, arbitrary, smooth, piece-wise, stepped, or any other linear or non-linear profiles or functions that vary with the playback duration. In one embodiment, the automation envelope shape may be defined by one or more discrete set-points configured for one or more index values representing text positions (e.g. narrated words) in the audio region and the overall remaining envelope shape between the set-points may be interpolated to progress or transition smoothly between the set-points or in a truncated manner or any other interpolation function may be employed.

In operation during playback, as will be explained in further detail below with respect to the soundtrack player, the frequency of variation or control of the playback effect setting match that dictated by the automation envelope may be varied as desired to control the accuracy of reproduction or application of the envelope shape to the audio region. For example, in some embodiments the playback effect setting may be manipulated or controlled as a rate or frequency corresponding to a narration position counter rate, such that the playback effect setting is modified to match the envelope on a narrated word-by-word basis, i.e. is controlled or changed as required to match the envelope setting at each narrated word in the audio region. Alternatively, a higher frequency of control may be applied in which the playback effect setting is modified at a frequency higher than that of the narration position counter rate such that playback effect setting is controlled or updated to match the envelope shape at least twice or multiple times for each narrated word in the audio region. In some embodiments, a separate automation envelope update counter may be provided that has a frequency (typically higher) that is a product or factor of the frequency of the narration position counter or which is based on the user's reading speed. The soundtrack playback module may be configured to modify or update the playback effect setting in real-time to match the automation envelope setting at that playback position in the audio region defined by the automation envelope update counter such that the playback effect setting is updated each time the automation envelope update counter increments, i.e. updating at the frequency of the automation envelope counter. It will be appreciated that the highest frequency of updating of the playback effect setting to match the envelope is dictated by the hardware and/or sound processor used. As previously noted, in alterative embodiments, the counters may be timers, i.e. timers that correspond or map to the narrated word counters.

Two examples of automation envelopes will now be described, namely volume enveloping and panning enveloping, but it will be appreciated that the enveloping concept may be applied to any other playback audio property or effect setting that determines the nature or content of the audio output, including but not limited to equalization, filtering, mixing, channel settings, reverberation, distortion, phase-shifting, or any other playback effect.

Volume Enveloping

Figure 15:
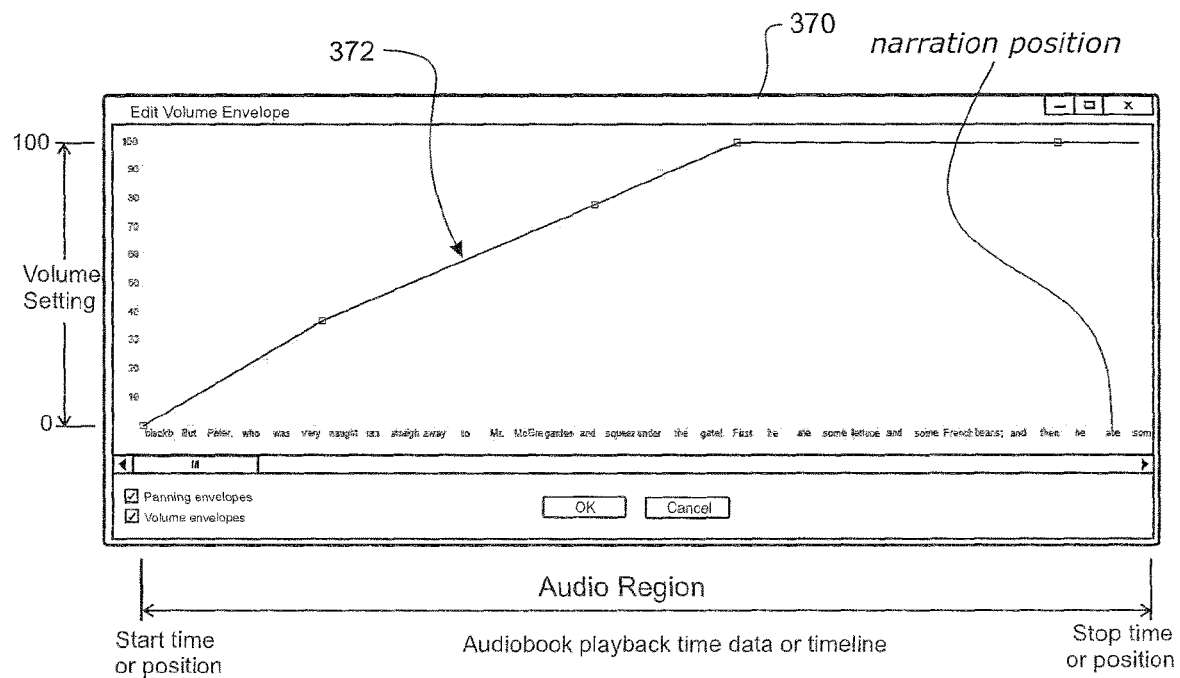
FIG. 15 shows a screenshot of a GUI for configuring a volume envelope to be applied to an audio region of the soundtrack in accordance with an embodiment.

Volume enveloping or volume automation may optionally be applied to each audio region in parallel with or as an alternative to any configured fade-in and fade-out playback effects. Referring to FIG. 15, activation of the volume envelope setting may initiate a GUI 370 for the volume envelope interface to enable the user to configure the desired volume envelope across the entire audio region between the start of the audio region and end of the audio region. Typically, the volume envelope defines the playback volume setting across the audio region relative to a default volume setting. The GUI 370 shows a grid of volume setting on the vertical axis between 0 to 100% and the audiobook playback timeline or position (e.g. narrated words) for the audio region along the horizontal axis. In particular, a volume setting may be defined across the audio region. For example, the volume setting is shown on the vertical axis of the volume envelope grid from 0-100% of the individual volume setting 358 previously described. Displayed along the horizontal axis of the volume envelope grid is the narration region corresponding to the audio region. In some embodiments, the narrated words in the audio region may be displayed. In other embodiments, the audiobook playback timeline or time data may be displayed (at the nominal narration speed at which the soundtrack is created). In this embodiment, the volume envelope 372 shape may be varied in a piece-wise fashion with a volume setting set-point being configured for each narrated word or a selection of narrated words such that the overall envelope shape is formed or interpolated between the discrete volume set-points as shown, although it will be appreciated that a higher resolution of volume settings may be provided in alternative embodiments if desired. The envelope shape between set-points may be any desired interpolation function, including a smoothing transition or direct point-to-point interpolation or any other interpolation method or function. In this embodiment, the volume envelope shape may be configured by moving the volume envelope line 372 on the grid as desired. In FIG. 15 a relatively gradual increase in volume from the start position at zero volume to 100% at approximately two-thirds through the audio region is shown. Any desired volume enveloping may be applied. It will also be appreciated that the volume enveloping may be used as an alternative to applying fade-in and fade-out effects if desired or alternatively may be used in parallel.

Panning Enveloping

Figure 16:
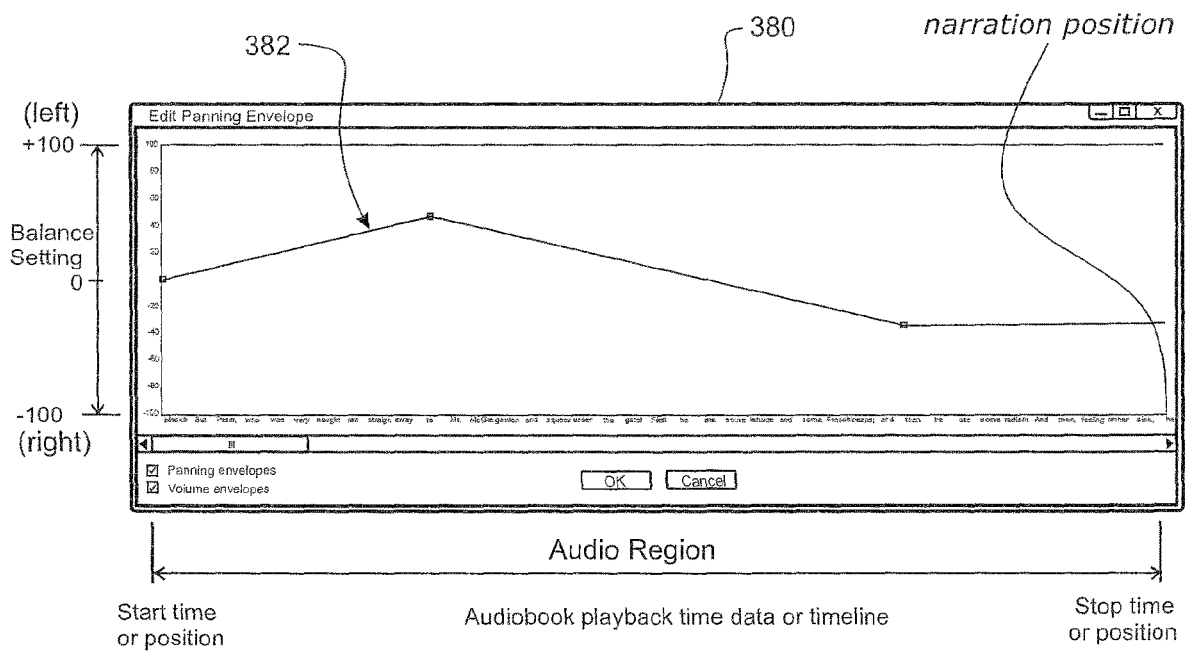
FIG. 16 shows a screenshot of a GUI for configuring a panning envelope to be applied to an audio region of the soundtrack in accordance with an embodiment.

A panning envelope 420 may also optionally be applied to each audio region. The panning envelope defines a balance setting or weighting to be applied to the audio output left and right stereo signals for the left and right ears of a user. In other words, the panning envelope defines the balance of the playback volume differential of the audio track between left and right stereo signals relative to a default balance setting across the audio region between the start position and stop position. The default balance setting may be centered or balanced with equal volume being applied to the left and right stereo channels. Referring to FIG. 16, the panning envelope may be configured via a panning envelope interface GUI 380, similar to the volume envelope interface 370. The GUI 380 shows a grid for a piece-wise panning envelope line 382 that is defined by a balance setting provided on the vertical axis with the audio region represented by a portion of the audiobook playback timeline or position (e.g. narrated words) for the audio region along the horizontal axis. In this embodiment, the balance setting varies between +100% to −100%, with 100% representing full volume to the left channel and nil volume to the right channel, and −100% representing full volume to the right channel and nil to the left channel. The balance setting in this embodiment effectively defines a ratio of the volume applied to the left and right channel. A setting of 0% equals 100% volume applied to each left and right channel. A setting of +20% represents 100% volume to the left channel and 80% volume to the right channel. A setting of −50% represents 100% volume to the right channel and 50% volume to the left channel, and so on. Alternatively, it will be appreciated that any other form or scheme for balancing relative volume between the left and right stereo channels may be applied. Like for the volume envelope, the panning envelope may be configured by dragging or shaping the panning envelope line 382 on the grid into the desired shape. The balance setting may be configured on a piece-wise manner with the balance setting set-points being determined for each narrated word or a selection of narrated words in the audio region, but alternatively a higher resolution of set-points may be applied if desired, and with the envelope shape being determined by an interpolation function between the configured set-points. In the example panning envelope line 382 of FIG. 16, the audio region starts with a centered balance and progresses into a slightly left channel dominant balance setting, and then progressively tracking toward a slightly right channel dominant balance setting, which is then kept constant until the end of the audio region.

Configuring the panning envelope for audio regions enables various playback effects to be obtained, including providing a sense of movement of the sound or other static or dynamic spatial properties. It will be appreciated that the audio tracks of audio regions may have their own stereo properties and that the panning envelope may be used in parallel to enhance those inherent stereo or spatial effects. Additionally, for audio tracks without stereo effects or which are monaural, the panning envelope may provide a sense of movement or spatial location to the audio playback when heard by the user. The panning envelope may enhance the reading experience, such that movement and/or the spatial properties of the audio may correspond to the content of the audiobook. For example, sound effects may be able to pan from the left ear to the right ear to create a sense of movement in the case of a narration region which relates to a train passing by. Or if the audiobook refers to a gunshot being heard to the left of a character, the appropriate balance to the left channel may be applied to an audio region comprising an audio tracking representing a 'gun shot' sound effect.

The volume and panning envelope settings may be applied to work in combination to produce the desired playback effects. Either of the configuration interfaces 370, 380 may be activated to display both the volume envelope line 372 and panning envelope line 382 on the same grid if desired.

9.3 Application of Playback Effect Data by Soundtrack Player

As mentioned above, the soundtrack player is configured to control the playback effect settings of the audio output system according to any pre-configured playback effect data (e.g. automation envelopes) of an audio region, or this may be controlled by an automation envelope sub-module. If two or more audio regions are playing concurrently on different channels, the soundtrack playback module is configured to independently vary the playback effect settings associated with each channel according to any pre-configured playback effect data defining the audio region playing on each channel. For example, a panning envelope may be applied to a sound effect audio region playing on one channel while a volume envelope is simultaneously being applied to a background music audio region on another channel.

By way of further explanation, the audio data for an audio region may comprise one or more automation envelopes that define one or more respective playback effect settings to be varied across the playback of the audio region in based on the listeners audiobook playback position (which corresponds to a playback position relative to the audio region playback duration). The soundtrack playback module is configured to vary one or more playback effect settings of the audio output system or perform sound manipulation of the audio track of an audio region according to the automation envelope(s) defined in the audio data of that region during the playback duration of the audio region. In one embodiment, the playback effect settings may be modified or updated to match the automation envelope at a frequency corresponding to the a narration position counter or narration position playback timer or the playback effect setting may be updated to match the automation envelope at a higher frequency than the narration position counter or timer. For example, a separate automation envelope update counter may be provided that increments at a frequency higher than that of the narration position counter, and may or may not be based on the narration speed variable. As previously described, the automation envelope for an audio region may be stored in the audio data as a programmable function that is dependent on the real-time playback position within the audio region, or a look-up table, by way of example only.

By way of example, the soundtrack playback module may be configured for real-time volume adjustment according to a volume envelope, or real-time balance adjustment according to a panning envelope. The soundtrack playback module may be configured to directly modify the audio track playback properties with audio or sound pre-processing of the audio track and/or via controlling the settings and controls (volume, balance, equalizer etc) of the audio output system via control signals.

In this embodiment, the soundtrack player continuously or periodically monitors the narration position counter or timer to coordinate and cue playback of the audio regions. As will be appreciated, the soundtrack player may coordinate playback of concurrent or overlapping audio regions on multiple different channels. The soundtrack playback module is also configured to modify the playback properties of the audio regions to reflect any playback effect configuration settings of the audio data, such as but not limited to, fade-in and fade-out effects, balance settings in accordance with any panning envelope, and volume envelope settings as set out above. For example, the playback effects of an audio track of an audio region may be modified throughout the audio region to comply with any playback effects that are configured based on the reading position counter. For example, the playback effects may remain constant or vary throughout an audio region depending on the configured audio data. In this embodiment, the narration position counter or timer (e.g. based on the audiobook playback data) represents the current word being narrated and the soundtrack playback module can modify the playback effects of the audio regions to match the listener's current narration position in real-time in accordance with the pre-configured audio data.

In this embodiment, the soundtrack player coordinates the playback of the audio regions by continuously and/or periodically searching and analyzing the audio data, for example at each new narration counter or timer increment or some higher frequency, to assess whether any new audio regions should commence playback, whether playback of any audio regions should cease, or whether the playback effects or audio properties (e.g. volume or balance) should be modified for currently playing audio regions. Based on this analysis, the soundtrack playback module alters and cues playback of the audio regions to accord with the audio data with the timing for synchronisation with the listener's position in the audiobook.

9.4 Summary Regarding Playback Effect Data

In summary, the audio playback effect data for each audio region may be configured to be variable according to any desired profile over an audio region, as explained with regard to the volume and panning envelope examples. Typically such volume and panning effects are required to trigger in accordance with a profile based on the words being narrated, so that the volume variance or panning variance is timed specifically according to the words being narrated in the audiobook. If the soundtrack-enhanced audiobooks are created based on pre-existing soundtracks for reading, the playback effects may be defined on a word-by-word basis, or alternatively may be defined on a corresponding time basis of the audiobook playback timeline if the soundtrack is created in the time domain for a nominal narration speed setting or nominal audiobook playback duration. In either case, the soundtrack player is configured to ensure the timing or scheduling of any configured playback effect data is maintained or synchronised with the narrated words regardless of the narration speed setting at playback. For example, the result is that the originally configured volume and/or panning envelope profiles are effectively compressed or expanded in proportion to the narration speed setting during audiobook playback to ensure the timing of the playback effects is synchronized with the narrated words at any narration speed.

10. Controlling the Volume Mix Between the Audiobook Volume and Soundtrack Volume Any of the embodiments of the playback system described above may have a volume control interface for controlling the mix of the volume of the audiobook narration relative to the soundtrack, or vice versa. For example, various forms of volume control user interfaces may be provided. In one form, the entire soundtrack may be switched to mute via an 'on/off' button providing for only playback of the audiobook without the accompanying soundtrack. In other forms, the volume of the soundtrack may be controlled on a scale from zero volume to a predefined maximum limit. The maximum limit may be less than, substantially equal to, or alternatively greater than the general or average volume level of the audiobook narration, depending on the configuration. In yet other forms, an independently operable volume scales for each of the audiobook and soundtrack may be provided. In yet other forms, the volume of the soundtrack may be controlled according to sound layer types. For example, the user may be able to control independently the volume of the sound effects layer, ambience layer, and music layer of the soundtrack (i.e. globally control the volume of audio regions of the soundtrack belonging to particular group or class, such as sound effects, ambience, or music), including entirely muting one or more layers if desired. It will be appreciated that the playback systems may be provided with one or more of these forms of volume control interfaces in any combination if desired.

Figure 17A:
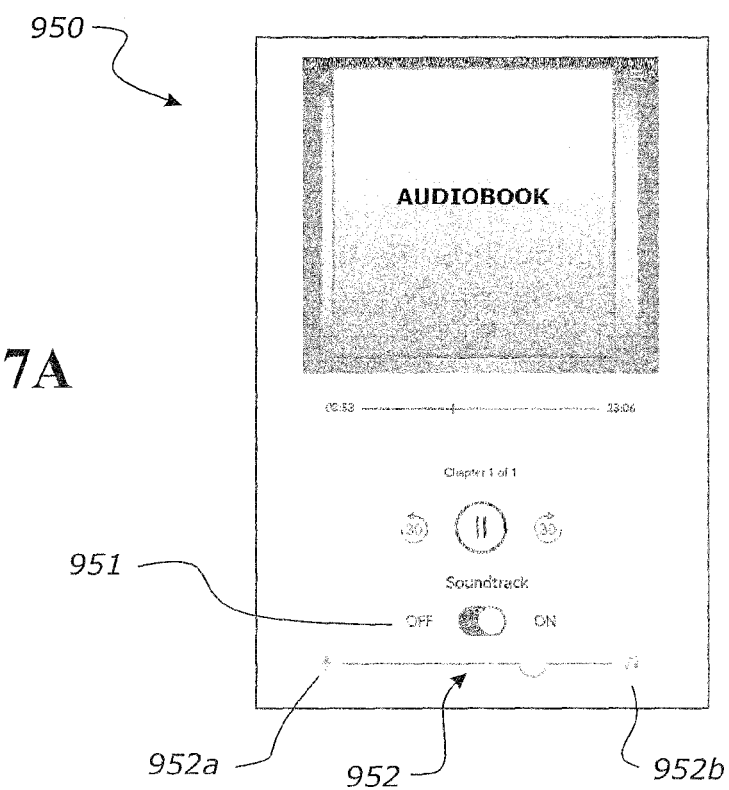
FIGS. 17A and 17B show screen shots of a playback system GUI for a soundtrack-enhanced audiobook having an operable volume control interface for controlling the volume mix between the soundtrack and the audiobook.
Figure 17B:
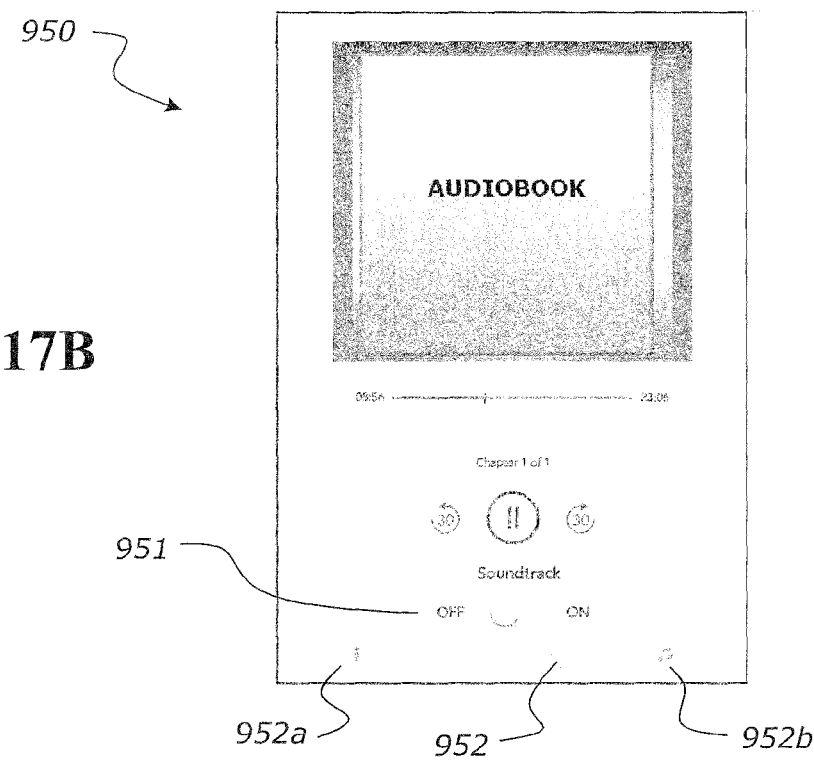

Referring to FIGS. 17A and 17B, one example configuration of a GUI of a soundtrack-enhanced audiobook playback system with volume control interface is shown. The playback system GUI is provided with an operable graphical 'on/off' button or switch 951,952 that may be toggled or operated to turn the soundtrack on or off (muted) during the audiobook playback. Additionally in this example configuration, a volume slider interface 952 that is operable to control the volume mix of the audiobook to the soundtrack. At a first end 952a of the scale the audiobook is louder than the soundtrack, and at the second end 952b of the scale the soundtrack is louder than the audiobook, and this volume mix is adjustable along the scale, including to a position in which the volume mix is equal.

11. Controlling the Narration Speed Setting in the Playback System

As previously described in regard to some embodiments of the playback system, it is possible that some audiobooks are provided with a variable narration speed setting, that is operable by a user to change or configure the narration speed, relative to a nominal or default narration speed. As previously described, the playback systems are able to adapt the soundtrack playback timing to any desired narration speed setting, to ensure the soundtrack playback is synchronised to the audiobook playback.

Figure 17C:
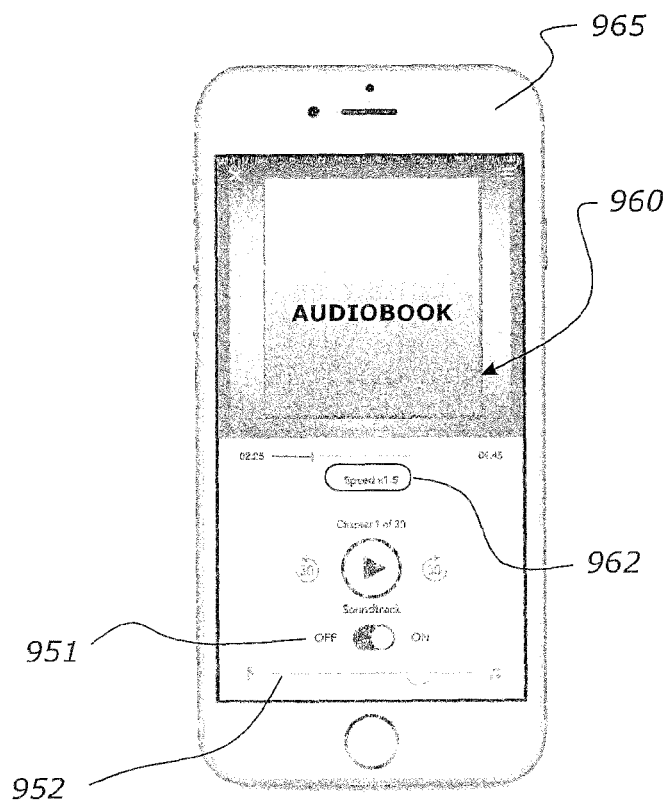
FIGS. 17C and 17D show screen shots of a playback system GUI for a soundtrack-enhanced audiobook which includes a narration speed setting interface.
Figure 17D:
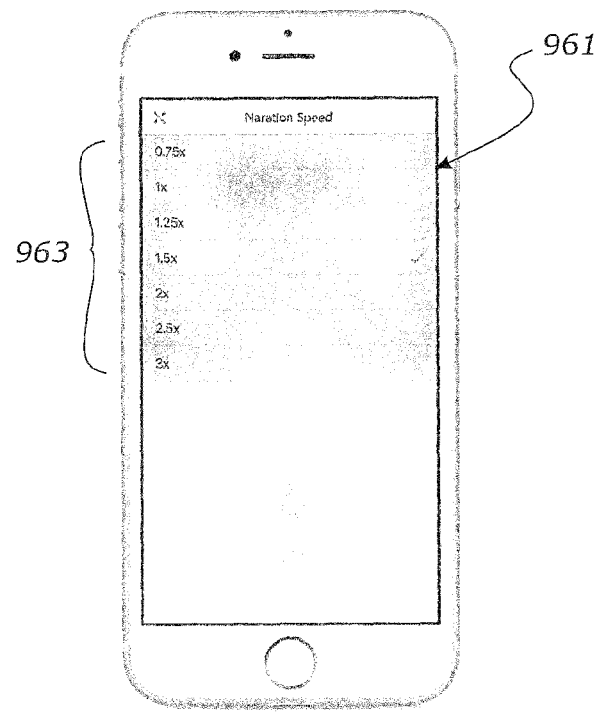

By way of example only, FIGS. 17C and 17D show a operable GUIs 960,961 of a playback system for a soundtrack-enhanced audiobook operating on a user electronic device 965, such as a smart phone or similar. In this example embodiment, the main playback GUI 960 is provided with a narration speed setting button 962 that optionally displays the current narration speed setting for the audiobook playback, and which may be activated or operated to enter a narration speed setting GUI screen 961, from which the user may select their desired narration speed setting from a list of settings shown at 963. Upon making a selection, the playback system reverts to the main GUI 960 screen and commences or continues or configures itself ready to play the audiobook and associated soundtrack at the new selected narration speed. It will be appreciated that in alternative configurations, the narration speed setting may be an operable slider scale or the narration speed setting may be a numerical input or similar indicative of the desired narration speed.

12. Manual or Automatic Soundtrack-Enhanced Audiobook Creation

In some of the above embodiments, the soundtracks for the audiobook are manually created by a user listening to the audiobook, and then inserting and configuring the desired audio regions at the desired narration positions in the audiobook. In other embodiments, the soundtracks may be partially or automatically created using semantic analysis of the audiobook or associated text to identify mood or other semantic aspects or characteristics of the narration and automatically configure suitable audio regions with suitable audio tracks to match the identified mood or semantic aspects.

13. General

Embodiments of the invention may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the foregoing, a storage medium may represent one or more devices for storing data, including read-only memory (ROM), random access memory (RAM), magnetic disk storage mediums, optical storage mediums, flash memory devices and/or other machine readable mediums for storing information. The terms "machine readable medium" and "computer readable medium" include, but are not limited to portable or fixed storage devices, optical storage devices, and/or various other mediums capable of storing, containing or carrying instruction(s) and/or data.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, circuit, and/or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

One or more of the components and functions illustrated the figures may be rearranged and/or combined into a single component or embodied in several components without departing from the invention. Additional elements or components may also be added without departing from the invention. Additionally, the features described herein may be implemented in software, hardware, or combination thereof.

In its various aspects, the invention can be embodied in a computer-implemented process, a machine (such as an electronic device, or a general purpose computer or other device that provides a platform on which computer programs can be executed), processes performed by these machines, or an article of manufacture. Such articles can include a computer program product or digital information product in which a computer readable storage medium containing computer program instructions or computer readable data stored thereon, and processes and machines that create and use these articles of manufacture.

The foregoing description of the invention includes preferred forms thereof. Modifications may be made thereto without departing from the scope of the invention as defined by the accompanying claims.

The invention claimed is:

1. A soundtrack-enhanced audiobook playback system comprising:
    an audiobook player operable to process a digital audiobook for playback; and
    a soundtrack player configured to process a soundtrack comprising a soundtrack timeline having one or more audio regions that are configured for synchronised playback with corresponding narration regions in the audiobook playback timeline, the soundtrack player receiving audiobook playback data associated with the audiobook playback, and being configured to synchronise playback of the audio regions of the soundtrack to the audiobook playback based at least partly on the audiobook playback data such that the audio regions are triggered or scheduled to playback as the audiobook playback narrates their respective narration regions.

2. The soundtrack-enhanced audiobook playback system according to claim 1 wherein the audiobook playback data comprises data indicative of a current audiobook playback position and a narration speed variable indicative of the narration speed at which the audiobook is being played back.

3. The soundtrack-enhanced audiobook playback system according to claim 1 wherein the soundtrack player dynamically adjusts the playback position of the audio regions along the soundtrack timeline based on a narration speed variable indicative of the narration speed at which the audiobook is being played back and data indicative of a nominal narration speed or a nominal audiobook playback duration upon which the position of audio regions were originally defined.

4. The soundtrack-enhanced audiobook playback system according to claim 1 wherein the audiobook player and soundtrack player are integrated with each other as an audio player; or wherein the audiobook player and soundtrack player are separate components or modules in data communication or which can interface with each other, whether bi-directional or uni-directional.

5. The soundtrack-enhanced audiobook playback system according to claim 1 further comprising an operable volume control interface that is operable to control the volume of the soundtrack playback relative to the audiobook playback, or vice versa.

6. The soundtrack-enhanced audiobook playback system according to claim 1 further comprising a user interface or mute button that is operable to switch the soundtrack playback between on and off such that the audiobook can be played selectively with or without the soundtrack.

7. A method of synchronizing the playback of a soundtrack to an audiobook to generate a soundtrack-enhanced audiobook, the method implemented by processor having associated memory, the method comprising:
receiving and processing a soundtrack comprising a soundtrack timeline having one or more audio regions that are configured for synchronised playback with corresponding narration regions in an audiobook playback timeline;
receiving or retrieving audiobook playback data associated with the current audiobook playback; and
triggering or scheduling the playback of the audio regions of the soundtrack based at least partly on the audiobook playback data such that the playback of the audio regions is synchronised to the playback of their corresponding narration regions.

8. The method according to claim 7 wherein receiving or retrieving audiobook playback data comprises receiving or retrieving data indicative of a current audiobook playback position and a narration speed variable indicative of the narration speed at which the audiobook is being played back.

9. The method according to claim 7 wherein the method comprises dynamically adjusting the playback position of the audio regions along the soundtrack timeline based on a narration speed variable indicative of the narration speed at which the audiobook is being played back and data indicative of a nominal narration speed or a nominal audiobook playback duration upon which the position of audio regions were originally defined.

10. A system for synchronising the playback of a digital soundtrack, which is configured or defined relative to electronic text, to the playback of an audiobook associated with the electronic text, the soundtrack comprising multiple audio regions that are configured for playback relative to respective text regions in the electronic text, the system comprising:
an audiobook player operable to process the digital audiobook for playback over an audio output system; and
a soundtrack player configured to receive or retrieve audiobook playback data associated with the audiobook playback, and being further configured to process the digital soundtrack and synchronise playback of the audio regions of the soundtrack based at least partly on the audiobook playback data such that the audio regions are triggered or scheduled to playback as the audiobook playback narrates their respective text regions to thereby generate a soundtrack-enhanced audiobook.

11. The system according to claim 10 wherein the audio the audiobook playback data comprises data indicative of any one or more of the following: a current narration position in the audiobook playback, a narration speed setting associated with the audiobook playback, and/or narration speed data representing the narration speed of the audiobook narration.

12. The system according to claim 11 wherein the current narration position is the current audiobook playback time; or wherein the current narration position is a value representing the playback percentage or portion completed relative to the total duration of the audiobook.

13. The system according to claim 11 wherein the narration speed setting is a multiplier factor or value relative to a standard, default or nominal narration speed for the audiobook.

14. The system according to claim 11 wherein the narration speed data comprises a plurality of narration speed values each corresponding to a respective segment or portion of the audiobook playback duration; or wherein the narration speed data comprises a single average narration speed for the entire audiobook.

15. The system according to claim 10 wherein the system further comprises a mapping engine that is operable or configured to generate or receive mapping data that maps the audiobook playback timing to its corresponding text position in the electronic text, and wherein the mapping data maps words in the electronic text to their corresponding audiobook playback time in the audiobook playback timeline at which they are narrated.

16. The system according to claim 15 wherein the digital soundtrack is a text-position based soundtrack and the soundtrack player is configured to maintain a narration position variable representing the current word being narrated in the audiobook based on audiobook playback data comprising the current narration position in the audiobook playback and the mapping data, and trigger or schedule playback of the audio regions of the soundtrack based on the narration position variable; or wherein the digital soundtrack is a text-position based soundtrack and the soundtrack player is configured to extract or generate narration speed data from the mapping data, maintain a narration position variable representing the current word being narrated in the audiobook based on the narration speed data and audiobook playback data comprising the current narration position in the audiobook playback, and trigger or schedule playback of the audio regions of the soundtrack based on the narration position variable.

17. The system according to claim 16 wherein the mapping data further comprises additional-text exception data indicative of or identifying one or more passages of additional text that is present in the electronic text but not narrated in the audiobook, and wherein the soundtrack player is configured to skip the narration position variable forward to a value past each respective identified passage of additional text when reaching the respective narration positions corresponding to when the additional-text is missing from the narration in the audiobook based on the additional-text exception data.

18. The system according to claim 16 wherein the mapping data further comprises additional-audio exception data indicative of or identifying one or more passages of additional audio present in the narration of the audiobook but not present in the electronic text, and wherein the soundtrack player is configured to pause or stall the narration position variable during the narration position periods associated with the identified one or more passages of additional audio based on the additional-audio exception data.

19. The system according to claim 15 wherein the mapping data further comprises additional-text exception data indicative of or identifying one or more passages of additional text that is present in the electronic text but not narrated in the audiobook, and wherein the soundtrack player is configured to adapt the triggering or scheduling of the playback of the audio regions based on the additional-text exception data to maintain synchronisation between the playback of the soundtrack and the audiobook.

20. The system according to claim 15 wherein the mapping data further comprises additional-audio exception data indicative of or identifying one or more passages of additional audio present in the narration of the audiobook but not present in the electronic text, and wherein the soundtrack player is configured to adapt the triggering or scheduling of the playback of the audio regions based on the additional-audio exception data to maintain synchronisation between the playback of the soundtrack and the audiobook.

21. The system according to claim 20 wherein the one or more passages of additional audio identified by the additional-audio exception data are either additional narration passages in the audiobook not present in the electronic text or narration pauses in the audiobook.

22. The system according to claim 15 wherein the digital soundtrack is a text-position based soundtrack and the soundtrack player is configured to convert the text-position based soundtrack into a time-based soundtrack based on the mapping data, and trigger or schedule playback of the audio regions of the soundtrack based on audiobook playback data comprising the current narration position in the audiobook playback; or wherein the digital soundtrack is a time-based soundtrack and the soundtrack player is configured to extract or generate narration speed data from the mapping data, modify the soundtrack based on the narration speed data, and trigger or schedule playback of the audio regions of the modified soundtrack based on audiobook playback data comprising the current narration position in the audiobook playback.

23. The system according to claim 10 wherein the soundtrack player is configured to trigger or schedule playback of the audio regions of the soundtrack based on audiobook playback data comprising narration speed data.

24. The system according to claim 10 wherein the soundtrack player is switchable between a reading mode in which the playback of the soundtrack is synchronised based on a user's reading position and/or reading speed and a listening mode in which the playback of the soundtrack is synchronised based on the audiobook playback data.

25. The system according to claim 24 wherein the switch between reading mode and listening mode generates bookmark reference data from which soundtrack playback can re-commence once the mode switch is complete, and wherein in the reading mode the bookmark reference is a reading text position indicative of a word being read that is mapped to its corresponding audiobook playback time of when the word is narrated in the listening mode, and wherein in the listening mode the bookmark reference is a current audiobook playback time that is mapped to its corresponding reading text position indicative of the word in the electronic text that is currently being narrated.

26. The system according to claim 10 further comprising an operable volume control interface that is operable to control the volume of the soundtrack playback relative to the audiobook playback, or vice versa.

27. The system according to claim 10 further comprising a user interface or mute button that is operable to switch the soundtrack playback between on and off such that the audiobook can be played selectively with or without the soundtrack.

28. A method of synchronising the playback of a digital soundtrack, which is configured or defined relative to electronic text, to the playback of an audiobook associated with the electronic text, the soundtrack comprising multiple audio regions that are configured for playback relative to respective text regions in the electronic text, the method implemented by a processor having associated memory, and comprising:
    receiving and processing the soundtrack;
    receiving or retrieving audiobook playback data associated with the current audiobook playback; and
    triggering or scheduling the playback of the audio regions of the soundtrack based at least partly on the audiobook playback data such that the audio regions are triggered or scheduled to playback as the audiobook playback narrates their respective text regions to thereby generate a soundtrack-enhanced audiobook.

* * * * *